(12) United States Patent
Zhu et al.

(10) Patent No.: US 11,553,339 B2
(45) Date of Patent: Jan. 10, 2023

(54) METHOD FOR ACCESSING SERVING NETWORK AND COMMUNICATIONS APPARATUS

(71) Applicant: Huawei Technologies Co., Ltd., Shenzhen (CN)

(72) Inventors: Hualin Zhu, Shanghai (CN); Weisheng Jin, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 67 days.

(21) Appl. No.: 17/013,110

(22) Filed: Sep. 4, 2020

(65) Prior Publication Data
US 2020/0404499 A1 Dec. 24, 2020

Related U.S. Application Data

(63) Continuation of application No. PCT/CN2019/081850, filed on Apr. 9, 2019.

(30) Foreign Application Priority Data

Apr. 9, 2018 (CN) .......................... 201810313099.9
Jun. 26, 2018 (CN) .......................... 201810674225.3

(51) Int. Cl.
*H04L 61/5014* (2022.01)
*H04W 12/06* (2021.01)
(Continued)

(52) U.S. Cl.
CPC ......... *H04W 12/06* (2013.01); *H04L 61/5014* (2022.05); *H04L 63/08* (2013.01); *H04W 74/0833* (2013.01); *H04W 76/10* (2018.02)

(58) Field of Classification Search
None
See application file for complete search history.

(56) References Cited

U.S. PATENT DOCUMENTS

| 6,944,150 B1 | 9/2005 | McConnell et al. |
| 10,250,646 B2 | 4/2019 | Li et al. |

(Continued)

FOREIGN PATENT DOCUMENTS

| CN | 101207473 A | 6/2008 |
| CN | 101207532 A | 6/2008 |

(Continued)

OTHER PUBLICATIONS

3GPP TS 23.502 V15.1.0, "3rd Generation Partnership Project; Technical Specification Group Services and System Aspects; Procedures for the 5G System; Stage 2 (Release 15)," Mar. 2018, 285 pages.
(Continued)

*Primary Examiner* — Ajit Patel
(74) *Attorney, Agent, or Firm* — Conley Rose, P.C.

(57) ABSTRACT

A method for accessing a serving network includes: obtaining, by a user plane network element, an access message, where the access message is for a terminal accessing a serving network, and where the access message includes authentication information of the terminal in the serving network; and sending, by the user plane network element, the access message to the serving network. The method for accessing serving network and the communications apparatus that are provided in the embodiments of this application enable a terminal to access a serving network using an access network, and expand a usage scenario of the serving network.

21 Claims, 21 Drawing Sheets

(51) Int. Cl.
*H04W 76/10* (2018.01)
*H04L 9/40* (2022.01)
*H04W 74/08* (2009.01)

(56) References Cited

U.S. PATENT DOCUMENTS

| | | |
|---|---|---|
| 2009/0207773 A1 | 8/2009 | Feng et al. |
| 2012/0238247 A1 | 9/2012 | Wen et al. |
| 2013/0176897 A1 | 7/2013 | Wang et al. |
| 2014/0185603 A1 | 7/2014 | Kaippallimalil et al. |
| 2015/0264449 A1 | 9/2015 | Zeng et al. |
| 2017/0311017 A1 | 10/2017 | Savard et al. |
| 2017/0339609 A1 | 11/2017 | Youn et al. |
| 2017/0359758 A1 | 12/2017 | Chigurupati et al. |
| 2021/0211960 A1* | 7/2021 | Ryu ..................... H04W 36/14 |

FOREIGN PATENT DOCUMENTS

| | | |
|---|---|---|
| CN | 101472155 A | 7/2009 |
| CN | 102474500 A | 5/2012 |
| CN | 102572605 A | 7/2012 |
| CN | 103095720 A | 5/2013 |
| CN | 101635632 B | 8/2013 |
| CN | 103581708 A | 2/2014 |
| CN | 107509222 A | 12/2017 |
| CN | 104869101 B | 2/2018 |
| EP | 1848173 A1 | 10/2007 |
| WO | WO2010064866 A2 * | 6/2010 |
| WO | WO2018202284 A1 * | 11/2018 |

OTHER PUBLICATIONS

3GPP TS 23.501 V15.1.0, "3rd Generation Partnership Project; Technical Specification Group Services and System Aspects; System Architecture for the 5G System; Stage 2 (Release 15)," Mar. 2018, 201 pages.

3GPP TS 29.561 V0.4.0 "3rd Generation Partnership Project; Technical Specification Group Core Network and Terminals; 5G System; Interworking between 5G Network and external Data Networks; Stage 3 (Release 15)," Mar. 2018, 37 pages.

* cited by examiner

METHOD FOR ACCESSING SERVING NETWORK AND COMMUNICATIONS APPARATUS

CROSS-REFERENCE TO RELATED APPLICATIONS

This application is a continuation of International Patent Application No. PCT/CN2019/081850, filed on Apr. 9, 2019, which claims priority to Chinese Patent Application No. 201810674225.3, filed on Jun. 26, 2018, which claims priority to Chinese Patent Application No. 201810313099.9, filed on Apr. 9, 2018. The disclosures of the aforementioned applications are hereby incorporated by reference in their entireties.

TECHNICAL FIELD

Embodiments of this application relate to communication technologies, and in particular, to a method for accessing serving network and a communications apparatus.

BACKGROUND

An Internet Protocol television (IPTV) network is a network provided by a service provider, and may provide a user with services such as a video, audio, and a picture. Currently, the user may access the IPTV network using a terminal, to obtain an IPTV service. The terminal herein may be, for example, a residential gateway (RG).

In other approaches, the terminal may access the IPTV network using a wired network. However, other approaches do not cover how the terminal accesses the IPTV network in another network (for example, a wireless network). Therefore, the existing manner in which the terminal accesses the IPTV network cannot meet a requirement during actual use.

SUMMARY

Embodiments of this application provide a method for accessing serving network and a communications apparatus, to resolve a technical problem that a terminal cannot access an IPTV network using another network (for example, a wireless network) in other approaches.

According to a first aspect, an embodiment of this application provides a method for accessing serving network. The method includes: obtaining, by a user plane network element, an access message, where the access message is for a terminal accessing a serving network, and the access message includes authentication information of the terminal in the serving network; and sending, by the user plane network element, the access message to the serving network.

According to the method for accessing serving network provided in the first aspect, when an access network is a wireless network, a user plane network element in the access network may send, to the serving network, the access message for the terminal accessing the serving network, to assist the terminal in accessing the serving network. As such, the terminal can access the serving network using the wireless network, and a usage scenario of the serving network is expanded.

In a possible implementation, the method further includes receiving, by the user plane network element, the authentication information from a session management network element and an initial access message from the terminal. Additionally, obtaining, by a user plane network element, an access message includes obtaining, by the user plane network element, the access message based on the initial access message and the authentication information.

According to the method for accessing serving network provided in this possible implementation, the user plane network element in the access network may add the authentication information of the terminal in the serving network to the initial access message from the terminal. As such, the serving network can authenticate the terminal based on the authentication information, further the access network adds, in flexible and diversified manners, the authentication information to the initial access message from the terminal, and a usage scenario is expanded.

In a possible implementation, the obtaining, by a user plane network element, an access message includes receiving, by the user plane network element, the access message from a session management network element.

According to the method for accessing serving network provided in this possible implementation, an operation of adding the authentication information of the terminal in the serving network to the initial access message from the terminal may be processed by a session management network element of the access network. As such, the user plane network element only needs to send, to the serving network, the access message from the session management network element, and does not need to process the access message, and power consumption of the user plane network element is reduced. Additionally, the access network adds, in flexible and diversified manners, the authentication information to the initial access message from the terminal, and the usage scenario is expanded.

In a possible implementation, the method further includes: obtaining, by the user plane network element, a feedback message of the access message from the serving network, where the feedback message includes identification information of the terminal; and sending, by the user plane network element, the feedback message to the terminal based on the identification information of the terminal.

According to the method for accessing serving network provided in this possible implementation, the user plane network element in the access network may send, to the terminal based on the identification information of the terminal that is included in the feedback message from the serving network to the terminal, the feedback message from the serving network to the terminal, to assist the terminal in accessing the serving network. As such, the terminal can access the serving network using the access network in flexible and diversified manners, to meet requirements of different application scenarios.

In a possible implementation, the sending, by the user plane network element, the feedback message for the access message to the terminal based on the identification information of the terminal includes: determining, by the user plane network element, session information of the terminal based on a mapping relationship between the identification information of the terminal and the session information of the terminal; and sending, by the user plane network element, the feedback message to the terminal through a session corresponding to the session information of the terminal.

According to the method for accessing serving network provided in this possible implementation, the user plane network element in the access network may identify, based on the identification information of the terminal that is included in the feedback message from the serving network to the terminal and the mapping relationship, the session used to send the feedback message, thereby sending, to the terminal using the corresponding session, the feedback message from the serving network to the terminal, to assist the terminal in accessing the serving network. As such, the terminal can access the serving network using the access network in flexible and diversified manners, to meet the requirements of the different application scenarios.

In a possible implementation, the method further includes: receiving, by the user plane network element, the identification information of the terminal and the session information of the terminal from the session management network element; and establishing, by the user plane network element, the mapping relationship between the identification information of the terminal and the session information of the terminal; or receiving, by the user plane network element, the mapping relationship that is between the identification information of the terminal and the session information of the terminal and that is sent from the session management network element; or obtaining, by the user plane network element, the initial access message from the terminal, where the initial access message includes the identification information of the terminal; receiving, by the user plane network element, the session information of the terminal from the session management network element; and establishing, by the user plane network element, the mapping relationship between the identification information of the terminal and the session information of the terminal.

According to the method for accessing serving network provided in this possible implementation, the user plane network element in the access network obtains the mapping relationship between the identification information of the terminal and the session information of the terminal in flexible and diversified manners, to meet the requirements of the different application scenarios. As such, a usage scenario in which the terminal accesses the serving network using the access network is expanded.

In a possible implementation, the method further includes: receiving, by the user plane network element, the feedback message that is of the serving network for the access message and that is sent from the session management network element, where the feedback message includes the session information of the terminal; and sending, by the user plane network element, the feedback message to the terminal based on the session corresponding to the session information of the terminal.

According to the method for accessing serving network provided in this possible implementation, the session management network element of the access network may determine, based on the identification information of the terminal that is included in the feedback message from the serving network to the terminal, the session for sending the feedback message, and add the session information to the feedback message and send the session information to the user plane network element. As such, the user plane network element can directly send the feedback message to the terminal based on a session corresponding to a session identifier, and does not need to determine the session for sending the feedback message any more, and the power consumption of the user plane network element is reduced. Additionally, the terminal access the serving network in flexible and diversified manners, and the usage scenario is expanded.

In a possible implementation, the access message obtained by the user plane network element includes first address information assigned by the session management network element to the terminal and second address information assigned by the serving network to the terminal. Additionally, sending, by the user plane network element, the access message to the serving network includes: deleting, by the user plane network element, the first address information in the access message; and sending, by the user plane network element to the serving network, an access message obtained after the first address information is deleted.

According to the method for accessing serving network provided in this possible implementation, even though the access network and the serving network each allocate an address to the terminal, the user plane network element may enable the terminal to access the serving network by deleting the first address information in the access message. On a premise that an existing procedure in which a session of the terminal is established in the access network is not modified as much as possible, the terminal is enabled to access the serving network using the access network, and user experience is improved.

In a possible implementation, the feedback message obtained by the user plane network element includes second address information assigned by the serving network to the terminal. Additionally, the method further includes: obtaining, by the user plane network element, first address information assigned by the session management network element to the terminal; and adding, by the user plane network element, the first address information to the feedback message. Further, sending, by the user plane network element, the feedback message to the terminal includes sending, by the user plane network element, the feedback message to the terminal, where the feedback message includes the first address information and the second address information.

According to the method for accessing serving network provided in this possible implementation, even though the access network and the serving network each allocate an address to the terminal, the user plane network element may send the feedback message to the terminal by adding the first address information to the feedback message, to enable the terminal to access the serving network. On a premise that an existing procedure in which a session of the terminal is established in the access network is not modified as much as possible, the terminal is enabled to access the serving network using the access network, and user experience is improved.

According to a second aspect, an embodiment of this application provides a method for accessing serving network. The method includes: receiving, by a session management network element, a session establishment request message from a terminal, where the session establishment request message requests the session management network element to establish a session for the terminal; obtaining, by the session management network element, authentication information of the terminal in a serving network, where the authentication message is for the terminal accessing the serving network; and sending, by the session management network element, the authentication information to a user plane network element.

According to the method for accessing serving network provided in this possible implementation, a session management network element of an access network may obtain the authentication information of the terminal in the serving network in a process of establishing the session with the terminal, and send the obtained authentication information to the user plane network element. As such, when the terminal accesses the serving network, the user plane network element can transmit the authentication information to the serving network, to enable the serving network to authenticate the terminal based on the authentication information, and further enable the terminal to access the serving network using the access network.

In a possible implementation, obtaining, by the session management network element, authentication information of the terminal in a serving network includes obtaining, by the session management network element, the authentication information from a data management network element, a policy control network element, a local database, or an access management network element.

According to the method for accessing serving network provided in this possible implementation, the session management network element in the access network obtains the authentication information of the terminal in the serving network in flexible and diversified manners, to meet requirements of different application scenarios, and expand a usage scenario in which the terminal accesses the serving network using the access network.

In a possible implementation, the method further includes: receiving, by the session management network element, an initial access message from the terminal; and obtaining, by the session management network element, an access message based on the initial access message and the authentication information, where the access message includes the authentication information. Additionally, sending, by the session management network element, the authentication information to a user plane network element includes sending, by the session management network element, the access message to the user plane network element.

According to the method for accessing serving network provided in this possible implementation, an operation of adding the authentication information of the terminal in the serving network to the initial access message from the terminal may be processed by the session management network element in the access network. As such, the session management network element in the access network sends the authentication information of the terminal in the serving network to the user plane network element in flexible and diversified manners, to meet the requirements of the different application scenarios, and expand the usage scenario in which the terminal accesses the serving network using the access network.

In a possible implementation, the method further includes: obtaining, by the session management network element, identification information of the serving network based on the session establishment request message; determining, by the session management network element based on the identification information of the serving network, a policy control network element for providing a policy for the serving network; notifying, by the session management network element, the policy control network element that the terminal is to obtain a service from the serving network; and receiving, by the session management network element, the policy of the serving network from the policy control network element.

In a possible implementation, the method further includes: obtaining, by the session management network element, identification information of the terminal and session information of the terminal; and sending, by the session management network element, the identification information of the terminal and the session information of the terminal to the user plane network element. Alternatively, the method further includes: obtaining, by the session management network element, session information of the terminal; and sending, by the session management network element, the session information of the terminal to the user plane network element.

According to the method for accessing serving network provided in this possible implementation, the session management network element sends the identification information of the terminal and the session information of the terminal to the user plane network element, or sends the session information of the terminal, to assist the user plane network element in obtaining a mapping relationship between the identification information of the terminal and the session information of the terminal. As such, a user plane network element in the access network can identify, based on the identification information of the terminal that is included in a feedback message from the serving network to the terminal and the mapping relationship, a session used to send the feedback message, thereby sending the feedback message from the serving network to the terminal to the terminal using the corresponding session, to assist the terminal in accessing the serving network, such that the terminal can access the serving network using the access network in flexible and diversified manners, to meet the requirements of the different application scenarios.

In a possible implementation, the method further includes: obtaining, by the session management network element, identification information of the terminal; establishing, by the session management network element, a mapping relationship between the identification information of the terminal and session information of the terminal based on the identification information of the terminal and the session information of the terminal; and sending, by the session management network element, the mapping relationship to the user plane network element.

According to the method for accessing serving network provided in this possible implementation, the session management network element sends the mapping relationship between the identification information of the terminal and the session information of the terminal to the user plane network element. As such, the user plane network element in the access network can identify, based on the identification information of the terminal that is included in the feedback message from the serving network to the terminal and the mapping relationship, the session used to send the feedback message, thereby sending, to the terminal using the corresponding session, the feedback message from the serving network to the terminal, to assist the terminal in accessing the serving network, such that the terminal can access the serving network using the access network in flexible and diversified manners, to meet the requirements of the different application scenarios.

In a possible implementation, the method further includes: receiving, by the session management network element, a feedback message of the access message from the serving network, where the feedback message includes identification information of the terminal; determining, by the session management network element, session information of the terminal based on the identification information of the terminal and a mapping relationship between the identification information of the terminal and the session information of the terminal; and sending, by the session management network element, the feedback message to the user plane network element, where the feedback message includes the session information of the terminal.

According to the method for accessing serving network provided in this possible implementation, the session management network element of the access network may determine, based on the identification information of the terminal that is included in the feedback message from the serving network to the terminal, the session for sending the feedback message, and add the session information to the feedback message and send the session information to the user plane network element. As such, the user plane network element can directly send the feedback message to the terminal based on a session corresponding to a session identifier, and does not need to determine the session for sending the feedback message any more. Additionally, the terminal access the serving network in flexible and diversified manners, and the usage scenario is expanded.

In a possible implementation, the method further includes: obtaining, by the session management network element, the identification information of the terminal from the data management network element, the policy control network element, the local database, or the access management network element; or receiving, by the session management network element, the initial access message from the terminal, where the initial access message includes the identification information of the terminal.

According to the method for accessing serving network provided in this possible implementation, the session management network element in the access network obtains the identification information of the terminal in flexible and diversified manners, to meet the requirements of the different application scenarios, thereby expanding the usage scenario in which the terminal accesses the serving network using the access network.

According to a third aspect, an embodiment of this application provides a method for accessing serving network. The method includes: determining, by a terminal, to establish a session; and sending, by the terminal, a session establishment request message to a session management network element, where the session establishment request message requests the session management network element to establish the session for the terminal.

According to the method for accessing serving network provided in the third aspect, when an access network is a wireless network, the terminal may initiate a session establishment request to a session management network element of the access network, to enable the session management network element to establish the session with the terminal. As such, the terminal can access a serving network using the session, and further the terminal can access the serving network using a wireless network.

In a possible implementation, determining, by a terminal, to establish a session includes: determining, by the terminal when receiving data of the serving network from a client, to establish the session; or determining, by the terminal when completing a registration procedure in a mobile network, to establish the session.

In a possible implementation, the method further includes sending, by the terminal, an initial access message to the serving network after the session is established, where the initial access message requests to access the serving network.

According to the method for accessing serving network provided in this possible implementation, after the session management network element establishes the session with the terminal, the terminal may initiate a serving network access procedure using the session, such that the terminal can access the serving network using the wireless network.

In a possible implementation, sending, by the terminal, an initial access message to the serving network includes sending, by the terminal, the initial access message to the serving network when receiving the data of the serving network from the client.

In a possible implementation, the session establishment request message includes instruction information, and the instruction information is used to instruct the terminal to obtain an Internet Protocol (IP) address from the serving network.

According to the method for accessing serving network provided in this possible implementation, the serving network assigns an IP address in the serving network to the terminal, and communicates with the terminal using the IP address. Therefore, the terminal may instruct, using the instruction information in the session establishment request message, the session management network element not to assign an IP address to the terminal during session establishment, to prevent the session management network element from assigning an IP address in the access network to the terminal, thereby reducing overheads of the session management network element.

In a possible implementation, the instruction information includes: instruction information for IP address allocation via Dynamic Host Configuration Protocol (DHCP) or identification information of an Ethernet type of the session.

According to the method for accessing serving network provided in this possible implementation, the terminal instructs, in flexible and diversified manners, the session management network element not to assign the IP address to the terminal during session establishment, to meet requirements of different application scenarios, thereby expanding a usage scenario in which the terminal accesses the serving network using the access network.

In a possible implementation, the method further includes: receiving, by the terminal, a session establishment response message from the session management network element, where the session establishment response message includes first address information assigned by the session management network element to the terminal; obtaining, by the terminal, a feedback message for the initial access message, where the feedback message includes second address information assigned by the serving network to the terminal; sending, by the terminal, an uplink message to the serving network, where the uplink message includes the first address information and the second address information; receiving, by the terminal, a downlink message from the serving network, where the downlink message includes the first address information and the second address information; and deleting, by the terminal, the first address information in the downlink message.

According to the method for accessing serving network provided in this possible implementation, when the access network and the serving network each allocate an address to the terminal, the terminal can still send a message to the serving network in the manner in this embodiment. On a premise that an existing procedure in which the session of the terminal is established in the access network is not modified as much as possible, the terminal is enabled to access the serving network using the access network, and user experience is improved.

According to a fourth aspect, an embodiment of this application provides a method for accessing serving network. The method includes: receiving, by a data management network element, authentication information of a terminal in a serving network; and using, by the data management network element, the authentication information of the terminal in the serving network as information about the terminal.

According to the method for accessing serving network provided in the fourth aspect, when an access network is a wireless network, a data management network element in the access network may store the authentication information of the terminal in the serving network as the information about the terminal, to provide the authentication information of the terminal in the serving network when the terminal accesses the serving network using the access network, to assist the terminal in accessing the serving network. As such, the terminal can access the serving network using the wireless network, and a usage scenario of the serving network is expanded.

In a possible implementation, receiving, by a data management network element, authentication information of a terminal in a serving network includes receiving, by the data management network element, the authentication information that is of the terminal in the serving network and that is sent from the serving network.

In a possible implementation, receiving, by a data management network element, authentication information of a terminal in a serving network includes receiving, by the data management network element, the authentication information that is of the terminal in the serving network and that is sent from a network management system network element.

In a possible implementation, the method further includes sending, by the data management network element, a response message, where the response message is used to instruct the data management network element to use the authentication information of the terminal in the serving network as the information about the terminal.

According to a fifth aspect, an embodiment of this application provides a communications apparatus. The communications apparatus includes: a processing unit configured to obtain an access message, where the access message is for a terminal accessing a serving network, and the access message includes authentication information of the terminal in the serving network; and a sending unit configured to send the access message to the serving network.

In a possible implementation, the apparatus further includes a receiving unit configured to receive the authentication information from a session management network element and an initial access message from the terminal. Additionally, the processing unit is configured to obtain the access message based on the initial access message and the authentication information.

In a possible implementation, the processing unit is configured to receive the access message from a session management network element.

In a possible implementation, the processing unit is further configured to: obtain a feedback message of the access message from the serving network, where the feedback message includes identification information of the terminal; and control, based on the identification information of the terminal, the sending unit to send the feedback message to the terminal.

In a possible implementation, the processing unit is configured to: determine session information of the terminal based on a mapping relationship between the identification information of the terminal and the session information of the terminal; and control the sending unit to send the feedback message to the terminal through a session corresponding to the session information of the terminal.

In a possible implementation, the receiving unit is configured to receive the identification information of the terminal and the session information of the terminal from the session management network element; and the processing unit is further configured to establish the mapping relationship between the identification information of the terminal and the session information of the terminal; or the receiving unit is configured to receive the mapping relationship that is between the identification information of the terminal and the session information of the terminal and that is sent from the session management network element; or the receiving unit is configured to receive the session information of the terminal from the session management network element; and the processing unit is further configured to obtain the initial access message from the terminal; and establish the mapping relationship between the identification information of the terminal and the session information of the terminal, where the initial access message includes the identification information of the terminal.

In a possible implementation, the receiving unit is configured to receive the feedback message that is of the serving network for the access message and that is sent from the session management network element, where the feedback message includes the session information of the terminal. Additionally, the processing unit is further configured to control, based on the session corresponding to the session information of the terminal, the sending unit to send the feedback message to the terminal.

In a possible implementation, the access message obtained by the processing unit includes first address information assigned by the session management network element to the terminal and second address information assigned by the serving network to the terminal. Additionally, the processing unit is further configured to delete the first address information in the access message, and the sending unit is configured to send, to the serving network, an access message obtained after the first address information is deleted.

In a possible implementation, the feedback message obtained by the processing unit includes second address information assigned by the serving network to the terminal. Additionally, the processing unit is further configured to: obtain first address information assigned by the session management network element to the terminal; and add the first address information to the feedback message, The sending unit is configured to send the feedback message to the terminal, where the feedback message includes the first address information and the second address information.

For beneficial effects of the communications apparatus according to the fifth aspect and the possible implementations of the fifth aspect, refer to the beneficial effects brought by the first aspect and the possible implementations of the first aspect. Details are not described herein again.

According to a sixth aspect, an embodiment of this application provides a communications apparatus. The communications apparatus includes: a receiving unit configured to receive a session establishment request message from a terminal, where the session establishment request message requests to establish a session for the terminal; a processing unit configured to obtain authentication information of the terminal in a serving network, where the authentication message is for the terminal accessing the serving network; and a sending unit configured to send the authentication information to a user plane network element.

In a possible implementation, the processing unit is configured to obtain the authentication information from a data management network element, a policy control network element, a local database, or an access management network element.

In a possible implementation, the receiving unit is further configured to receive an initial access message from the terminal. The processing unit is further configured to obtain an access message based on the initial access message and the authentication information, where the access message includes the authentication information. The sending unit is configured to send the access message to the user plane network element.

In a possible implementation, the processing unit is further configured to: obtain identification information of the serving network based on the session establishment request message; and determine, based on the identification information of the serving network, a policy control network element for providing a policy for the serving network. Additionally, the sending unit is further configured to notify the policy control network element that the terminal is to obtain a service from the serving network, and the receiving unit is further configured to receive the policy of the serving network from the policy control network element.

In a possible implementation, the processing unit is further configured to obtain identification information of the terminal and session information of the terminal, and the sending unit is further configured to send the identification information of the terminal and the session information of the terminal to the user plane network element. Alternatively, the processing unit is further configured to obtain session information of the terminal, and the sending unit is further configured to send the session information of the terminal to the user plane network element.

In a possible implementation, the processing unit is further configured to: obtain identification information of the terminal; and establish a mapping relationship between the identification information of the terminal and session information of the terminal based on the identification information of the terminal and the session information of the terminal. The sending unit is further configured to send the mapping relationship to the user plane network element.

In a possible implementation, the receiving unit is further configured to receive a feedback message of the access message from the serving network, where the feedback message includes identification information of the terminal. The processing unit is further configured to determine session information of the terminal based on the identification information of the terminal and a mapping relationship between the identification information of the terminal and the session information of the terminal. The sending unit is further configured to send the feedback message to the user plane network element, where the feedback message includes the session information of the terminal.

In a possible implementation, the processing unit is configured to obtain the identification information of the terminal from the data management network element, the policy control network element, the local database, or the access management network element. Alternatively, the processing unit is configured to receive, using the receiving unit, the initial access message from the terminal, where the initial access message includes the identification information of the terminal.

For beneficial effects of the communications apparatus according to the sixth aspect and the possible implementations of the sixth aspect, refer to the beneficial effects brought by the second aspect and the possible implementations of the second aspect. Details are not described herein again.

According to a seventh aspect, an embodiment of this application provides a communications apparatus. The communications apparatus includes: a processing unit configured to determine to establish a session; and a sending unit configured to send a session establishment request message to a session management network element, where the session establishment request message requests the session management network element to establish the session.

In a possible implementation, the processing unit is configured to: determine, when receiving data of the serving network from a client, to establish the session; or determine, when completing a registration procedure in a mobile network, to establish the session.

In a possible implementation, the sending unit is further configured to send an initial access message to the serving network after the session is established, where the initial access message requests to access the serving network.

In a possible implementation, the sending unit is configured to send the initial access message to the serving network when receiving the data of the serving network from the client.

In a possible implementation, the session establishment request message includes instruction information, and the instruction information is used to instruct the apparatus to obtain an IP address from the serving network.

In a possible implementation, the instruction information includes instruction information for IP address allocation via dynamic host configuration protocol or identification information of an Ethernet type of the session.

In a possible implementation, the apparatus further includes: a receiving unit configured to receive a session establishment response message from the session management network element, where the session establishment response message includes first address information assigned by the session management network element. The processing unit is further configured to obtain a feedback message for the initial access message, where the feedback message includes second address information assigned by the serving network. The sending unit is further configured to send an uplink message to the serving network, where the uplink message includes the first address information and the second address information. The receiving unit is further configured to receive a downlink message from the serving network, where the downlink message includes the first address information and the second address information The processing unit is further configured to delete the first address information in the downlink message.

For beneficial effects of the communications apparatus according to the seventh aspect and the possible implementations of the seventh aspect, refer to the beneficial effects brought by the third aspect and the possible implementations of the third aspect. Details are not described herein again.

According to an eighth aspect, an embodiment of this application provides a communications apparatus. The communications apparatus includes: a receiving unit configured to receive authentication information of a terminal in a serving network; and a processing unit configured to use the authentication information of the terminal in the serving network as information about the terminal.

For beneficial effects of the communications apparatus according to the eighth aspect, refer to the beneficial effects brought by the fourth aspect. Details are not described herein again.

According to a ninth aspect, an embodiment of this application provides a communications apparatus. The communications apparatus includes a processor, a memory, a receiver, and a transmitter. The receiver and the transmitter are both coupled to the processor. The processor controls a receiving action of the receiver, and the processor controls a sending action of the transmitter.

The memory is configured to store computer executable program code. The program code includes an instruction. When the processor executes the instruction, the instruction enables the communications apparatus to perform the method for accessing serving network according to the first aspect or the possible implementations of the first aspect.

According to a tenth aspect, an embodiment of this application provides a communications apparatus. The communications apparatus includes a processor, a memory, a receiver, and a transmitter. The receiver and the transmitter are both coupled to the processor. The processor controls a receiving action of the receiver, and the processor controls a sending action of the transmitter.

The memory is configured to store computer executable program code. The program code includes an instruction. When the processor executes the instruction, the instruction enables the communications apparatus to perform the method for accessing serving network according to the second aspect or the possible implementations of the second aspect.

According to an eleventh aspect, an embodiment of this application provides a communications apparatus. The communications apparatus includes a processor, a memory, a receiver, and a transmitter. The receiver and the transmitter are both coupled to the processor. The processor controls a receiving action of the receiver, and the processor controls a sending action of the transmitter.

The memory is configured to store computer executable program code. The program code includes an instruction. When the processor executes the instruction, the instruction enables the communications apparatus to perform the method for accessing serving network according to the third aspect or the possible implementations of the third aspect.

According to a twelfth aspect, an embodiment of this application provides a communications apparatus. The communications apparatus includes a processor, a memory, and a receiver. The receiver is coupled to the processor. The processor controls a receiving action of the receiver.

The memory is configured to store computer executable program code. The program code includes an instruction. When the processor executes the instruction, the instruction enables the communications apparatus to perform the method for accessing serving network according to the fourth aspect or the possible implementations of the fourth aspect.

According to a thirteenth aspect, an embodiment of this application provides a communications apparatus, including a unit, a module, or a circuit that is configured to perform the method according to the first aspect or the possible implementations of the first aspect. The communications apparatus may be a user plane network element, or may be a module applied to a user plane network element, for example, may be a chip applied to the user plane network element.

According to a fourteenth aspect, an embodiment of this application provides a communications apparatus, including a unit, a module, or a circuit that is configured to perform the method according to the second aspect or the possible implementations of the second aspect. The communications apparatus may be a session management network element, or may be a module applied to a session management network element, for example, may be a chip applied to the session management network element.

According to a fifteenth aspect, an embodiment of this application provides a communications apparatus, including a unit, a module, or a circuit that is configured to perform the method according to the third aspect or the possible implementations of the third aspect. The communications apparatus may be a terminal, or may be a module applied to a terminal, for example, may be a chip applied to the terminal.

According to a sixteenth aspect, an embodiment of this application provides a communications apparatus, including a unit, a module, or a circuit that is configured to perform the method according to the fourth aspect or the possible implementations of the fourth aspect. The communications apparatus may be a data management network element, or may be a module applied to a data management network element, for example, may be a chip applied to the data management network element.

According to a seventeenth aspect, an embodiment of this application provides a communications apparatus, including a unit, a module, or a circuit that is configured to perform the method according to the fourth aspect or the possible implementations of the fourth aspect. The communications apparatus may be a policy control network element, or may be a module applied to a policy control network element, for example, may be a chip applied to the policy control network element.

According to an eighteenth aspect, an embodiment of this application provides a computer program product including an instruction. When the computer program product is run on a computer, the computer is enabled to perform the method according to the first aspect or the possible implementations of the first aspect.

According to a nineteenth aspect, an embodiment of this application provides a computer program product including an instruction. When the computer program product is run on a computer, the computer is enabled to perform the method according to the second aspect or the possible implementations of the second aspect.

According to a twentieth aspect, an embodiment of this application provides a computer program product including an instruction. When the computer program product is run on a computer, the computer is enabled to perform the method according to the third aspect or the possible implementations of the third aspect.

According to a twenty-first aspect, an embodiment of this application provides a computer program product including an instruction. When the computer program product is run on a computer, the computer is enabled to perform the method according to the fourth aspect or the possible implementations of the fourth aspect.

According to a twenty-second aspect, an embodiment of this application provides a computer-readable storage medium. The computer-readable storage medium stores an instruction. When the instruction is run on a computer, the computer is enabled to perform the method according to the first aspect or the possible implementations of the first aspect.

According to a twenty-third aspect, an embodiment of this application provides a computer-readable storage medium. The computer-readable storage medium stores an instruction. When the instruction is run on a computer, the computer is enabled to perform the method according to the second aspect or the possible implementations of the second aspect.

According to a twenty-fourth aspect, an embodiment of this application provides a computer-readable storage medium. The computer-readable storage medium stores an instruction. When the instruction is run on a computer, the computer is enabled to perform the method according to the third aspect or the possible implementations of the third aspect.

According to a twenty-fifth aspect, an embodiment of this application provides a computer-readable storage medium. The computer-readable storage medium stores an instruction. When the instruction is run on a computer, the computer is enabled to perform the method according to the fourth aspect or the possible implementations of the fourth aspect.

According to a twenty-sixth aspect, an embodiment of this application provides a method for accessing serving network. The method includes: obtaining, by a user plane network element, a multicast service request message, where the multicast service request message is used by a terminal to request to obtain data of a first multicast service provided by a serving network, the multicast service request message includes a first network connection identifier and an identifier of the first multicast service, the first network connection identifier is a network connection identifier used when the terminal accesses the serving network, and the first multicast service is one of at least one multicast service provided by the serving network; determining, by the user plane network element, permission of the terminal for the first multicast service based on the first network connection identifier and the identifier of the first multicast service; and controlling, by the user plane network element based on the permission of the terminal for the first multicast service, a range of data of the first multicast service to the terminal.

According to the method for accessing serving network provided in the twenty-sixth aspect, in a scenario in which the terminal accesses the serving network using an access network (for example, a wireless network), a user plane network element of the access network may control a multicast service of the terminal, expanding a usage scenario of the serving network, and improving user experience.

In a possible implementation, determining, by the user plane network element, permission of the terminal for the first multicast service based on the first network connection identifier and the identifier of the first multicast service includes determining, by the user plane network element, the permission of the terminal for the first multicast service based on the first network connection identifier, the identifier of the first multicast service, and a correspondence between second network connection identifiers and multicast service permission information of the terminal, where the multicast service permission information includes permission of the terminal for the at least one multicast service, the second network connection identifier is a network connection identifier used when the terminal accesses the serving network, and the first network connection identifier is the same as the second network connection identifier, or the first network connection identifier corresponds to the second network identifier.

According to the method for accessing serving network provided in this possible implementation, in a scenario in which the terminal accesses the serving network using an access network (for example, a wireless network), a user plane network element of the access network may control a multicast service of the terminal based on the correspondence between the second network connection identifiers and the multicast service permission information of the terminal, expanding a usage scenario of the serving network, and improving user experience.

In a possible implementation, the method further includes obtaining, by the user plane network element, the correspondence between the second network connection identifiers and the multicast service permission information of the terminal.

In a possible implementation, obtaining, by the user plane network element, the correspondence between the second network connection identifiers and the multicast service permission information of the terminal includes: obtaining, by the user plane network element, the multicast service permission information and the second network connection identifier of the terminal; and establishing, by the user plane network element, the correspondence based on the multicast service permission information and the second network connection identifier of the terminal.

According to the method for accessing serving network provided in this possible implementation, in a scenario in which the terminal accesses the serving network using an access network (for example, a wireless network), a user plane network element of the access network may establish the correspondence between the second network connection identifiers and the multicast service permission information of the terminal, to control a multicast service of the terminal based on the correspondence, expanding a usage scenario of the serving network, and improving user experience.

In a possible implementation, establishing, by the user plane network element, the correspondence based on the multicast service permission information and the second network connection identifier of the terminal includes establishing, by the user plane network element, the correspondence based on a correspondence between identifiers of the terminal and the multicast service permission information of the terminal and a correspondence between the identifiers of the terminal and the second network connection identifiers.

According to the method for accessing serving network provided in this possible implementation, a user plane network element of an access network may establish the correspondence between the second network connection identifiers and the multicast service permission information of the terminal based on the correspondence between the identifiers of the terminal and the multicast service permission information of the terminal and the correspondence between the identifiers of the terminal and the second network connection identifiers, thereby controlling a multicast service of the terminal based on the correspondence, expanding a usage scenario of the serving network, and improving user experience.

In a possible implementation, obtaining, by the user plane network element, the multicast service permission information of the terminal includes receiving, by the user plane network element, the multicast service permission information of the terminal from a session management network element.

According to the method for accessing serving network provided in this possible implementation, in a scenario in which the terminal accesses the serving network using an access network (for example, a wireless network), a user plane network element of the access network may obtain the multicast service permission information of the terminal from the session management network element, thereby establishing the correspondence between the second network connection identifiers and the multicast service permission information of the terminal, and further controlling a multicast service of the terminal based on the correspondence, expanding a usage scenario of the serving network, and improving user experience.

In a possible implementation, obtaining, by the user plane network element, the correspondence between the second network connection identifiers and the multicast service permission information of the terminal includes receiving, by the user plane network element, the correspondence from a session management network element.

According to the method for accessing serving network provided in this possible implementation, in a scenario in which the terminal accesses the serving network using an access network (for example, a wireless network), a user plane network element of the access network may obtain the correspondence between the second network connection identifiers and the multicast service permission information of the terminal from the session management network element, and may further control a multicast service of the terminal based on the correspondence, expanding a usage scenario of the serving network, and improving user experience.

In a possible implementation, when the first network connection identifier corresponds to the second network identifier, determining, by the user plane network element, the permission of the terminal for the first multicast service based on the first network connection identifier, the identifier of the first multicast service, and a correspondence between second network connection identifiers and multicast service permission information of the terminal includes determining, by the user plane network element, the permission of the terminal for the first multicast service based on the first network connection identifier, the identifier of the first multicast service, the correspondence between the second network connection identifiers and the multicast service permission information of the terminal, and a correspondence between the first network connection identifiers and the second network connection identifiers.

According to the method for accessing serving network provided in this possible implementation, when the first network connection identifier is different from the second network identifier, a user plane network element of an access network may obtain, based on the correspondence between the first network connection identifiers and the second network connection identifiers, the second network connection identifier corresponding to the first network connection identifier, and may further control a multicast service of the terminal based on the correspondence between the second network connection identifiers and the multicast service permission information of the terminal, expanding a usage scenario of the serving network, and improving user experience.

In a possible implementation, determining, by the user plane network element, permission of the terminal for the first multicast service based on the first network connection identifier and the identifier of the first multicast service includes: sending, by the user plane network element, the multicast service request message to a session management network element; and receiving, by the user plane network element, a multicast service response message from the session management network element, where the multicast service response message is used to indicate the permission of the terminal for the first multicast service.

According to the method for accessing serving network provided in this possible implementation, in a scenario in which the terminal accesses the serving network using an access network (for example, a wireless network), a user plane network element in the access network may obtain the permission of the terminal for the first multicast service from the session management network element, and may further control a multicast service of the terminal based on the permission of the terminal for the first multicast service, such that a usage scenario of a serving network is expanded, and user experience is improved.

In a possible implementation, the first network connection identifier or the second network connection identifier includes any one of the following: address information assigned by the serving network, a session identifier, or a tunnel endpoint identifier.

According to a twenty-seventh aspect, an embodiment of this application provides a method for accessing serving network. The method includes obtaining, by a session management network element, multicast service permission information of a terminal, where the multicast service permission information includes permission of the terminal for at least one multicast service provided by a serving network.

According to the method for accessing serving network provided in the twenty-seventh aspect, in a scenario in which the terminal accesses the serving network using an access network (for example, a wireless network), a session management network element in the access network may obtain the multicast service permission information of the terminal, such that the access network may control a multicast service of the terminal based on the multicast service permission information of the terminal, a usage scenario of the serving network is expanded, and user experience is improved.

In a possible implementation, the method further includes sending, by the session management network element, the multicast service permission information of the terminal to a user plane network element.

According to the method for accessing serving network provided in this possible implementation, a session management network element of an access network may send the multicast service permission information of the terminal to the user plane network element. Additionally, the user plane network element controls a multicast service of the terminal based on the multicast service permission information of the terminal, expanding a usage scenario of the serving network, and improving user experience.

In a possible implementation, the method further includes: obtaining, by the session management network element, a second network connection identifier, where the second network connection identifier is a network connection identifier used when the terminal accesses the serving network; establishing, by the session management network element, a correspondence between the second network connection identifiers and the multicast service permission information of the terminal based on the multicast service permission information and the second network connection identifier of the terminal; and sending, by the session management network element, the correspondence to a user plane network element.

According to the method for accessing serving network provided in this possible implementation, a session management network element of an access network may send the correspondence between the second network connection identifiers and the multicast service permission information of the terminal to the user plane network element. Additionally, the user plane network element controls a multicast service of the terminal based on the correspondence between the second network connection identifiers and the multicast service permission information of the terminal, expanding a usage scenario of the serving network, and improving user experience.

In a possible implementation, the method further includes: obtaining, by the session management network element, a second network connection identifier, where the second network connection identifier is a network connection identifier used when the terminal accesses the serving network; establishing, by the session management network element, a correspondence between the second network connection identifiers and the multicast service permission information of the terminal based on the multicast service permission information and the second network connection identifier of the terminal; and receiving, by the session management network element, a multicast service request message from a user plane network element, where the multicast service request message is used by the terminal to request to obtain data of a first multicast service provided by the serving network, the multicast service request message includes a first network connection identifier and an identifier of the first multicast service, the first multicast service is one of at least one multicast service provided by the serving network, the first network connection identifier is a network connection identifier used when the terminal accesses the serving network, and the first network connection identifier is the same as the second network connection identifier, or the first network connection identifier corresponds to the second network identifier; determining, by the session management network element, permission of the terminal for the first multicast service based on the first network connection identifier, the identifier of the first multicast service, and the correspondence between the second network connection identifiers and the multicast service permission information of the terminal; and sending, by the session management network element, a multicast service response message to the user plane network element, where the multicast service response message is used to indicate the permission of the terminal for the first multicast service.

According to the method for accessing serving network provided in this possible implementation, a session management network element of an access network may send the permission of the terminal for the first multicast service to the user plane network element. Additionally, the user plane network element controls the first multicast service of the terminal based on the permission of the terminal for the first multicast service, expanding a usage scenario of the serving network, and improving user experience.

In a possible implementation, when the first network connection identifier corresponds to the second network identifier, determining, by the session management network element, permission of the terminal for the first multicast service based on the first network connection identifier, the identifier of the first multicast service, and the correspondence between the second network connection identifiers and the multicast service permission information of the terminal includes determining, by the session management network element, the permission of the terminal for the first multicast service based on the first network connection identifier, the identifier of the first multicast service, the correspondence between the first network connection identifiers and the multicast service permission information of the terminal, and a correspondence between the first network connection identifiers and the second network connection identifiers.

According to the method for accessing serving network provided in this possible implementation, when the first network connection identifier is different from the second network identifier, a session management network element in an access network may obtain, based on the correspondence between the first network connection identifiers and the second network connection identifiers, the second network connection identifier corresponding to the first network connection identifier, thereby determining the permission of the terminal for the first multicast service based on the correspondence between the second network connection identifiers and the multicast service permission information of the terminal, and sending the permission of the terminal for the first multicast service to the user plane network element. Additionally, the user plane network element controls the first multicast service of the terminal based on the permission of the terminal for the first multicast service, such that a usage scenario of a serving network is expanded, and user experience is improved.

In a possible implementation, establishing, by the session management network element, a correspondence between the second network connection identifiers and the multicast service permission information of the terminal based on the multicast service permission information and the second network connection identifier of the terminal includes establishing, by the session management network element, the correspondence between the second network connection identifiers and the multicast service permission information of the terminal based on a correspondence between identifiers of the terminal and the multicast service permission information of the terminal and a correspondence between the identifiers of the terminal and the second network connection identifiers.

According to the method for accessing serving network provided in this possible implementation, a session management network element in an access network may establish the correspondence between the second network connection identifiers and the multicast service permission information of the terminal based on the correspondence between the identifiers of the terminal and the multicast service permission information of the terminal and the correspondence between the identifiers of the terminal and the second network connection identifiers.

In a possible implementation, the first network connection identifier or the second network connection identifier includes any one of the following: address information assigned by the serving network, a session identifier, or a tunnel endpoint identifier.

In a possible implementation, obtaining, by a session management network element, multicast service permission information of a terminal includes obtaining, by the session management network element, the multicast service permission information of the terminal from a data management network element, a policy control network element, a network exposure network element, or a network management network element.

According to the method for accessing serving network provided in this possible implementation, a session management network element in an access network is enabled to obtain the multicast service permission information of the terminal in flexible and diversified manners.

According to a twenty-eighth aspect, an embodiment of this application provides a method for accessing serving network. The method includes: receiving, by a data management network element, multicast service permission information of a terminal, where the multicast service permission information includes permission of the terminal for at least one multicast service provided by the serving network; and using, by the data management network element, the multicast service permission information of the terminal as information about the terminal.

According to the method for accessing serving network provided in the twenty-eighth aspect, when an access network is a wireless network, a data management network element of the access network may store the multicast service permission information of the terminal as the information about the terminal for storage. As such, when the terminal accesses the serving network using the access network, the multicast service permission information of the terminal may be provided for another network element in the access network, to control a multicast service of the terminal, expanding a usage scenario of the serving network, and improving user experience.

According to a twenty-ninth aspect, an embodiment of this application provides a communications apparatus. The communications apparatus includes a processing unit configured to: obtain a multicast service request message; determine permission of the terminal for the first multicast service based on the first network connection identifier and an identifier of the first multicast service; and control, based on the permission of the terminal for the first multicast service, a range of data of the first multicast service from a sending unit to the terminal.

The multicast service request message is used by the terminal to request to obtain data of the first multicast service provided by a serving network. The multicast service request message includes the first network connection identifier and the identifier of the first multicast service, the first network connection identifier is a network connection identifier used when the terminal accesses the serving network, and the first multicast service is one of at least one multicast service provided by the serving network.

In a possible implementation, the processing unit is configured to determine the permission of the terminal for the first multicast service based on the first network connection identifier, the identifier of the first multicast service, and a correspondence between second network connection identifiers and multicast service permission information of the terminal.

The multicast service permission information includes permission of the terminal for the at least one multicast service. The second network connection identifier is a network connection identifier used when the terminal accesses the serving network. The first network connection identifier is the same as the second network connection identifier, or the first network connection identifier corresponds to the second network identifier.

In a possible implementation, the processing unit is further configured to obtain the correspondence between the second network connection identifiers and the multicast service permission information of the terminal.

In a possible implementation, the processing unit is configured to: obtain the multicast service permission information and the second network connection identifier of the terminal; and establish the correspondence based on the multicast service permission information and the second network connection identifier of the terminal.

In a possible implementation, the processing unit is configured to establish the correspondence based on a correspondence between identifiers of the terminal and the multicast service permission information of the terminal and a correspondence between the identifiers of the terminal and the second network connection identifiers.

In a possible implementation, the apparatus further includes a receiving unit.

The processing unit is configured to receive, using the receiving unit, the multicast service permission information of the terminal from a session management network element.

In a possible implementation, the apparatus further includes a receiving unit.

The processing unit is configured to receive, using the receiving unit, the correspondence from a session management network element.

In a possible implementation, when the first network connection identifier corresponds to the second network identifier, the processing unit is configured to determine the permission of the terminal for the first multicast service based on the first network connection identifier, the identifier of the first multicast service, the correspondence between the second network connection identifiers and the multicast service permission information of the terminal, and a correspondence between the first network connection identifiers and the second network connection identifiers.

In a possible implementation, the apparatus further includes a receiving unit.

The processing unit is configured to: send, using the sending unit, the multicast service request message to a session management network element; and receive, using the receiving unit, a multicast service response message from the session management network element, where the multicast service response message is used to indicate the permission of the terminal for the first multicast service.

In a possible implementation, the first network connection identifier or the second network connection identifier includes any one of the following: address information assigned by the serving network, a session identifier, or a tunnel endpoint identifier.

For beneficial effects of the communications apparatus according to the twenty-ninth aspect and the possible implementations of the twenty-ninth aspect, refer to beneficial effects brought by the twenty-sixth aspect and the possible implementations of the twenty-sixth aspect. Details are not described herein again.

According to a thirtieth aspect, an embodiment of this application provides a communications apparatus. The communications apparatus includes: a processing unit configured to obtain multicast service permission information of a terminal, where the multicast service permission information includes permission of the terminal for at least one multicast service provided by a serving network.

In a possible implementation, the apparatus further includes: a sending unit configured to send the multicast service permission information of the terminal to a user plane network element.

In a possible implementation, the apparatus further includes a sending unit.

The processing unit is further configured to: obtain a second network connection identifier; and establish a correspondence between the second network connection identifiers and the multicast service permission information of the terminal based on the multicast service permission information and the second network connection identifier of the terminal, where the second network connection identifier is a network connection identifier used when the terminal accesses the serving network.

The sending unit is configured to send the correspondence to a user plane network element.

In a possible implementation, the apparatus further includes a sending unit and a receiving unit.

The processing unit is further configured to: obtain a second network connection identifier; and establish a correspondence between the second network connection identifiers and the multicast service permission information of the terminal based on the multicast service permission information and the second network connection identifier of the terminal, where the second network connection identifier is a network connection identifier used when the terminal accesses the serving network.

The receiving unit is configured to receive a multicast service request message from a user plane network element, where the multicast service request message is used by the terminal to request to obtain data of a first multicast service provided by the serving network, the multicast service request message includes a first network connection identifier and an identifier of the first multicast service, the first multicast service is one of at least one multicast service provided by the serving network, the first network connection identifier is a network connection identifier used when the terminal accesses the serving network, and the first network connection identifier is the same as the second network connection identifier, or the first network connection identifier corresponds to the second network identifier.

The processing unit is further configured to determine permission of the terminal for the first multicast service based on the first network connection identifier, the identifier of the first multicast service, and the correspondence between the second network connection identifiers and the multicast service permission information of the terminal.

The sending unit is configured to send a multicast service response message to the user plane network element, where the multicast service response message is used to indicate the permission of the terminal for the first multicast service.

In a possible implementation, when the first network connection identifier corresponds to the second network identifier, the processing unit is configured to determine the permission of the terminal for the first multicast service based on the first network connection identifier, the identifier of the first multicast service, the correspondence between the second network connection identifiers and the multicast service permission information of the terminal, and a correspondence between the first network connection identifiers and the second network connection identifiers.

In a possible implementation, the processing unit is configured to: establish the correspondence between the second network connection identifiers and the multicast service permission information of the terminal based on a correspondence between identifiers of the terminal and the multicast service permission information of the terminal and a correspondence between the identifiers of the terminal and the second network connection identifiers.

In a possible implementation, the first network connection identifier or the second network connection identifier includes any one of the following: address information assigned by the serving network, a session identifier, or a tunnel endpoint identifier.

In a possible implementation, the processing unit is configured to obtain the multicast service permission information of the terminal from a data management network element, a policy control network element, a network exposure network element, or a network management network element.

For beneficial effects of the communications apparatus according to the thirtieth aspect and the possible implementations of the thirtieth aspect, refer to beneficial effects brought by the twenty-seventh aspect and the possible implementations of the twenty-seventh aspect. Details are not described herein again.

According to a thirty-first aspect, an embodiment of this application provides a communications apparatus. The communications apparatus includes: a receiving unit configured to receive multicast service permission information of a terminal, where the multicast service permission information includes permission of the terminal for at least one multicast service provided by the serving network; and a processing unit configured to use the multicast service permission information of the terminal as information about the terminal.

For beneficial effects of the communications apparatus according to the thirty-first aspect and the possible implementations of the thirty-first aspect, refer to beneficial effects brought by the twenty-eighth aspect. Details are not described herein again.

According to a thirty-second aspect, an embodiment of this application provides a communications apparatus. The communications apparatus includes a processor and a memory.

The memory is configured to store computer executable program code. The program code includes an instruction. When the processor executes the instruction, the instruction enables the communications apparatus to perform the method for accessing serving network according to the twenty-sixth aspect or the possible implementations of the twenty-sixth aspect.

According to a thirty-third aspect, an embodiment of this application provides a communications apparatus. The communications apparatus includes a processor and a memory.

The memory is configured to store computer executable program code. The program code includes an instruction. When the processor executes the instruction, the instruction enables the communications apparatus to perform the method for accessing serving network according to the twenty-seventh aspect or the possible implementations of the twenty-seventh aspect.

According to a thirty-fourth aspect, an embodiment of this application provides a communications apparatus. The communications apparatus includes a processor and a memory.

The memory is configured to store computer executable program code. The program code includes an instruction. When the processor executes the instruction, the instruction enables the communications apparatus to perform the method for accessing serving network according to the twenty-eighth aspect or the possible implementations of the twenty-eighth aspect.

According to a thirty-fifth aspect, an embodiment of this application provides a communications apparatus, including a unit, a module, or a circuit that is configured to perform the method according to the twenty-sixth aspect or the possible implementations of the twenty-sixth aspect. The communications apparatus may be a user plane network element (for example, a user plane function (UPF) network element), or may be a module applied to a user plane network element, for example, may be a chip applied to the user plane network element.

According to a thirty-sixth aspect, an embodiment of this application provides a communications apparatus, including a unit, a module, or a circuit that is configured to perform the method according to the twenty-sixth aspect or the possible implementations of the twenty-sixth aspect. The communications apparatus may be a session management network element (for example, a session management (SMF) network element), or may be a module applied to a session management network element, for example, may be a chip applied to the session management network element.

According to a thirty-seventh aspect, an embodiment of this application provides a communications apparatus, including a unit, a module, or a circuit that is configured to perform the method according to the twenty-seventh aspect or the possible implementations of the twenty-seventh aspect. The communication apparatus may be a network element that is configured to store multicast service permission information of a terminal and that is on an access network side, or may be a module applied to a network element that is configured to store multicast service permission information of a terminal and that is on an access network side, for example, may be a chip applied to the network element that is configured to store the multicast service permission information of the terminal and that is on the access network side. Herein, the network element that is configured to store the multicast service permission information of the terminal and that is on the access network side may be, for example, a data management network element (for example, a unified data management (UDM) network element), a policy control network element (for example, a policy control function (PCF) network element), a network exposure network element (for example, a network exposure function (NEF) network element), or a network management network element (for example, a network management system (NMS) network element).

According to a thirty-eighth aspect, an embodiment of this application provides a computer program product including an instruction. When the computer program product is run on a computer, the computer is enabled to perform the method according to the twenty-sixth aspect or the possible implementations of the twenty-sixth aspect.

According to a thirty-ninth aspect, an embodiment of this application provides a computer program product including an instruction. When the computer program product is run on a computer, the computer is enabled to perform the method according to the twenty-seventh aspect or the possible implementations of the twenty-seventh aspect.

According to a fortieth aspect, an embodiment of this application provides a computer program product including an instruction. When the computer program product is run on a computer, the computer is enabled to perform the method according to the twenty-eighth aspect or the possible implementations of the twenty-eighth aspect.

According to a forty-first aspect, an embodiment of this application provides a computer-readable storage medium. The computer-readable storage medium stores an instruction. When the instruction is run on a computer, the computer is enabled to perform the method according to the twenty-sixth aspect or the possible implementations of the twenty-sixth aspect.

According to a forty-second aspect, an embodiment of this application provides a computer-readable storage medium. The computer-readable storage medium stores an instruction. When the instruction is run on a computer, the computer is enabled to perform the method according to the twenty-seventh aspect or the possible implementations of the twenty-seventh aspect.

According to a forty-third aspect, an embodiment of this application provides a computer-readable storage medium. The computer-readable storage medium stores an instruction. When the instruction is run on a computer, the computer is enabled to perform the method according to the twenty-eighth aspect or the possible implementations of the twenty-eighth aspect.

The method for accessing serving network and the communications apparatus according to the embodiments of this application enable the terminal to access the serving network using the access network (for example, the wireless network), and the usage scenario of the serving network is expanded.

DESCRIPTION OF EMBODIMENTS

Figure 1:
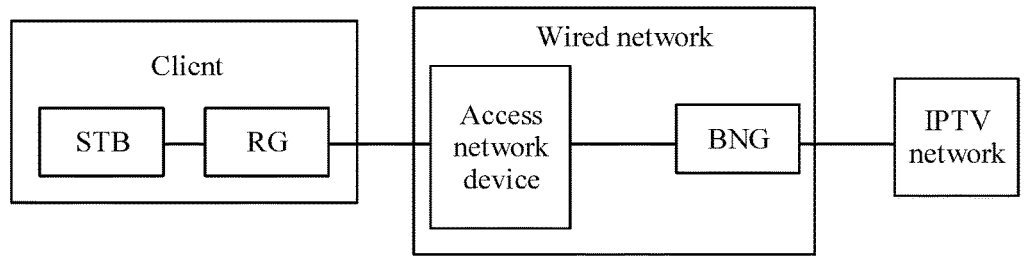
FIG. 1 is a network architecture diagram of accessing an IPTV network by a terminal in other approaches.

FIG. 1 is a network architecture diagram of accessing an IPTV network by a terminal in other approaches. As shown in FIG. 1, in other approaches, a set-top box (STB) and a residential gateway (RG) are configured for a client. A wired network includes an access network (AN) device and a broadband network gateway (BNG). The RG may access the IPTV network using the wired network. After the RG accesses the IPTV network, the STB connected to the RG may obtain, using the RG, data provided by the IPTV network.

Figure 2:
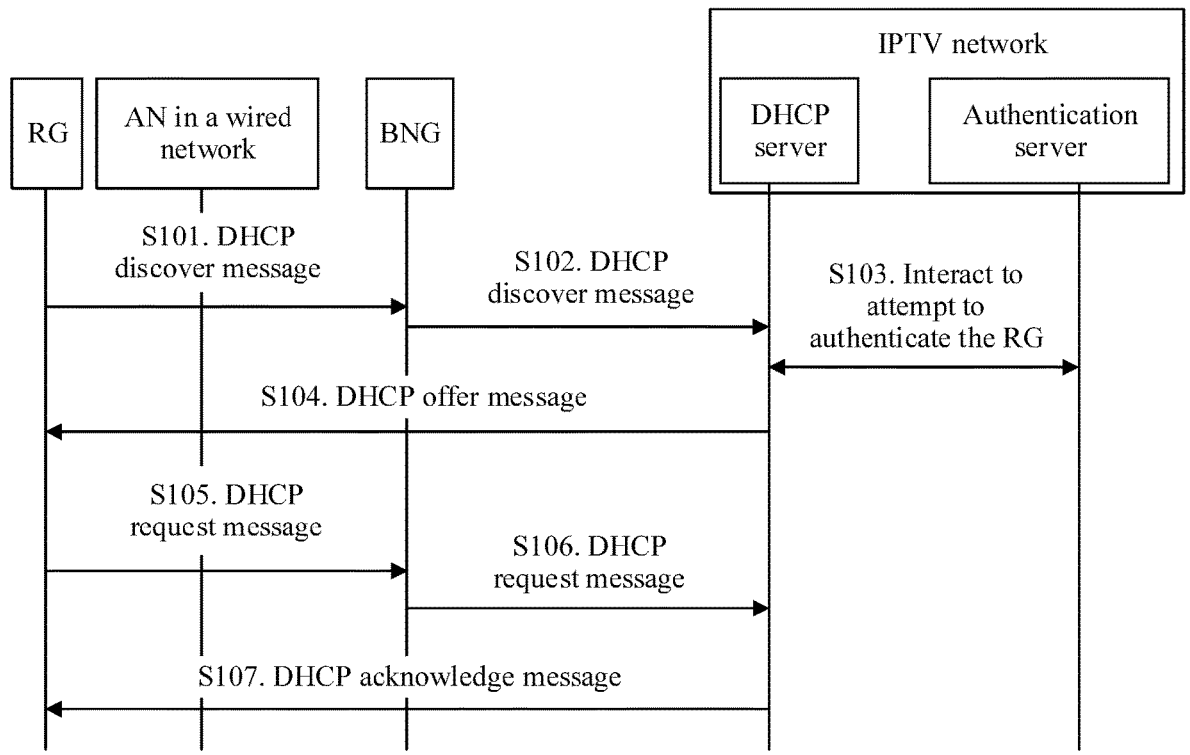
FIG. 2 is a flowchart of an existing method used by a terminal to access an IPTV network.

FIG. 2 is a flowchart of an existing method used by a terminal to access an IPTV network. As shown in FIG. 2, an RG interacts with a dynamic host configuration protocol (DHCP) server in the IPTV network using a wired network, to access the IPTV network.

S101. The RG sends a DHCP discover message to a BNG.

The DHCP discover message requests the DHCP server to authenticate the RG.

S102. The BNG sends a DHCP discover message to the DHCP server.

The DHCP discover message includes a line identification (Line ID) of the RG.

The BNG stores the line ID of the RG. The line ID is an identifier of the RG in the IPTV network. Therefore, before sending the DHCP discover message to the DHCP server, the BNG adds a sub-option, to be more specific, option 82, to the DHCP discover message. The sub-option, to be more specific, option 82, includes the line ID of the RG. In other words, the DHCP discover message from the BNG to the DHCP server includes the line ID of the RG.

S103. The DHCP server interacts with an authentication server of the IPTV network to authenticate the RG.

For example, the DHCP server may send an authentication request message to the authentication server. The authentication request message includes the line ID of the RG. After receiving the authentication request message, the authentication server may query a local database of the authentication server based on the line ID of the RG that is carried in the authentication request message. If the line ID of the RG exists in the local database, it indicates that the RG may use a service of the IPTV network, that is, the RG has been authenticated. In this scenario, the authentication server may send an authentication success message to the DHCP server. The authentication success message is used to indicate that the RG has been authenticated. When the RG has been authenticated, the DHCP server may further perform a subsequent step S104.

If the authentication server does not find the line ID of the RG in the local database, it indicates that the RG cannot use the service of the IPTV network, that is, the RG fails to be authenticated. In this scenario, the authentication server may send an authentication failure message to the DHCP server. The authentication failure message is used to indicate that the RG fails to be authenticated. When the RG fails to be authenticated, the DHCP server may send, to the RG, a DHCP message used to indicate that the RG fails to be authenticated. After receiving the DHCP message, the RG may re-initiate an access procedure. That is, step S101 is performed again. The procedure is not shown in FIG. 1.

During implementation, the authentication server of the IPTV network may be, for example, an authentication, authorization and accounting (AAA) server.

S104. The DHCP server sends a DHCP offer message to the RG.

The DHCP offer message includes an Internet protocol (IP) address assigned by the DHCP server to the RG, that is, an IP address of the RG in the IPTV network. Therefore, in some embodiments, the IP address may also be referred to as an IP address assigned by the IPTV network to the RG.

During implementation, the DHCP server may send the DHCP offer message to the RG using the BNG. Details are not described herein again.

S105. The RG sends a DHCP request message to the BNG.

The DHCP request message is used to query the DHCP server whether the assigned IP address is available. The procedure is used to prevent a case in which the DHCP server assigns a same IP address to two RGs for use, and consequently the RGs cannot use the IP address to access the IPTV network.

S106. The BNG sends a DHCP request message to the DHCP server.

Before sending the DHCP request message to the DHCP server, the BNG adds the sub-option, to be more specific, option 82, to the DHCP request message. The sub-option, to be more specific, option 82, includes the line ID of the RG.

S107. The DHCP server sends a DHCP acknowledge message to the RG.

The DHCP acknowledge message is used to notify the RG that the assigned IP address is available.

When determining that the IP address assigned to the RG does not conflict with an IP address of another RG, the DHCP server determines that the IP address is available. In this scenario, the DHCP server may send the DHCP acknowledge message to the RG using the BNG. The DHCP acknowledge (Ack) message includes the IP address assigned by the DHCP server to the RG, to notify, using the IP address, the RG that the assigned IP address is available.

It should be noted that if the DHCP server determines that the IP address assigned to the RG conflicts with the IP address of the other RG, the DHCP server determines that the IP address is unavailable. In this scenario, the DHCP server may send, to the RG, a DHCP message used to indicate that the IP address is unavailable. After receiving the DHCP message, the RG may re-initiate an access procedure. That is, step S101 is performed again. The procedure is not shown in FIG. 1.

Till now, a procedure of accessing the IPTV network by the RG using the wired network is completed. After the RG accesses the IPTV network, an STB connected to the RG can obtain, using the RG, data provided by the IPTV network, and provide the data for a user.

However, other approaches relate only as to how the RG accesses the IPTV network using the wired network, and do not relate as to how the RG accesses the IPTV network in another network (for example, a wireless network). Therefore, an existing manner of accessing the IPTV network by the RG cannot meet an actual use requirement.

In consideration of the foregoing problem, embodiments of this application provide a method for accessing serving network, such that the RG can access the IPTV network using another network (for example, the wireless network). The other network herein may be a wired network, the wireless network, a private network, a MulteFire network, or the like. The wireless network herein may be, for example, a 3rd generation partnership project (3GPP) wireless network or a non-3GPP wireless network. The 3GPP wireless network may be, for example, a long term evolution (LTE) network, a home (e)NodeB network, or the like. The non-3GPP wireless network may be, for example, a wireless network accessed using Wi-Fi, a global system for mobile communications (GSM) network, a wideband code division multiple access (WCDMA) network, a $5^{th}$ Generation (5G)/$6^{th}$ Generation (6G) network, or a fixed wireless.

It may be understood in the art that the method provided in the embodiments of this application includes but is not limited to a scenario in which the RG accesses the IPTV network. The method provided in the embodiments of this application may be used in any scenario in which a terminal accesses a serving network. The terminal herein may be, for example, an STB, an RG, a customer-premises equipment (CPE), a terminal in internet of things (IoT), a computer with a wireless transceiver function, a wireless terminal in a smart home, or the like. The serving network herein may be any network that can provide a service for the user, for example, an Internet network, an IPTV network, an IP multimedia subsystem (IMS) network, or a telephone network.

Figure 3:
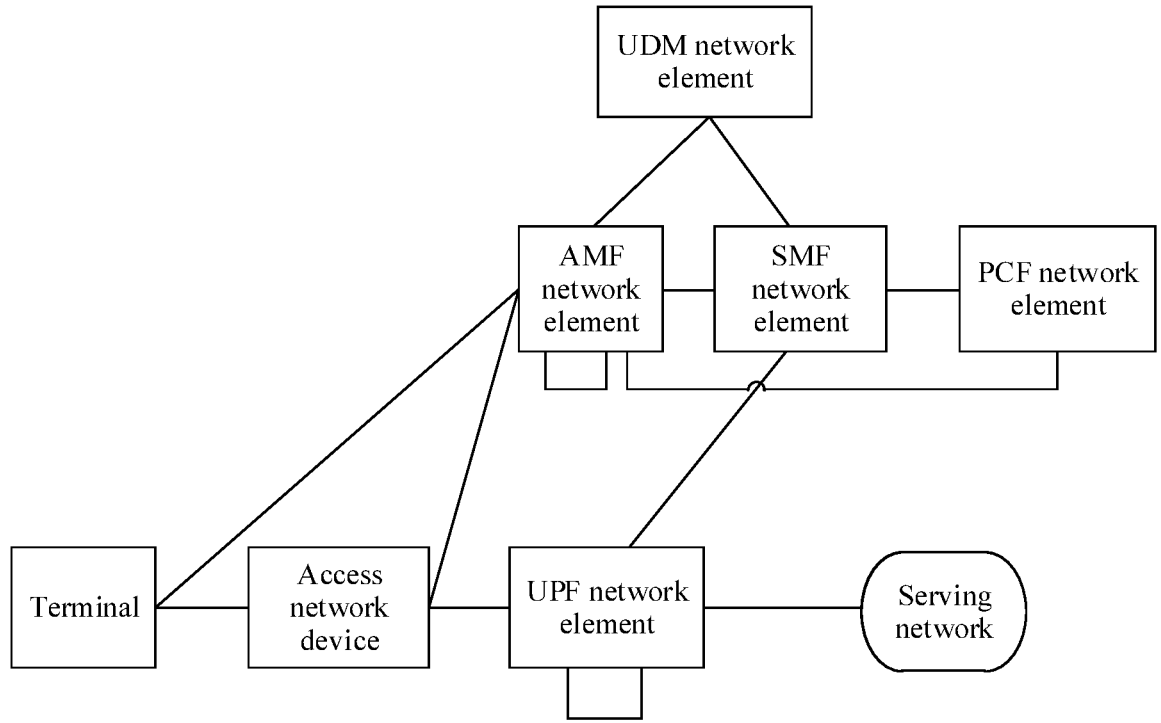
FIG. 3 is a network architecture diagram of accessing a serving network by a terminal according to an embodiment of this application.

To facilitate understanding of the embodiments of this application, the following describes a network architecture in the embodiments of this application. FIG. 3 is a network architecture diagram of accessing a serving network by a terminal according to an embodiment of this application. As shown in FIG. 3, the network may include an access network device, a user plane function (UPF) network element, an access and mobility management function (AMF) network element, a session management function (SMF) network element, a policy control function (PCF) network element, and a unified data management (UDM) network element.

The access network device is configured to enable the terminal to access a core network. When the network shown in FIG. 3 is a wired network, the access network device may be a fixed access network (AGF) network element or a BNG. When FIG. 3 shows a private network, the access network device may be a private network user plane network element. When the network shown in FIG. 3 is a MulteFire network, the access network device may be a MulteFire network user plane network element. When the network shown in FIG. 3 is an untrusted non-3GPP network, the access network device may be a non-3GPP interworking function (N3IWF) network element. When the network shown in FIG. 3 is a trusted non-3GPP access network, the access network device may be a trusted access gateway. When the network shown in FIG. 3 is a wireless network, the access network device may be a radio access network device. The radio access network device herein is an access device used by the terminal to access the mobile communications system in a wireless manner, and may be a network side NodeB, an evolved network side eNodeB, a network side in a 5G mobile communications system, a network side in a future mobile communications system, an access node in a Wi-Fi system, or the like. A specific technology and a specific device form that are used by the radio access network device are not limited in this embodiment of this application.

The UPF network element is configured to transmit user plane data. The AMF network element is configured to manage whether the terminal can access the network. The SMF network element is configured to manage session connections established by the terminal using the network, and each session connection is used to transmit user plane data of the terminal. The PCF network element is configured to provide a policy for accessing the network by the terminal, for example, a quality of service (QoS) policy. The UDM network element is configured to store subscription data of the terminal.

Based on an architecture of the network shown in FIG. 3, the following describes in detail, using some embodiments, how the terminal accesses the serving network. The following several embodiments may be combined with each other, and a same or similar concept or process may not be described repeatedly in some embodiments. For ease of distinguishing the network shown in FIG. 3 from the serving network, the network shown in FIG. 3 is referred to as a network for the terminal accessing the serving network in the following embodiments, and is referred to as an access network for short.

In the embodiments of this application, after completing registration in the access network, the terminal may first establish a session in the access network. Then, the terminal may access the serving network using the session. That is, a procedure of accessing the serving network by the terminal includes two parts: a session establishment part and a serving network access part. It may be understood that, for a procedure of registering by the terminal in the access network, refer to other approaches. Details are not described herein.

A process in which the terminal accesses the serving network involves the following network elements: a session management network element (for example, an SMF network element), a user plane network element (an intermediate transmission network element used when the terminal performs data transmission with the serving network using the access network, for example, a UPF network element or an access network device), a policy control network element (for example, a PCF network element), a data management network element (for example, a UDM network element or a unified data repository (UDR) network element), and an access management network element (for example, an AMF network element).

Figure 4:
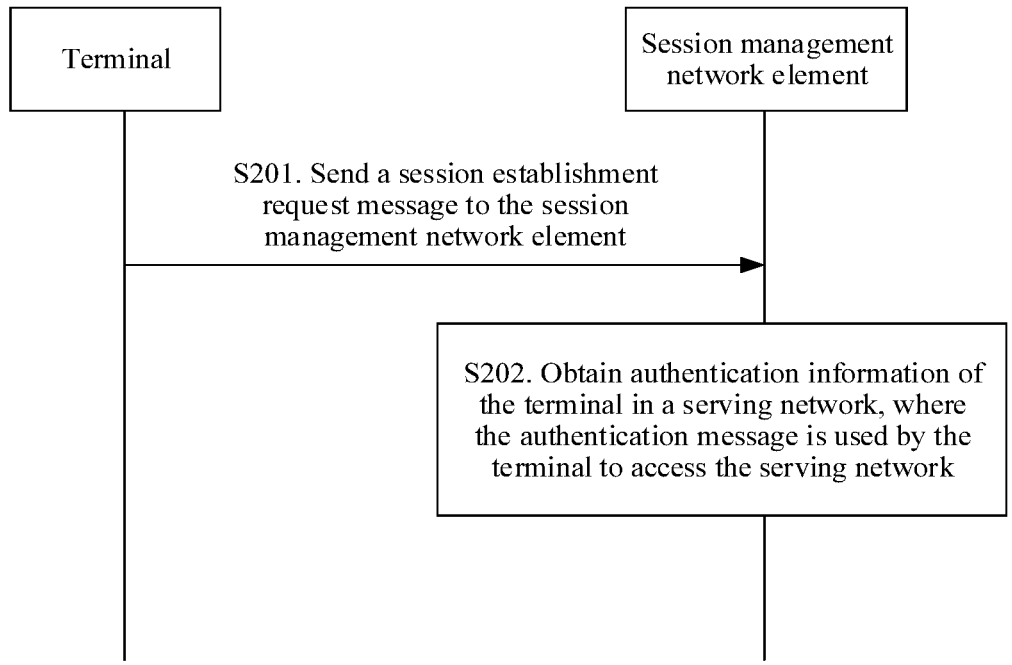
FIG. 4 is a flowchart of a method for accessing serving network according to an embodiment of this application.

The following describes how the terminal establishes a session in the access network. FIG. 4 is a flowchart of a method for accessing serving network according to an embodiment of this application. As shown in FIG. 4, the method includes the following steps.

S201. A terminal sends a session establishment request message to a session management network element.

S202. The session management network element obtains authentication information of the terminal in a serving network, where the authentication request message is for the terminal accessing the serving network.

For example, when determining to establish a session, the terminal may send a session establishment request to the session management network element, to request the session management network element to establish the session. In this way, the terminal may perform data transmission with the serving network using the session. The session establishment request message may carry first identification information of the terminal and identification information of the serving network. The first identification information of the terminal herein may be, for example, one or more of an ID of the terminal, an international mobile subscriber identity (IMSI) of the terminal, a generic public subscription identifier (GPSI) of the terminal, or a mobile station international subscriber directory number (MSISDN) of the terminal. The identification information of the serving network herein may be, for example, an ID of the serving network and/or a name of the serving network. In some embodiments, the name of the serving network may also be referred to as a data network name (DNN).

In a possible implementation, the terminal may determine, when completing a registration procedure in an access network, to establish the session. Alternatively, the terminal may determine, when receiving data of the serving network from a client, to establish the session. For example, the terminal may determine, when receiving an internet group management protocol (IGMP) message from the client, to establish the session. The client herein may be understood as a device that obtains, using the terminal, a service provided by the serving network.

After receiving the session establishment request message from the terminal, the session management network element may establish the session with the terminal. For how the session management network element establishes the session with the terminal, refer to other approaches. Details are not described in this embodiment of this application.

In this embodiment, in a process of establishing the session with the terminal, the session management network element may obtain the authentication information of the terminal in the serving network. In this way, when the terminal accesses the serving network, the serving network may authenticate the terminal based on the authentication information. The authentication information of the terminal in the serving network may be, for example, a line ID of the terminal, a media access control (MAC) address of the terminal, type information of the terminal, level information of the terminal, and user name information used when the terminal accesses the serving network. The line ID may include, for example, a circuit ID or a remote ID. The type information and the level information may be determined based on configurations in a communications system. This is not limited in this embodiment of this application.

A manner in which the session management network element obtains the authentication information of the terminal in the serving network is not limited in this embodiment. In a possible implementation, a local database of the session management network element stores the authentication information of the terminal in the serving network. Therefore, the session management network element may obtain the authentication information of the terminal in the serving network from the local database. For example, the local database of the session management network element may store a mapping relationship between the first identification information of the terminal and the authentication information of the terminal in the serving network. Therefore, the session management network element may search, based on the first identification information of the terminal that is carried in the session establishment request message, the local database for authentication information (that is, the authentication information of the terminal in the serving network) corresponding to the first identifier information.

In another possible implementation, the session management network element may obtain the authentication information from another network element that stores the authentication information of the terminal in the serving network. The other network element herein may be, for example, a policy control network element, a data management network element, or an access management network element. For example, the session management network element may send a query request to another network element, and the query request may include the first identification information of the terminal. The other network element queries, based on the first identification information of the terminal, a local database of the other network element for authentication information (that is, the authentication information of the terminal in the serving network) corresponding to the first identification information of the terminal. Then, the other network element may return a query response message to the session management network element. The query response message may include the authentication information of the terminal in the serving network.

In this implementation, before the foregoing method embodiment is performed, the network element that stores the authentication information of the terminal in the serving network may further receive the authentication information of the terminal in the serving network, and use the authentication information as information about the terminal. During implementation, when a user subscribes to a service of the serving network, a serving network management system network element on a serving network side or an access network management system network element on an access network side may generate the authentication information of the terminal in the serving network, and send a subscription request message to the network element that needs to store the authentication information, to notify the network element that the terminal has subscribed to the service of the serving network. The subscription request message may include the authentication information of the terminal in the serving network and the first identification information of the terminal. After receiving the subscription request message, the network element that needs to store the authentication information may store the authentication information as the information about the terminal. For example, the network element that needs to store the authentication information is a data management network element. After receiving the subscription request, the data management network element may search, based on the first identification information of the terminal, for subscription information of the terminal that is stored in a local database, and adds the authentication information of the terminal in the serving network to the subscription information of the terminal. A policy control network element is used as an example. After receiving the subscription request, the policy control network element may search, based on the first identification information of the terminal, for policy information of the terminal that is stored in a local database, and add the authentication information of the terminal in the serving network to the policy information of the terminal.

It may be understood that, when the access network management system network element performs an operation of generating the authentication information of the terminal in the serving network, the serving network management system network element may send a subscription request message to the access network management system network element when the user subscribes to the service of the serving network, to trigger, by notifying the access network management system network element that the terminal has subscribed to the service of the serving network, the access network management system network element to perform the operation of generating the authentication information of the terminal in the serving network. Correspondingly, after generating the authentication information of the terminal in the serving network, the access network management system network element may further send a subscription response message to the serving network management system network element. The message may include the authentication information of the terminal in the serving network.

It may be understood that the subscription request message and the subscription response message are merely examples, and do not constitute a limitation on a message. During implementation, the subscription request message may be replaced with any other message that includes the authentication information of the terminal in the serving network and the first identification information of the terminal, and the subscription response message may be replaced with any other message that includes the authentication information of the terminal in the serving network. This is not limited. Subsequently, the application document uses the subscription request message and the subscription response message as examples to describe the method provided in the embodiments of this application.

The foregoing serving network management system network element may be a business and operation support system (BOSS) network element in the serving network, a business support system (BSS) network element in the serving network, a media entertainment middleware (MEM) network element, a subscriber management system (SMS) network element in the serving network, or the like. The foregoing access network management system network element may be a network management system (NMS) network element of the access network, an operation support system (OSS) network element of the access network, a BSS network element of the access network, a unified data repository (UDR) network element of the access network, an access management function (AMF) network element of the access network, a session management function (SMF) network element of the access network, or a policy control function (PCF) network element of the access network.

In the foregoing two manners of generating the authentication information of the terminal in the serving network, after generating the authentication information of the terminal in the serving network, or after obtaining the authentication information of the terminal in the serving network by receiving the subscription response message from the access network management system network element, the serving network management system network element may send the authentication information of the terminal in the serving network to another network element that is in the serving network and that is configured to store the information about the terminal, for unified storage. For example, the serving network management system network element is a BOSS network element, and the other network element configured to store the information about the terminal is an SMS network element.

Further, the session management network element may further obtain the identification information of the serving network based on the session establishment request message in the process of establishing the session with the terminal. Further, the session management network element may determine, based on the identification information of the serving network, a policy control network element for providing a policy for the serving network. In this way, the session management network element may notify the policy control network element that the terminal is to obtain a service from the serving network. For example, the session management network element may send a notification message to the policy control network element. The notification message carries the identification information of the serving network and the first identification information of the terminal. After receiving the notification message, the policy control network element may determine that the terminal is to obtain the service from the serving network. Correspondingly, the policy control network element may send a policy of the serving network that corresponds to the terminal to the session management network element. The policy of the serving network herein may include, for example, quality of service (QoS) of data of the serving network.

After establishing the session for the terminal, the session management network element may send a session establishment response message to the terminal, to notify the terminal that the session has been established. Till now, a procedure of a session establishment part of accessing the serving network by the terminal is completed.

In a possible implementation, if the session establishment request message includes instruction information used to instruct the terminal to obtain an IP address from the serving network, the session management network element no longer performs an operation of assigning an IP address to the terminal in the process of establishing the session with the terminal. In this implementation, the session establishment response message from the session management network element to the terminal does not include address information assigned by the session management network element. The instruction information may include, for example, instruction information for IP address allocation via DHCP (IP allocation via DHCP) and/or identification information of an Ethernet type of a session.

In a possible implementation, if the session establishment request message does not include instruction information used to instruct the terminal to obtain an IP address from the serving network, the session management network element further needs to assign a first address (that is, an IP address of the terminal in the access network) to the terminal in the process of establishing the session with the terminal. Then, the session management network element may add first address information to the session establishment response message and send the first address information to the terminal, to indicate, using the session establishment response message, the first address information assigned to the terminal and that the session management network element has established the session with the terminal.

After receiving the session establishment response message, that is, after establishing the session, the terminal may start to perform a procedure of a serving network access part, to access the serving network using the session. For example, the terminal may send an initial access message to the access network, to request to access the serving network. The initial access message does not include the authentication information of the terminal in the serving network. In a possible implementation, the terminal may immediately send the initial access message to the serving network after establishing the session. Alternatively, after establishing the session, the terminal may send the initial access message to the serving network when receiving the data (for example, the IGMP message) of the serving network from the client.

After the terminal may send the initial access message to the access network, a user plane network element may obtain an access message that carries the authentication information of the terminal in the serving network, and send the access message to the serving network. It may be understood that the access message and the initial access message that is sent from the terminal may be determined based on a specific serving network. For example, if the serving network is an IPTV network, the access message and the initial access message may be DHCP version 4 (DHCPv4) messages, for example, the DHCP discover message or the DHCP request message that is shown in FIG. 2. The access message and the initial access message may alternatively be DHCP version 6 (DHCPv6) messages, for example, a DHCP solicit message or a DHCP request message. In this embodiment of this application, a difference between the access message and the initial access message lies in that the access message includes the authentication information of the terminal in the serving network, and the initial access message does not include the authentication information of the terminal in the serving network.

Figure 5:
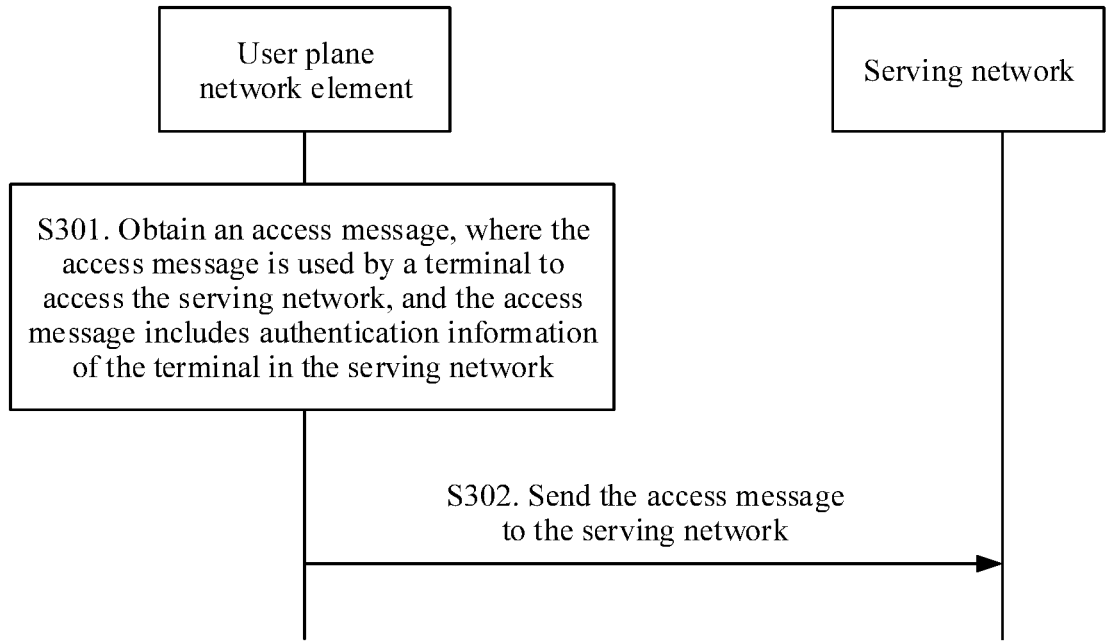
FIG. 5 is a flowchart of another method for accessing serving network according to an embodiment of this application.

The following describes how the user plane network element obtains the access message. FIG. 5 is a flowchart of another method for accessing serving network according to an embodiment of this application. As shown in FIG. 5, the method includes the following steps.

S301. A user plane network element obtains an access message, where the access message is for a terminal accessing a serving network, and the access message includes authentication information of the terminal in the serving network.

S302. The user plane network element sends the access message to the serving network.

In a possible implementation, a session management network element may send the obtained authentication information of the terminal in the serving network to the user plane network element in a process of establishing a session with the terminal. In this way, after receiving an initial access message from the terminal, the user plane network element may obtain, based on the initial access message and the authentication information of the terminal in the serving network, the access message that carries the authentication information of the terminal in the serving network. For example, the user plane network element may add the authentication information of the terminal in the serving network to an option of an initial access message, to obtain the access message.

An IPTV network is used as an example. If the authentication information of the terminal in the serving network is a line ID of the terminal, the user plane network element may add the line ID of the terminal to a sub-option, to be more specific, option 82, of a DHCP message. If the authentication information of the terminal in the serving network is a MAC address of the terminal, the user plane network element may add the MAC address of the terminal to a sub-option, to be more specific, option 61, of the DHCP message. If the authentication information of the terminal in the serving network is type information of the terminal, the user plane network element may add the type information of the terminal to a sub-option, to be more specific, option 60, of the DHCP message. If the authentication information of the terminal in the serving network is level information of the terminal, the user plane network element may add the level information of the terminal to a sub-option, to be more specific, option 77, of the DHCP message.

In a possible implementation, after receiving an initial access message from the terminal, a session management network element may obtain, based on the initial access message and the authentication information of the terminal in the serving network that is obtained in a process of establishing a session with the terminal, the access message that carries the authentication information of the terminal in the serving network. Then, the session management network element may send the access message to the user plane network element, such that the user plane network element obtains the access message. For how the session management network element obtains the access message based on the initial access message and the authentication information of the terminal in the serving network, refer to the foregoing description of obtaining, by the user plane network element, the access message based on the initial access message and the authentication information of the terminal in the serving network. Details are not described herein again.

After sending the access message to the serving network, the user plane network element may obtain a feedback message of the access message from the serving network. Then, the user plane network element may send the feedback message to the terminal, to assist the terminal in accessing the serving network. The feedback message herein may be determined based on the sent access message. For example, the serving network is an IPTV network, if the access message is a DHCP discover message of a DHCPv4 message, the feedback message may be a DHCP offer message of the DHCPv4 message. If the access message is a DHCP request message of the DHCPv4 message, the feedback message may be a DHCP acknowledge (Ack) message of the DHCPv4 message. If the access message is a DHCP solicit message of a DHCPv6 message, the feedback message may be a DHCP advertise message of the DHCPv6 message. If the access message is a DHCP request message of the DHCPv6 message, the feedback message may be a DHCP reply message of the DHCPv6 message.

The user plane network element may send the feedback message to the terminal in the following two manners. Details are as follows.

Figure 6:
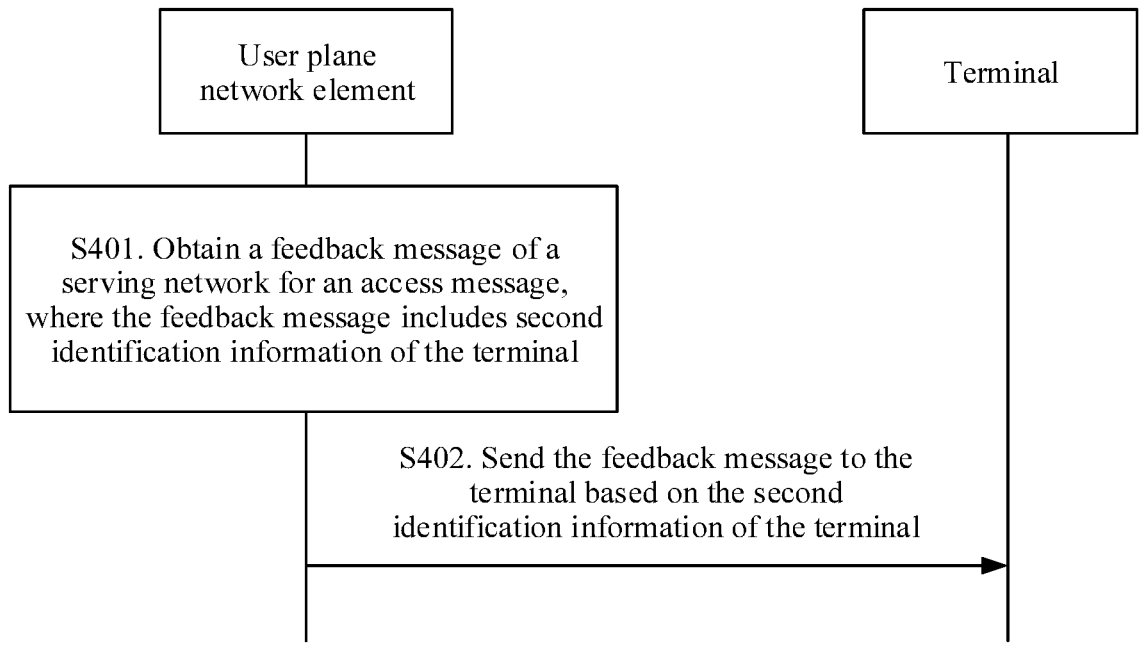
FIG. 6 is a flowchart of still another method for accessing serving network according to an embodiment of this application.

Manner 1: The user plane network element may send the feedback message to the terminal based on second identification information of the terminal that is carried in the feedback message. FIG. 6 is a flowchart of still another method for accessing serving network according to an embodiment of this application. As shown in FIG. 6, the method includes the following steps.

S401. A user plane network element obtains a feedback message of a serving network for an access message, where the feedback message includes second identification information of a terminal.

S402. The user plane network element sends the feedback message to the terminal based on the second identification information of the terminal.

In this embodiment, a mapping relationship between the second identification information of the terminal and session information of the terminal is configured in the user plane network element. The second identification information of the terminal herein may be, for example, a line ID of the terminal or an Xid of the terminal. The session information of the terminal herein may be one of the following: identification information of a session of the terminal, a MAC address of the terminal, address information of an access network device, identification information of the access network device, a tunnel endpoint identifier (TEID) of the terminal, and core network tunnel information. The user plane network element may determine, based on the mapping relationship, a session used to transmit the feedback message.

Therefore, after receiving the feedback message of the access message from the serving network, the user plane network element may determine the session information of the terminal based on the second identification information of the terminal that is included in the feedback message and the mapping relationship between the second identification information of the terminal and the session information of the terminal. Then, the user plane network element may send the feedback message to the terminal through a session corresponding to the session information of the terminal. It should be noted that the second identification information of the terminal is used by the user plane network element to determine the session for transmitting the feedback message. Therefore, before sending the feedback message to the terminal, the user plane network element may delete the second identification information of the terminal that is carried in the feedback message. In this case, the feedback message from the user plane network element to the terminal is different from the feedback message obtained by the user plane network element. Certainly, the user plane network element may alternatively not perform an operation of deleting the second identification information of the terminal. This may be determined based on configurations in a communications system.

A manner of configuring the mapping relationship between the second identification information of the terminal and the session information of the terminal in the user plane network element is not limited in this embodiment. In a possible implementation, a session management network element may obtain the second identification information of the terminal and the session information of the terminal, establish the mapping relationship between the second identification information of the terminal and the session information of the terminal based on the obtained two pieces of information, and send the mapping relationship to the user plane network element. After receiving the mapping relationship, the user plane network element may directly store the mapping relationship. Alternatively, a session management network element may send obtained second identification information of the terminal and session information of the terminal to the user plane network element. After receiving the two pieces of information, the user plane network element may establish the mapping relationship between the second identification information of the terminal and the session information of the terminal. Alternatively, when establishing a session with the terminal, a session management network element may obtain the session information of the terminal, and send the session information of the terminal to the user plane network element. When the terminal accesses the serving network, the user plane network element may obtain an initial access message from the terminal and that carries the second identification information of the terminal. Then, the user plane network element may establish the mapping relationship between the second identification information of the terminal and the session information of the terminal.

For example, if the second identification information of the terminal is the Xid of the terminal, the session management network element may obtain the second identification information of the terminal by receiving the initial access message from the terminal and that carries the Xid of the terminal (that is, the second identification information of the terminal). If the second identification information of the terminal is the line ID of the terminal, the session management network element may obtain the line ID of the terminal (that is, the second identification information of the terminal) from a data management network element, a policy control network element, a local database, or an access management network element in a process of establishing the session with the terminal. It may be understood that when both the second identification information of the terminal and the foregoing authentication information of the terminal in the serving network are the line ID of the terminal, obtaining, by the session management network element, the second identification information of the terminal and obtaining the authentication information of the terminal in the serving network are a same operation.

Figure 7:
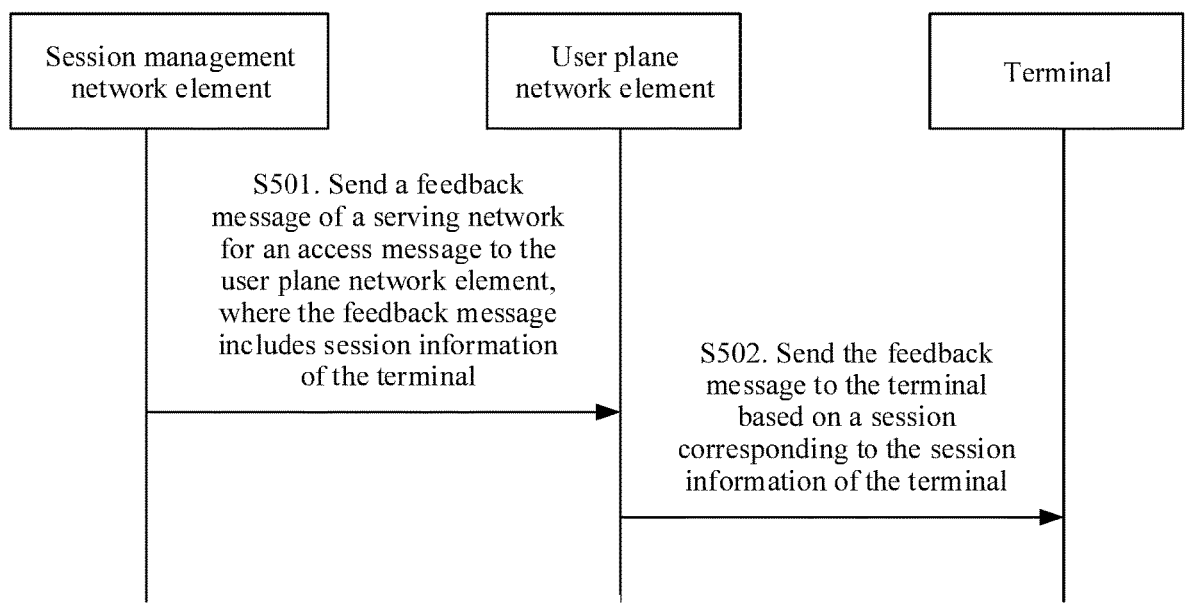
FIG. 7 is a flowchart of still another method for accessing serving network according to an embodiment of this application.

Implementation 2: The user plane network element may send the feedback message to the terminal based on session information of the terminal that is carried in the feedback message. FIG. 7 is a flowchart of still another method for accessing serving network according to an embodiment of this application. As shown in FIG. 7, the method includes the following steps.

S501. A session management network element sends a feedback message of a serving network for an access message to a user plane network element, where the feedback message includes session information of a terminal.

S502. The user plane network element sends the feedback message to the terminal based on a session corresponding to the session information of the terminal.

In this embodiment, a mapping relationship between second identification information of the terminal and the session information of the terminal is configured in the session management network element. Therefore, after receiving the feedback message of the access message from the serving network, the session management network element may determine the session information of the terminal based on the second identification information of the terminal and the mapping relationship between the second identification information of the terminal and the session information of the terminal. Then, the session management network element may add the session information to the feedback message, and send the session information to the user plane network element. In this way, after receiving the feedback message, the user plane network element may directly determine, using the session information of the terminal, a session that can be used to transmit the feedback message, and send the feedback message to the terminal using the session. For details about how the session management network element establishes the mapping relationship between the second identification information of the terminal and the session information of the terminal, refer to the description in the foregoing embodiment. Details are not described herein again.

It should be noted that because the second identification information of the terminal is used by the session management network element to determine the session for transmitting the feedback message, before sending the feedback message to the user plane network element, the session management network element may delete the second identification information of the terminal that is carried in the feedback message. In this case, the feedback message from the session management network element to the user plane network element is different from the feedback message obtained by the session management network element. Certainly, the session management network element may alternatively not perform an operation of deleting the second identification information of the terminal. This may be determined based on configurations in a communications system. In addition, because the session information of the terminal that is included in the feedback message is used by the user plane network element to determine the session for transmitting the feedback message, before sending the feedback message to the terminal, the user plane network element may delete the session information of the terminal that is carried in the feedback message. In this case, the feedback message from the user plane network element to the terminal is different from the feedback message received by the user plane network element. Certainly, the user plane network element may alternatively not perform an operation of deleting the session information of the terminal. This may be determined based on the configurations in the communications system.

As described in the foregoing embodiment, if a session establishment request message from the terminal to the session management network element does not include instruction information used to instruct the terminal to obtain an IP address from the serving network, in a process of establishing a session with the terminal, the session management network element further assigns a first address (that is, an IP address of the terminal in an access network) to the terminal, and notifies the user plane network element of first address information assigned by the session management network element to the terminal. In addition, in a process in which the terminal accesses the serving network, the serving network also assigns a second address (that is, an IP address of the terminal in the serving network) to the terminal, and notifies the terminal of second address information by adding the second address information to the feedback message. Therefore, after the terminal obtains the first address information and the second address information, when the terminal sends any uplink message to the serving network, the uplink message includes the first address information and the second address information.

For example, assuming that the terminal obtains the first address and the second address, uplink user plane data from the terminal may include the first address information and the second address information. Correspondingly, the uplink user plane data obtained by the user plane network element also includes the first address information and the second address information. Because the first address information is invalid address information for the serving network, to ensure that the serving network can accurately receive the uplink user plane data, before sending the uplink user plane data to the serving network, the user plane network element may first delete the first address information in the uplink user plane data (that is, delete the IP address of the terminal in the access network). Then, the user plane network element may send, to the serving network, uplink user plane data obtained after the first address information is deleted.

Correspondingly, after the serving network assigns the second address to the terminal, when the serving network sends downlink user plane data to the terminal, the downlink user plane data includes the second address information. For example, assuming that the serving network has assigned the second address to the terminal, subsequent downlink user plane data includes the second address information. The downlink user plane data obtained by the user plane network element also includes the second address information. Because the second address information is invalid address information for the access network, to ensure that the downlink user plane data can be accurately sent to the terminal using the access network, before sending the downlink user plane data to the terminal using the access network, the user plane network element may add the first address information to the downlink user plane data. Then, the user plane network element may send the downlink user plane data to the terminal using the access network and the first address information in the downlink user plane data. In this case, the downlink user plane data includes the first address information and the second address information. In other words, the downlink user plane data that is received by the terminal from the serving network through the user plane network element includes the first address information and the second address information. After receiving the downlink user plane data, the terminal may delete the first address information in the downlink user plane data. In this manner, even if the access network and the serving network each assign an address to the terminal, the terminal can still access the serving network using the access network. On a premise that an existing procedure in which a session of the terminal is established in the access network is not modified as much as possible, the terminal is enabled to access the serving network using the access network, and user experience is improved.

The method for accessing serving network provided in the embodiments of this application enables the terminal to access the serving network using the access network (for example, a wireless network), expanding a usage scenario of the serving network, and improving user experience.

The following describes, using an example, a detailed procedure of the method for accessing serving network provided in the embodiments of this application. In this example, the terminal is an RG, the access network is a wireless network, the serving network is an IPTV network, the session management network element is an SMF network element, the user plane network element is a UPF network element, the policy control network element is a PCF network element, the data management network element is a UDM network element, the access management network element is an AMF network element, the authentication information of the terminal in the serving network and the second identification information of the terminal are an line ID of the RG, the session information of the terminal is identification information of a session of the RG, the serving network management system network element is a BOSS network element on an IPTV network side, the access network management system network element is an NMS network element on a wireless network side, the subscription request message is an IPTV service subscription request message, and the subscription response message is an IPTV service subscription response message.

1. For example, the line ID of the RG is stored in subscription information of the RG. The following first describes a process of adding the line ID of the RG to the subscription information of the RG when a user subscribes to an IPTV service. The process includes two implementations.

Figure 8A:
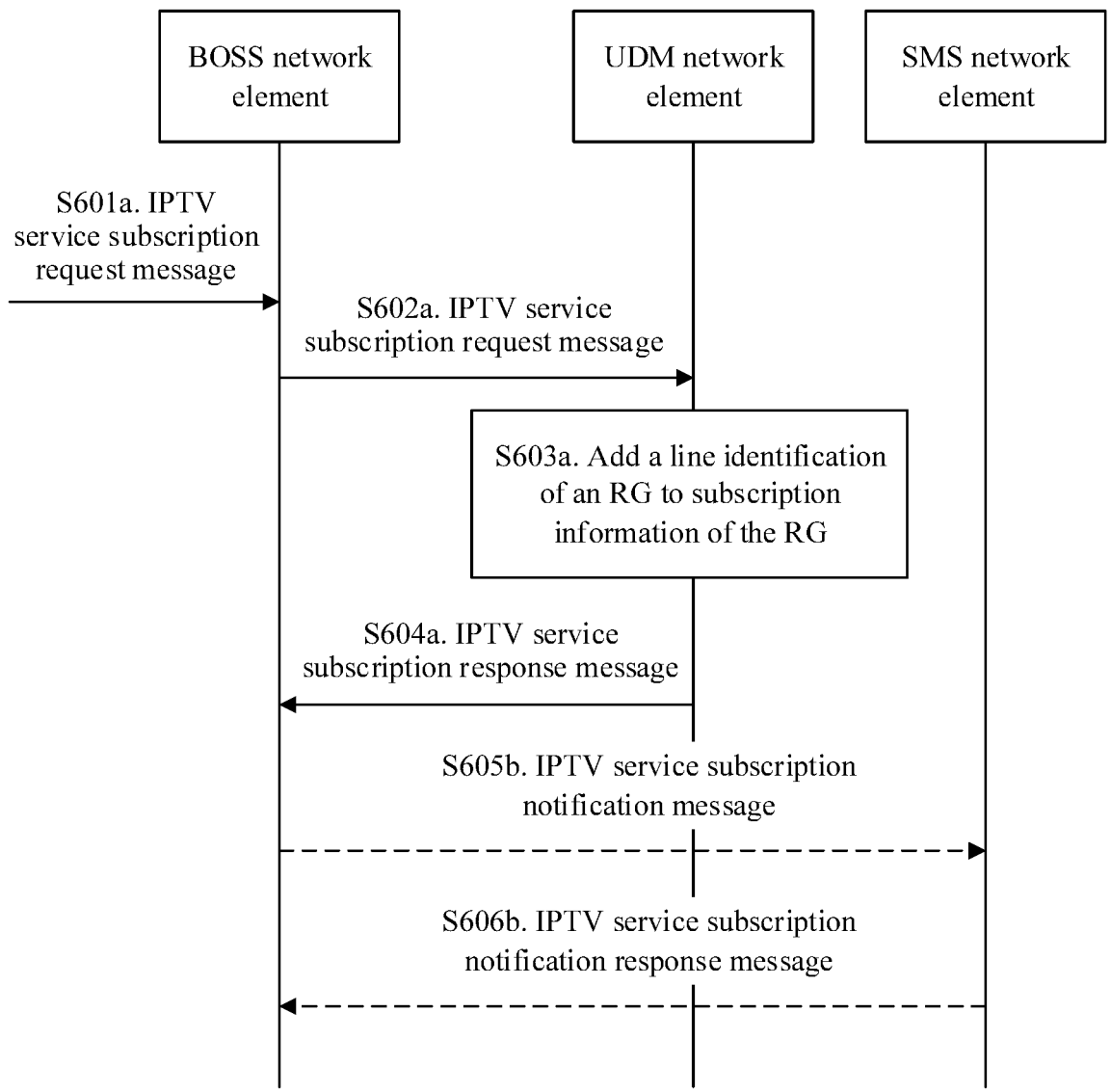
FIG. 8A is a flowchart of still another method for accessing serving network according to an embodiment of this application.

Implementation 1: The BOSS network element on the IPTV network side performs an operation of generating the authentication information of the terminal in the serving network. FIG. 8A is a flowchart of still another method for accessing serving network according to an embodiment of this application. As shown in FIG. 8A, the method includes the following steps.

S601a. A BOSS network element receives an IPTV service subscription request message.

The IPTV service subscription request message may include a first identifier of an RG (for example, at least one of an ID of the RG, an IMSI of the RG, and a GPSI of the RG).

For example, a user deploys an IPTV service in a business hall of an IPTV operator. The IPTV service subscription request message may be, for example, entered by a salesperson in the business hall to the BOSS network element.

S602a. The BOSS network element sends an IPTV service subscription request message to a UDM network element.

The IPTV service subscription request message is used to notify the UDM network element that the RG has subscribed to a service of the IPTV network. The IPTV service subscription request message includes the first identifier of the RG and a line ID generated by the BOSS network element for the RG.

S603a. The UDM network element adds the line identification of the RG to subscription information of the RG.

After receiving the IPTV service subscription request message, the UDM network element may search, based on first identification information of the RG, for subscription information of the RG that is stored in a local database, and add the line ID of the RG to the subscription information of the RG.

S604a. The UDM network element sends an IPTV service subscription response message to the BOSS network element.

The IPTV service subscription response message is used to notify the BOSS network element that the UDM network element has added the line ID of the RG to the subscription information of the RG.

After the foregoing procedure is executed, the RG may access the IPTV network, such that an STB connected to the RG may obtain, using the RG, data provided by the IPTV network, and provide the data for the user.

For example, another network element that is configured to store information about the RG and that is in the IPTV network is an SMS network element. In a possible implementation, after S604a, the method may further include the following steps.

S605a. The BOSS network element sends an IPTV service subscription notification message to the SMS network element.

The IPTV service subscription notification message includes the first identifier of the RG and the line ID generated by the BOSS network element for the RG. The IPTV service subscription notification message is used to instruct the SMS network element to add the line ID of the RG to the information about the RG.

S606a. The SMS network element sends an IPTV service subscription notification response message to the BOSS network element.

The IPTV service subscription notification response message is used to notify the BOSS network element that the SMS network element has added the line ID of the RG to the information about the RG.

It may be understood that the IPTV service subscription notification message and the IPTV service subscription notification response message are merely examples, and do not constitute a limitation on a message. During implementation, the IPTV service subscription notification message may be replaced with any other message used to instruct a network element to add the line ID of the RG to the information about the RG, and the IPTV service subscription notification response message may be replaced with any other message used to notify that the line ID of the RG has been added to the information about the RG. This is not limited.

Figure 8B:
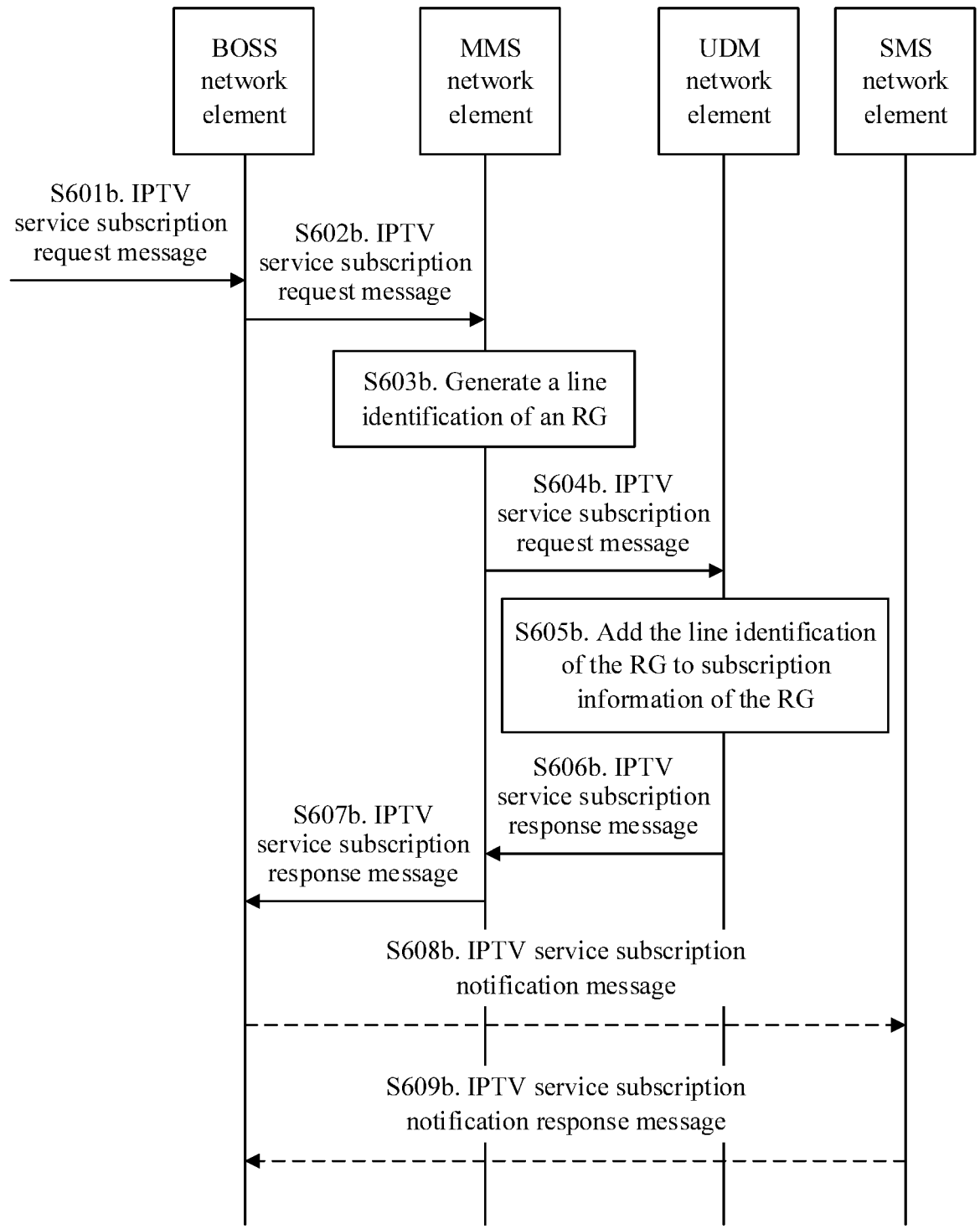
FIG. 8B is a flowchart of still another method for accessing serving network according to an embodiment of this application.

Implementation 2: The BOSS network element on the IPTV network side triggers the NMS network element on the wireless network side to perform an operation of generating the authentication information of the terminal in the serving network. FIG. 8B is a flowchart of still another method for accessing serving network according to an embodiment of this application. As shown in FIG. 8B, the method includes the following steps.

S601b. A BOSS network element receives an IPTV service subscription request message.

The IPTV service subscription request may include a first identifier of an RG (for example, at least one of an ID of the RG, an IMSI of the RG, and a GPSI of the RG).

For example, a user deploys an IPTV service in a business hall of an IPTV operator. The IPTV service subscription request message may be, for example, entered by a salesperson in the business hall to the BOSS network element.

S602b. The BOSS network element sends an IPTV service subscription request message to an NMS network element.

The IPTV service subscription request message is used to notify the NMS network element that the RG has subscribed to a service of the IPTV network. The IPTV service subscription request message includes the first identifier of the RG.

S603b. The NMS network element generates the line identification of the RG.

S604b. The NMS network element sends an IPTV service subscription request message to a UDM network element.

The IPTV service subscription request message is used to notify the UDM network element that the RG has subscribed to a service of the IPTV network. The IPTV service subscription request message includes the first identifier of the RG and a line ID generated by the NMS network element for the RG.

S605b. The UDM network element adds the line identification of the RG to subscription information of the RG.

After receiving the IPTV service subscription request message, the UDM network element may search, based on first identification information of the RG, for subscription information of the RG that is stored in a local database, and add the line ID of the RG to the subscription information of the RG.

S606b. The UDM network element sends an IPTV service subscription response message to the NMS network element.

The IPTV service subscription response message is used to notify the NMS network element that the UDM network element has added the line ID of the RG to the subscription information of the RG.

S607b. The NMS network element sends an IPTV service subscription response message to the BOSS network element.

The IPTV subscription response message includes the first identifier of the RG and the line ID generated by the NMS network element for the RG. The IPTV subscription response message is used to notify the BOSS network element of the line ID of the RG.

After the foregoing procedure is executed, the RG may access the IPTV network, such that an STB connected to the RG may obtain, using the RG, data provided by the IPTV network, and provide the data for the user.

For example, another network element that is configured to store information about an RG and that is in the IPTV network is an SMS network element. In a possible implementation, after S607b, the method may further include the following steps.

S608b. The BOSS network element sends an IPTV service subscription notification message to the SMS network element.

The IPTV service subscription notification message includes the first identifier of the RG and the line ID generated by the NMS network element for the RG. The IPTV service subscription notification message is used to instruct the SMS network element to add the line ID of the RG to the information about the RG.

S609b. The SMS network element sends an IPTV service subscription notification response message to the BOSS network element.

The IPTV service subscription notification response message is used to notify the BOSS network element that the SMS network element has added the line ID of the RG to the information about the RG.

Figure 9:
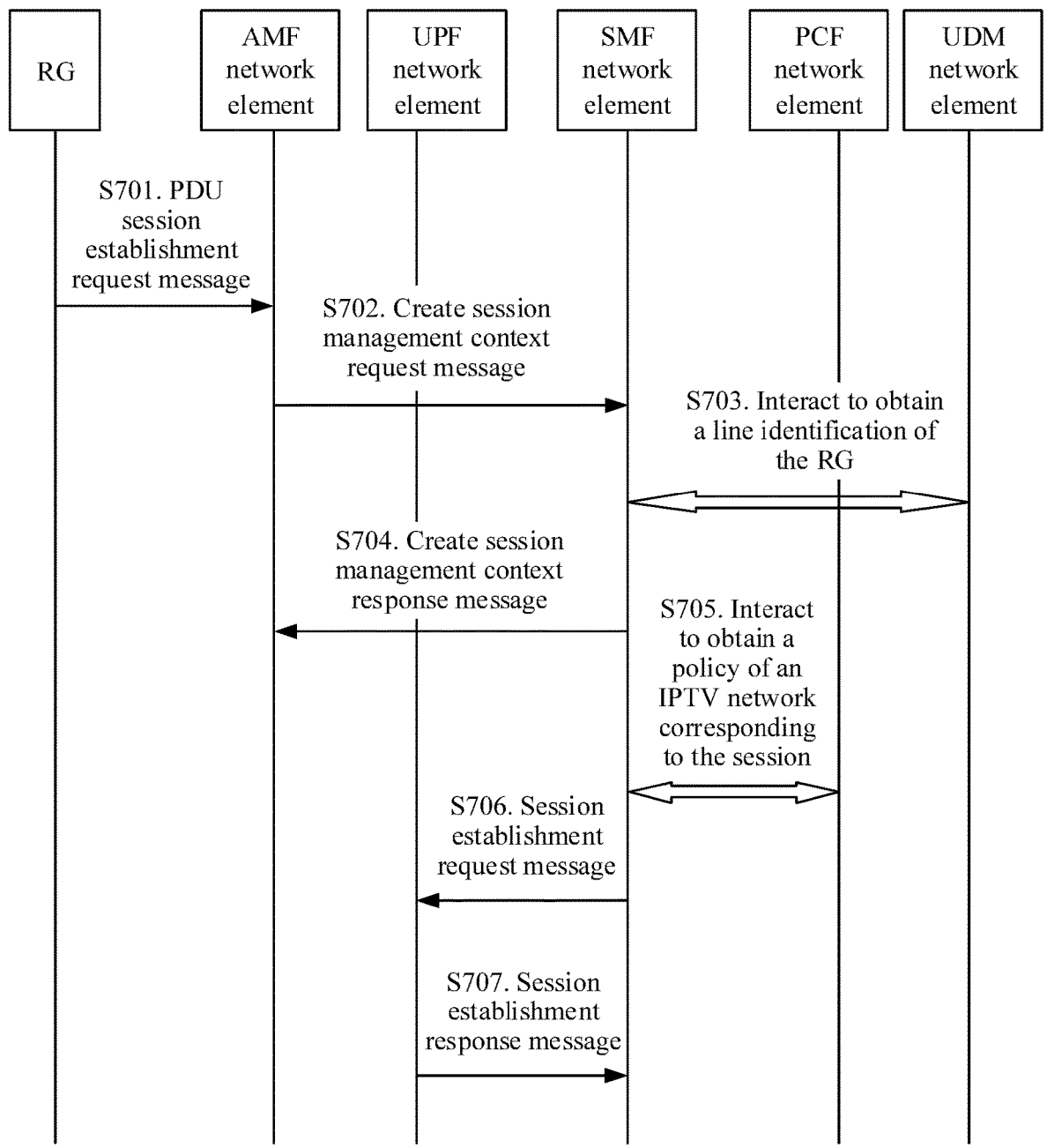
FIG. 9 is a flowchart of still another method for accessing serving network according to an embodiment of this application.

2. A process in which the RG establishes, after completing registration in the wireless network, a session for data transmission with the serving network in the wireless network. It may be understood that, for a procedure of registering, by the RG, in the wireless network, refer to other approaches. Details are not described herein. FIG. 9 is a flowchart of still another method for accessing serving network according to an embodiment of this application. As shown in FIG. 9, the method includes the following steps.

S701. An RG sends a PDU session establishment request message to an AMF network element.

The PDU session establishment request message requests to establish a session for the RG. The protocol data unit (PDU) session establishment request message includes first identification information of the RG (for example, an ID of the RG, an IMSI of the RG, or a GPSI of the RG), a DNN (in this example, the DNN is IPTV), and instruction information used to instruct the RG to obtain an IP address from an IPTV network. The DNN is used to indicate that the PDU session is used to transmit data of an IPTV service. That is, the PDU session is used for data transmission with the IPTV network. The instruction information used to instruct the RG to obtain the IP address from the IPTV network may be, for example, instruction information including PCO and/or identification information of an Ethernet type of a session.

In a possible implementation, before S701, the method may further include: determining, by the RG, to establish a PDU session. For example, the RG may determine, when completing a registration procedure in a wireless network, to establish the PDU session. Alternatively, when receiving data of the IPTV service from client, the RG may determine to establish the PDU session.

S702. The AMF network element sends a create session management context request message to an SMF network element.

The create session management context request message requests the SMF network element to set up a session context for the RG. The create session management context request message includes the first identification information of the RG (for example, the ID of the RG, the IMSI of the RG, or the GPSI of the RG), the DNN (in this example, the DNN is IPTV), and the instruction information used to instruct the RG to obtain the IP address from the IPTV network.

After receiving the PDU session establishment request message from the RG, the AMF network element may select, based on a DNN carried in the PDU session establishment request message, an SMF network element that supports the IPTV service. Then, the AMF network element may send a create session management context request message to the SMF network element that supports the IPTV service.

S703. The SMF network element interacts with a UDM network element, to obtain a line identification of the RG.

After receiving the create session management context request message from the AMF network element, the SMF network element may interact with the UDM network element, to obtain authentication information of the RG in the serving network, that is, the line ID of the RG. For example, the SMF network element may send a query request to the UDM network element. The query request may include the first identification information of the RG. The UDM network element queries, based on the first identification information of the RG, a local database of the UDM network element for authentication information (that is, the line ID of the RG) corresponding to the first identification information of the RG. Then, the UDM network element may return a query response message to the SMF network element. The query response message may include the line ID of the RG.

It should be noted that the SMF network element may further learn, based on the instruction information that is used to instruct the RG to obtain the IP address from the IPTV network and that is carried in the create session management context request message, that the RG is to obtain the IP address from the IPTV network. In this scenario, the SMF network element does not assign an IP address to the RG in a process of establishing the PDU session for the RG.

S704. The SMF network element sends a create session management context response message to the AMF network element.

The create session management context response message is used to indicate that the SMF network element has created a PDU session context of the RG.

S705. The SMF network element interacts with a PCF network element, to obtain a policy of an IPTV network corresponding to the session.

The SMF network element may select, based on the DNN carried in the create session management context request message, a PCF network element that supports the IPTV service. In a possible implementation, when the wireless network includes a plurality of PCF network elements that support the IPTV service, the SMF network element may select, based on load of the plurality of PCF network elements, a PCF network element with light load for interaction.

Then, the SMF network element may interact with the PCF network element that supports the IPTV service, to implement session management policy establishment or modification of the RG. For example, the SMF network element may send a policy request message to the PCF network element. The policy request message may include the first identification information of the RG and the DNN, to notify, using the policy request message, the PCF network element that the PDU session currently established for the RG is used to transmit the IPTV service. After receiving the policy request message, the PCF network element may send a policy control and charging (PCC) rule of the IPTV service corresponding to the RG to the SMF network element. The PCC rule may include a policy of the IPTV service, for example, a QoS policy of multicast data of the IPTV service.

S706. The SMF network element sends a session establishment request message to a UPF network element.

The session establishment request message requests to create a session context of the UPF network element. The session establishment request message may include the line ID of the RG.

The SMF network element may select, based on the DNN carried in the create session management context request message, a UPF network element that supports the IPTV service. In a possible implementation, when the wireless network includes a plurality of UPF network elements that support the IPTV service, the SMF network element may select, based on load of the plurality of UPF network elements, a UPF network element with light load for interaction.

S707. The UPF network element sends a session establishment response message to the SMF network element.

The session establishment response message is used to notify the SMF network element that the session is established.

In a possible implementation, after receiving the session establishment request message, the UPF network element binds the line ID of the RG to an identifier of the PDU session, and establishes a mapping relationship between the line ID of the RG and the identifier of the PDU session (that is, a mapping relationship between second identification information of the terminal and connection information of the terminal). The mapping relationship may also be referred to as N3 tunnel information of the RG.

Till now, a process in which the RG establishes the PDU session for data transmission with the IPTV network is completed. A person skilled in the art may understand that the session establishment steps shown in FIG. 9 do not constitute a limitation on a session establishment procedure. In the procedure, more or fewer steps than those shown in the figure may be included, or some steps are combined, or the steps are performed in a different sequence.

Figure 10A:
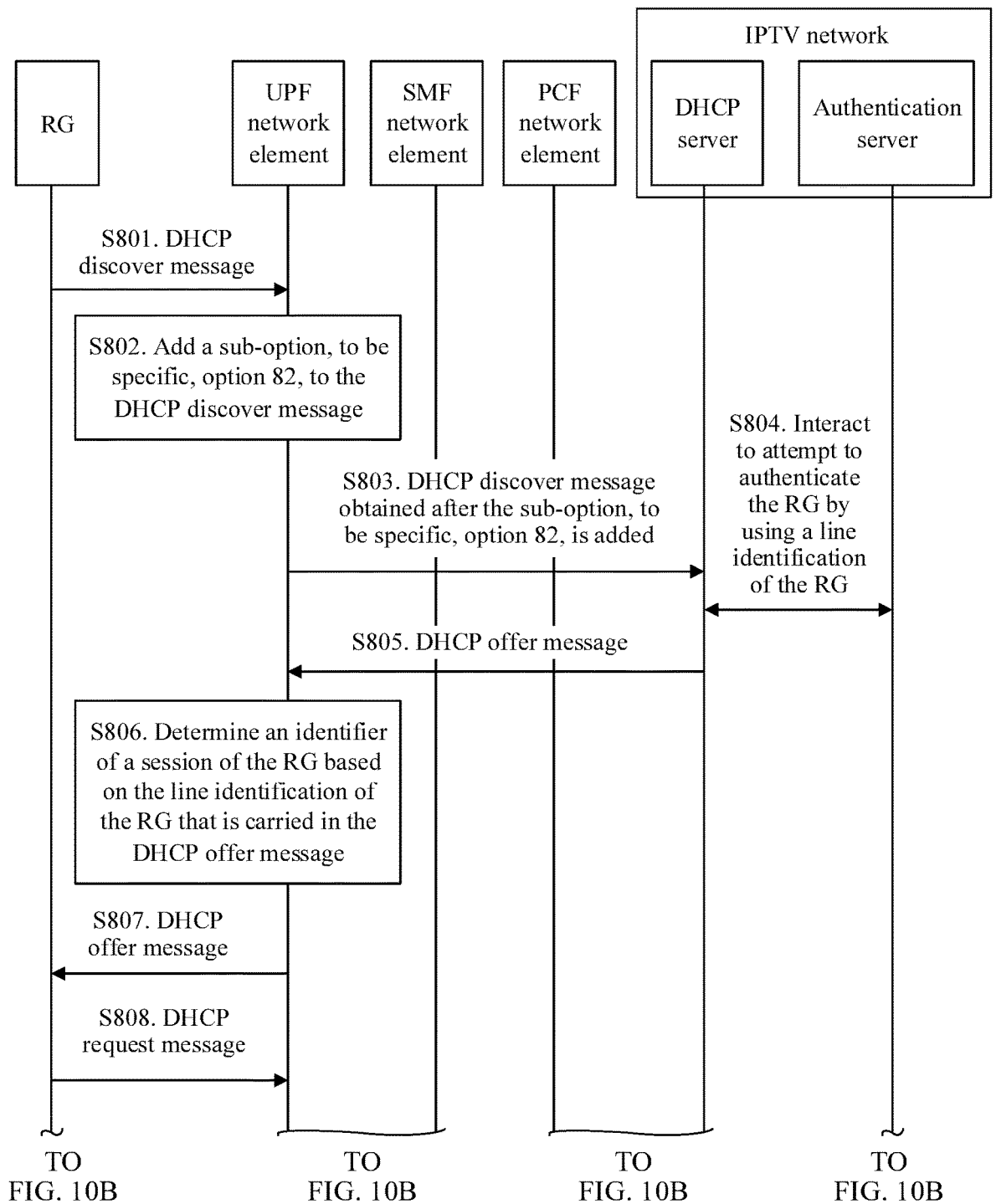
FIG. 10A and FIG. 10B are flowcharts of still another method for accessing serving network according to an embodiment of this application.
Figure 10B:
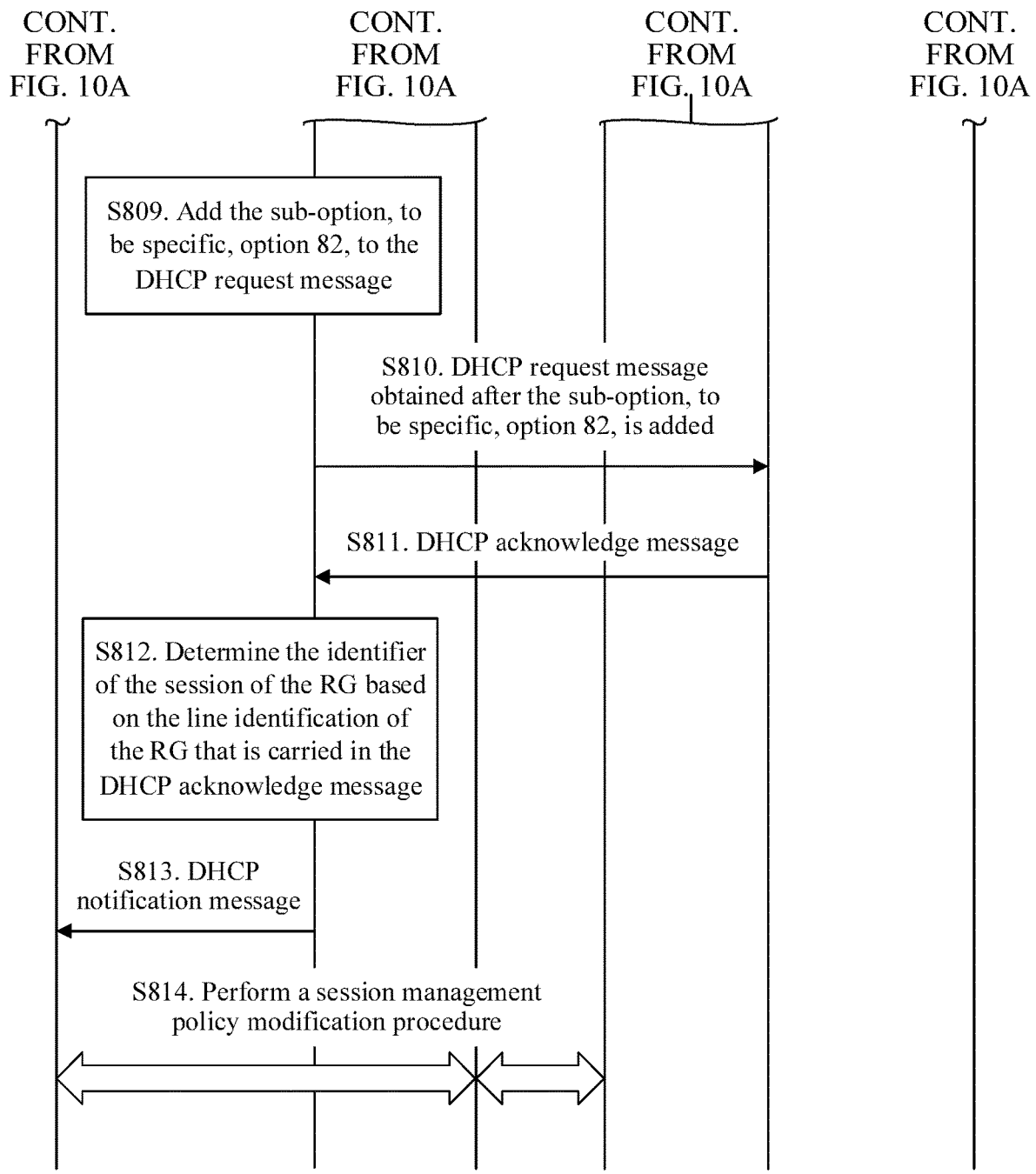

3. A process in which the RG accesses the IPTV network using the wireless network after establishing the session in the wireless network. In the embodiments, the RG interacts with a DHCP server of the IPTV network using the wireless network, to access the IPTV network. A UPF network element in the wireless network is responsible for forwarding a message between the RG and the DHCP server. FIG. 10A and FIG. 10B are a flowchart of still another method for accessing serving network according to an embodiment of this application. As shown in FIG. 10A and FIG. 10B, the method includes the following steps.

S801. An RG sends a DHCP discover message to a UPF network element.

The DHCP discover message requests the RG to access an IPTV network. In this case, the DHCP discover message does not include a line ID of the RG. The DHCP discover message is the foregoing initial access message.

S802. The UPF network element adds a sub-option, to be more specific, option 82, to the DHCP discover message.

It can be learned from the example shown in FIG. 9 that, in a process in which the RG establishes a session, an SMF network element sends the line ID of the RG to the UPF network element. Therefore, before sending the DHCP discover message to a DHCP server, the UPF network element may add the sub-option, to be more specific, option 82 to the DHCP discover message. The sub-option, to be more specific, option 82, includes the line ID of the RG.

In a possible implementation, in some embodiments, the sub-option, to be more specific, option 82, may be added to the DHCP discover message by the SMF network element. In this case, step S802 may be further replaced with the following steps.

Step A: The UPF network element sends the DHCP discover message to the SMF network element.

Step B: The SMF network element adds the sub-option, to be more specific, option 82, to the DHCP discover message.

Step C: The SMF network element sends, to the UPF network element, a DHCP discover message obtained after the sub-option, to be more specific, the option 82, is added.

S803. The UPF network element sends, to the DHCP server, the DHCP discover message obtained after the sub-option, to be more specific, the option 82, is added.

In this case, the DHCP discover message is the foregoing access message.

S804: The DHCP server interacts with an authentication server of the IPTV network, to authenticate the RG using the line identification of the RG.

For example, the DHCP server may send an authentication request message to the authentication server. The authentication request message includes the line ID of the RG. After receiving the authentication request message, the authentication server may query a local database of the authentication server based on the line ID of the RG that is carried in the authentication request message. If the line ID of the RG exists in the local database, it indicates that the RG may use a service of the IPTV network, that is, the RG has been authenticated. In this scenario, the authentication server may send an authentication success message to the DHCP server. The authentication success message is used to indicate that the RG has been authenticated. When the RG is authenticated, the DHCP server may further perform a subsequent step S805.

If the RG fails to be authenticated, the authentication server may send an authentication failure message to the DHCP server. The authentication failure message is used to indicate that the RG fails to be authenticated. When the RG fails to be authenticated, the DHCP server may send, to the RG, a DHCP message used to indicate that the RG fails to be authenticated. After receiving the DHCP message, the RG may re-initiate an access procedure. That is, step S801 is performed again. The procedure is not shown in FIG. 10A and FIG. 10B.

S805. The DHCP server sends a DHCP offer message to the UPF network element.

The DHCP offer message is used to notify that the RG is authenticated, and indicate an IP address assigned by the DHCP server to the RG, that is, an IP address of the RG in the IPTV network. In this case, the DHCP offer message is the foregoing feedback message. The DHCP Offer message includes the IP address assigned to the RG and the sub-option, to be more specific, the option 82 (including the line ID of the RG).

S806. The UPF network element determines an identifier of the session of the RG based on the line identification of the RG that is carried in the DHCP offer message.

A destination IP address of the DHCP message from the DHCP server is not the IP address of the RG. Therefore, the UPF network element cannot determine, based on the destination IP address of the DHCP message, a session to be used to transmit the DHCP offer message to the RG. Therefore, if the UPF network element establishes a mapping relationship between the line ID of the RG and an identifier of a PDU session in the process in which the RG establishes the session (that is, step S607), the UPF network element may determine the identifier of the PDU session of the RG based on the line ID of the RG in the DHCP offer message.

In a possible implementation, in some embodiments, if the mapping relationship between the line ID of the RG and the identifier of the PDU session is set in the SMF network element, the identifier of the session of the RG may be determined by the SMF network element. In this case, step S805 may be further replaced with the following step: The DHCP server sends a DHCP offer message to the SMF network element.

Step S806 may be replaced with the following steps.

Step D: The SMF network element determines an identifier of the session of the RG based on the line identification of the RG that is carried in the DHCP offer message.

Step E: The SMF network element adds the identifier of the session of the RG to the DHCP offer message.

Step F: The SMF network element sends, to the UPF network element, a DHCP offer message obtained after the identifier of the session of the RG is added.

S807. The UPF network element sends the DHCP offer message to the RG.

The DHCP offer message includes the IP address assigned to the RG.

After obtaining the identifier of the PDU session of the RG, the UPF network element may send the DHCP offer message to the RG using a PDU session corresponding to the identifier. In this case, the DHCP offer message sent to the RG may not include the sub-option, to be more specific, option 82.

S808. The RG sends a DHCP request message to the UPF network element.

In this case, the DHCP request message does not include the line ID of the RG. The DHCP request message is the foregoing initial access message. The DHCP request message is used to query the DHCP server whether the assigned IP address is available. The procedure is used to prevent a case in which the DHCP server assigns a same IP address to two RGs for use, and consequently the RGs cannot use the IP address to access the IPTV network.

S809. The UPF network element adds the sub-option, to be more specific, option 82, to the DHCP request message.

In a possible implementation, in some embodiments, the sub-option, to be more specific, option 82, may be added to the DHCP request message by the SMF network element. In this case, step S809 may be further replaced with the following steps.

Step G: The UPF network element sends the DHCP request message to the SMF network element.

Step H: The SMF network element adds the sub-option, to be more specific, option 82, to the DHCP request message.

Step I: The SMF network element sends, to the UPF network element, a DHCP request message obtained after the sub-option, to be more specific, the option 82, is added.

S810. The UPF network element sends, to the DHCP server, the DHCP request message obtained after the sub-option, to be more specific, the option 82, is added.

In this case, the DHCP request message is the foregoing access message.

S811. The DHCP server sends a DHCP acknowledge message to the UPF network element.

The DHCP acknowledge message is used to notify the RG that the assigned IP address is available. In this case, the DHCP acknowledge message is the foregoing feedback message. The DHCP acknowledge message includes the IP address assigned to the RG and the sub-option, to be more specific, the option 82 (including the line ID of the RG).

S812. The UPF network element determines the identifier of the session of the RG based on the line identification of the RG that is carried in the DHCP acknowledge message.

In a possible implementation, in some embodiments, if the mapping relationship between the line ID of the RG and the identifier of the PDU session is set in the SMF network element, the identifier of the session of the RG may be determined by the SMF network element. In this case, step S811 may be further replaced with the following step: The DHCP server sends a DHCP acknowledge message to the SMF network element.

Step S812 may be further replaced with the following steps.

Step J: The SMF network element determines the identifier of the session of the RG based on the line ID of the RG that is carried in the DHCP acknowledge message.

Step K: The SMF network element adds the identifier of the session of the RG to the DHCP acknowledge message.

Step L: The SMF network element sends, to the UPF network element, a DHCP acknowledge message obtained after the identifier of the session of the RG is added.

S813. The UPF network element sends a DHCP notification message to the RG.

The DHCP notification message includes the IP address assigned to the RG.

S814. The SMF network element performs a session management policy modification procedure.

After learning, using the DHCP offer message from the DHCP server, the IP address assigned by the DHCP server to the RG, the SMF network element may initiate the session management policy modification procedure to a PCF network element, to notify the PCF network element of the IP address of the RG in the IPTV network, and obtains an updated PCC rule (for example, a QoS rule) from the PCF network element. Then, the SMF network element may update the QoS rule obtained from the PCF network element for the UPF network element and the RG.

Till now, the process in which the RG accesses the IPTV network using the wireless network is completed. Then, the RG may configure the address of the RG in the IPTV network for an STB, and perform network address translation (NAT), to implement translation between an intranet address and an extranet address. Then, the STB connected to the RG may obtain, using the RG, data provided by the IPTV network, and provide the data for the user. A person skilled in the art may understand that the steps of accessing the IPTV network shown in FIG. 10A and FIG. 10B does not constitute a limitation on a process of accessing the IPTV network. In the procedure, more or fewer steps than those shown in the figure may be included, or some steps are combined, or the steps are performed in a different sequence.

It should be noted that, in FIG. 9, FIG. 10A, and FIG. 10B, an example in which the session establishment request message from the RG includes the instruction information used to instruct the RG to obtain the IP address from the IPTV network is used to describe how the RG accesses the IPTV network using the wireless network. In other words, in the process of establishing the session for the RG, the SMF network element does not assign an IP address in a wireless network to the RG.

It should be noted that, if the session establishment request message from the RG does not include the instruction information used to instruct the RG to obtain the IP address from the IPTV network, in the process of establishing the session for the RG, the SMF network element needs to assign the IP address in the wireless network to the RG. A 5G communications system is used as an example. The IP address that is in the wireless network and that is assigned by the SMF network element to the RG may be referred to as a 5G Core (5GC) IP address. For how the SMF network element assigns the IP address in the wireless network to the RG, refer to an operation of assigning, by an SMF network element, an IP address in a wireless network to a terminal in other approaches. Details are not described herein.

In this scenario, for each uplink message (for example, the DHCP discover message or the DHCP request message) between the RG and the UPF network element, because the messages need to be transmitted using the 5GC IP (that is, the 5GC IP is covered by the uplink messages), the RG adds the 5GC IP to the uplink messages. Correspondingly, after receiving the uplink messages, the UPF network element deletes the 5GC IP carried in the uplink messages (that is, deletes a header of a 5GC IP layer), and sends, to the DHCP server of the IPTV network, uplink messages obtained after the 5GC IP is deleted. For example, the UPF network element may determine, based on a mapping relationship between the 5GC IP and the line ID of the RG, the 5GC IP carried in the uplink messages, and delete the 5GC IP from the uplink messages. Alternatively, the 5GC IP is located in a preset field of the uplink messages. After receiving the uplink messages, the UPF network element may directly delete the field, to delete the 5GC IP. Correspondingly, for each downlink message (for example, the DHCP offer message or the DHCP notification message) between the RG and the UPF network element, because the messages need to be transmitted using the 5GC IP (that is, the 5GC IP is covered by the downlink messages), the UPF network element adds the 5GC IP to the downlink messages. Correspondingly, after receiving the downlink messages, the RG deletes the 5GC IP carried in the downlink messages (that is, deletes the header of the 5GC IP layer). For example, the UPF network element may determine the 5GC IP of the RG based on the mapping relationship between the 5GC IP and the line ID of the RG, and add the 5GC IP to the downlink messages. In this manner, even though both the wireless network and the IPTV network assign an IP address to the RG, the RG can still access the IPTV network using the wireless network, and obtain data of the IPTV network. On a premise that an existing session establishment procedure in a wireless network is not modified as much as possible, the RG is enabled to access an IPTV network using the wireless network, such that user experience is improved.

The method for accessing serving network provided in this embodiment of this application enables the RG to access the IPTV network using the wireless network, and a usage scenario of the IPTV network is expanded.

In a possible implementation, the serving network in the embodiments of this application may provide at least one multicast service. A permission for a user to subscribe to one or more of the at least one multicast service for a terminal is: for example, fully allowed, not allowed, or preview allowed. Therefore, a serving network management system network element on the serving network side may generate multicast service permission information of the terminal when the user subscribes to the multicast service of the serving network for the terminal. The multicast service permission information includes permission of the terminal for the at least one multicast service provided by the serving network. It may be understood that the terminal herein may be an STB or a terminal integrated with an STB function and an RG function.

After the multicast service permission information of the terminal is generated, the serving network management system network element may send the multicast service permission information of the terminal to another network element that is in the serving network and that is configured to store information about the terminal for unified storage. For example, the serving network management system network element is a BOSS network element, and the other network element configured to store the information about the terminal is an SMS network element.

For example, the serving network may provide three multicast services: a multicast service 1, a multicast service 2, and a multicast service 3. When the user subscribes using the terminal to access the serving network, permission for the multicast service 1 is: fully allowed, permission for the multicast service 2 is: not allowed, and permission for the multicast service 3 is: preview allowed. The multicast service permission information of the terminal may be shown in Table 1 below.

TABLE 1

| Terminal | Multicast service 1 | Multicast service 2 | Multicast service 3 |
| --- | --- | --- | --- |
| Identifier of the terminal | Fully allowed | Not allowed | Preview allowed |

It may be understood that the permission for the multicast services shown in Table 1 is merely an example, and does not constitute a limitation on permission for the multicast services. During implementation, the permission for the multicast services may be determined based on permission set by the serving network.

The identifier of the terminal may be, for example, any one of the following: an ID of the terminal, an IMSI of the terminal, a GPSI of the terminal, an MSISDN of the terminal, a line ID of the terminal, a MAC address of the terminal, type information of the terminal, level information of the terminal, user name information used when the terminal accesses the serving network, and the like.

In the embodiments, in a scenario in which the terminal accesses the serving network using the access network shown in FIG. 3, another network element that is in the serving network and that is configured to store the information about the terminal may send the multicast service permission information of the terminal to a network element on an access network side. The network element on the access network side may store the multicast service permission information of the terminal as the information about the terminal for storage. The network element on the access network side herein may be, for example, a network management network element (for example, an NMS network element), a data management network element (for example, a UDM network element), a policy control network element (for example, a PCF network element), or a network exposure network element. For example, the network exposure network element may be a network exposure function (NEF) network element (not shown in FIG. 3).

For example, the network element on the access network side is a data management network element. After receiving the multicast service permission information of the terminal, the data management network element may search, based on identification information of the terminal that corresponds to the multicast service permission information of the terminal, for subscription information of the terminal that is stored in a local database, and add the multicast service permission information of the terminal to the subscription information of the terminal. For example, the network element on the access network side is a policy control network element. After receiving the multicast service permission information of the terminal, the policy control network element may search, based on identification information of the terminal that corresponds to the multicast service permission information of the terminal, for policy information of the terminal that is stored in a local database, and add the multicast service permission information of the terminal to the policy information of the terminal.

It may be understood that when the network element on the access network side is an NMS network element or an NEF network element, after receiving the multicast service permission information of the terminal, the network element on the access network side may alternatively not perform a storage operation, but instead send the multicast service permission information of the terminal to another network element that is on the access network side and that needs to store the information, such that the other network element stores the information. The other network element that needs to store the information herein may be, for example, a data management network element (for example, a UDM network element) or a policy control network element (for example, a PCF network element).

After the network element on the access network side stores the multicast service permission information of the terminal as the information about the terminal, when the terminal uses a multicast service using the access network to access the serving network subsequently, the access network may control the multicast service of the terminal based on the multicast service permission information of the terminal. Based on the architecture of the network that is shown in FIG. 3, the following describes in detail, using some embodiments, how the access network controls the multicast service of the terminal. The following several embodiments may be combined with each other, and a same or similar concept or process may not be described repeatedly in some embodiments.

Figure 11:
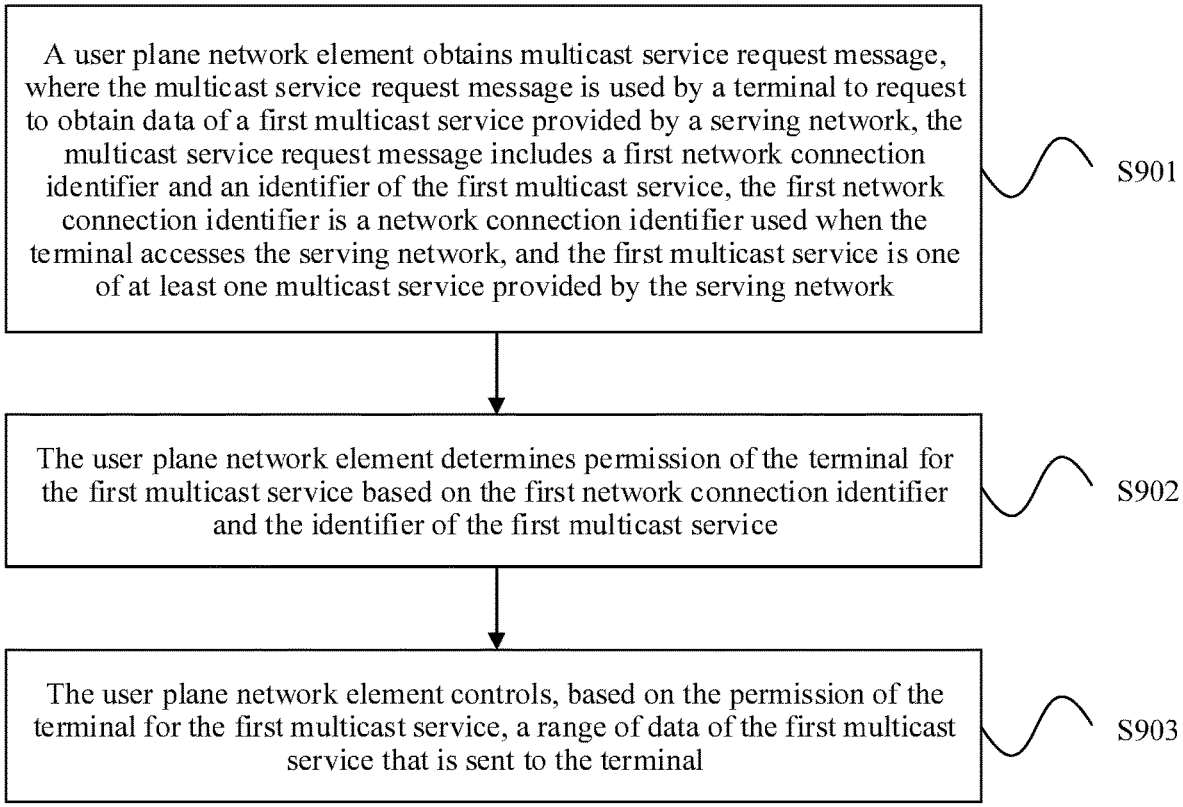
FIG. 11 is a flowchart of still another method for accessing serving network according to an embodiment of this application.

FIG. 11 is a flowchart of still another method for accessing serving network according to an embodiment of this application. This embodiment relates to a process in which after a terminal accesses a serving network using an access network, a user plane network element (for example, a UPF network element) on an access network side controls a multicast service of the terminal based on a multicast service request message of the terminal. This embodiment of this application relates to the following network elements: a session management network element (for example, an SMF network element), a user plane network element (for example, a UPF network element), and a network element that is on the access network side and that stores multicast service permission information of the terminal (for example, a policy control network element (for example, a PCF network element), a data management network element (for example, a UDM network element), a network management network element (for example, an NMS network element), a data management network element (for example, a UDM network element), or a network exposure network element (for example, an NEF network element)).

As shown in FIG. 11, the method includes the following steps.

S901. The user plane network element obtains the multicast service request message, where the multicast service request message is used by the terminal to request to obtain data of a first multicast service provided by the serving network, the multicast service request message includes a first network connection identifier and an identifier of the first multicast service, the first network connection identifier is a network connection identifier used when the terminal accesses the serving network, and the first multicast service is one of at least one multicast service provided by the serving network.

S902. The user plane network element determines permission of the terminal for the first multicast service based on the first network connection identifier and the identifier of the first multicast service.

S903. The user plane network element controls, based on the permission of the terminal for the first multicast service, a range of data of the first multicast service to the terminal.

After the terminal accesses the serving network using the access network, a user may trigger the terminal to initiate the multicast service request message for requesting the data of the first multicast service. The multicast service request message includes the first network connection identifier and the identifier of the first multicast service. The identifier of the first multicast service herein may be, for example, an ID of the first multicast service or a multicast address of the first multicast service. The first network connection identifier herein may be, for example, address information assigned by the serving network, a session identifier, and a tunnel endpoint identifier.

When the terminal is an STB, the address information assigned by the serving network herein may be an IP address assigned, by the serving network when an RG corresponding to the STB accesses the serving network using the access network, to the RG. The session identifier herein is an identifier of a session established by the access network for the RG corresponding to the STB. The tunnel endpoint identifier herein is a tunnel endpoint identifier generated when the access network establishes the session for the RG corresponding to the STB. When the terminal is a terminal integrated with an STB function and an RG function, the address information assigned by the serving network herein may be an IP address assigned by the serving network to the terminal when the terminal accesses the serving network using the access network. The session identifier herein is an identifier of a session established by the access network for the terminal. The tunnel endpoint identifier herein is a tunnel endpoint identifier generated when the access network establishes the session with the terminal.

In this embodiment of this application, after obtaining the multicast service request message of the terminal, the user plane network element may determine the permission of the terminal for the first multicast service based on the first network connection identifier and the identifier of the first multicast service. Then, the user plane network element may control, based on permission of the terminal for the first multicast service, the range of the data of the first multicast service to the terminal. For example, the multicast service permission information of the terminal that is shown in Table 1 is used as an example. When the first multicast service is the multicast service 1 in Table 1, the permission of the terminal for the first multicast service is: fully allowed. In this scenario, when receiving data of the multicast service 1 broadcast by the serving network, the user plane network element forwards the data to the terminal. When the first multicast service is the multicast service 2 in Table 1, the permission of the terminal for the first multicast service is: not allowed. In this scenario, when receiving data of the multicast service 2 broadcast by the serving network, the user plane network element does not forward the data to the terminal. When the first multicast service is the multicast service 3 in Table 1, the permission of the terminal for the first multicast service is: preview allowed. In this scenario, when receiving preview data of the multicast service 3 broadcast by the serving network, the user plane network element forwards the preview data to the terminal, and when receiving non-preview data of the multicast service 3 broadcast by the serving network, the user plane network element does not forward the non-preview data to the terminal. In this manner, in a scenario in which the terminal accesses the serving network using the access network shown in FIG. 3, the access network can control the multicast service of the terminal based on the multicast service permission information of the terminal, such that a usage scenario of the serving network is expanded.

That the user plane network element determines permission of the terminal for the first multicast service based on the first network connection identifier and the identifier of the first multicast service may be implemented in the following two manners.

Manner 1: The user plane network element may obtain a correspondence between second network connection identifiers and the multicast service permission information of the terminal. The second network connection identifier is a network connection identifier used when the terminal accesses the serving network, for example, address information assigned by the serving network, a session identifier, or a tunnel endpoint identifier. For description of the second network connection identifier, refer to the description of the first network connection identifier. In this embodiment, the first network connection identifier is the same as the second network connection identifier, or the first network connection identifier corresponds to the second network identifier.

Therefore, the user plane network element may determine the permission of the terminal for the first multicast service based on the first network connection identifier, the identifier of the first multicast service, and the correspondence between the second network connection identifiers and the multicast service permission information of the terminal. For example, when the first network connection identifier is the same as the second network connection identifier, the user plane network element may search the correspondence between the second network connection identifiers and the multicast service permission information of the terminal for permission for the first multicast service that corresponds to the first network connection identifier and the identifier of the first multicast service, and uses the permission for the first multicast service as the permission of the terminal for the first multicast service.

For example, when the first network connection identifier corresponds to the second network connection identifier, the user plane network element may determine the permission of the terminal for the first multicast service based on the first network connection identifier, the identifier of the first multicast service, the correspondence between the second network connection identifiers and the multicast service permission information of the terminal, and a correspondence between the first network connection identifiers and the second network connection identifiers. For example, the user plane network element may first search the correspondence between the first network connection identifiers and the second network connection identifiers for the second network connection identifier corresponding to the first network connection identifier. Then, the user plane network element may search the correspondence between the second network connection identifiers and the multicast service permission information of the terminal for permission for the first multicast service that corresponds to the second network connection identifier and the identifier of the first multicast service, and use the permission for the first multicast service as the permission of the terminal for the first multicast service.

In this embodiment, that the user plane network element may obtain the correspondence between the second network connection identifiers and the multicast service permission information of the terminal is not limited. In a possible implementation, the user plane network element obtains the multicast service permission information and the second network connection identifier of the terminal, and establishes the correspondence between the second network connection identifiers and the multicast service permission information of the terminal based on the multicast service permission information and the second network connection identifier of the terminal. During implementation, the user plane network element may establish the correspondence between the multicast service permission information and the second network connection identifiers of the terminal based on a correspondence between identifiers of the terminal and the multicast service permission information of the terminal and a correspondence between the identifiers of the terminal and the second network connection identifiers.

The example shown in Table 1 is still used as an example. The user plane network element may replace the correspondence between the identifiers of the terminal and the multicast service permission information of the terminal with the established correspondence between the multicast service permission information and the second network connection identifiers of the terminal based on the correspondence between the identifiers of the terminal and the multicast service permission information of the terminal and the correspondence between the identifiers of the terminal and the second network connection identifiers. The established correspondence between the multicast service permission information and the second network connection identifiers of the terminal may be shown in Table 2 below.

TABLE 2

| Terminal | Multicast service 1 | Multicast service 2 | Multicast service 3 |
| --- | --- | --- | --- |
| Second network connection identifier | Fully allowed | Not allowed | Preview allowed |

During implementation, the user plane network element may obtain the multicast service permission information by receiving the multicast service permission information of the terminal from the session management network element. For example, when the terminal executes a session establishment procedure in the access network, the session management network element may interact with a network element that stores the multicast service permission information of the terminal on the access network side, to obtain the multicast service permission information of the terminal. For example, the network element that stores the multicast service permission information of the terminal on the access network side is a policy control network element (for example, a PCF network element), a data management network element (for example, a UDM network element), a network management network element (for example, an NMS network element), a data management network element (for example, a UDM network element), or a network exposure network element (for example, an NEF network element). The session management network element may obtain the multicast service permission information of the terminal from the data management network element, the policy control network element, the network exposure network element, or the network management network element. After obtaining multicast service permission information of the terminal, the session management network element may send the multicast service permission information of the terminal to the user plane network element, such that the user plane network element obtains the multicast service permission information of the terminal.

The user plane network element may obtain the second network connection identifier using a procedure in which the terminal accesses the serving network. For example, the user plane network element may obtain the second network connection identifier using the procedure in which the terminal accesses the serving network using the network in the foregoing embodiment, or may obtain the second network connection identifier using another procedure in which the terminal accesses the serving network using the network. This is not limited in this embodiment.

In another possible implementation, after obtaining the multicast service permission of the terminal in the foregoing manner, the session management network element may further obtain the second network connection identifier of the terminal, and establish the correspondence between the second network connection identifiers and the multicast service permission information of the terminal based on the multicast service permission information and the second network connection identifier of the terminal. After establishing the correspondence between the second network connection identifiers and the multicast service permission information of the terminal, the session management network element sends the correspondence between the second network connection identifiers and the multicast service permission information of the terminal to the user plane network element. In this way, the user plane network element may obtain the correspondence between the second network connection identifiers and the multicast service permission information of the terminal by receiving the correspondence that is between the second network connection identifiers and the multicast service permission information of the terminal from the session management network element.

For a manner in which the session management network element obtains the second network connection identifier, refer to the foregoing manner in which the user plane network element obtains the second network connection identifier. Details are not described herein again. For establishing, by the session management network element, the correspondence between the second network connection identifiers and the multicast service permission information of the terminal based on the multicast service permission information and the second network connection identifier of the terminal, refer to the foregoing description about establishing, by the user plane network element, the correspondence between the second network connection identifiers and the multicast service permission information of the terminal based on the multicast service permission information and the second network connection identifier of the terminal. Details are not described herein again.

Figure 12:
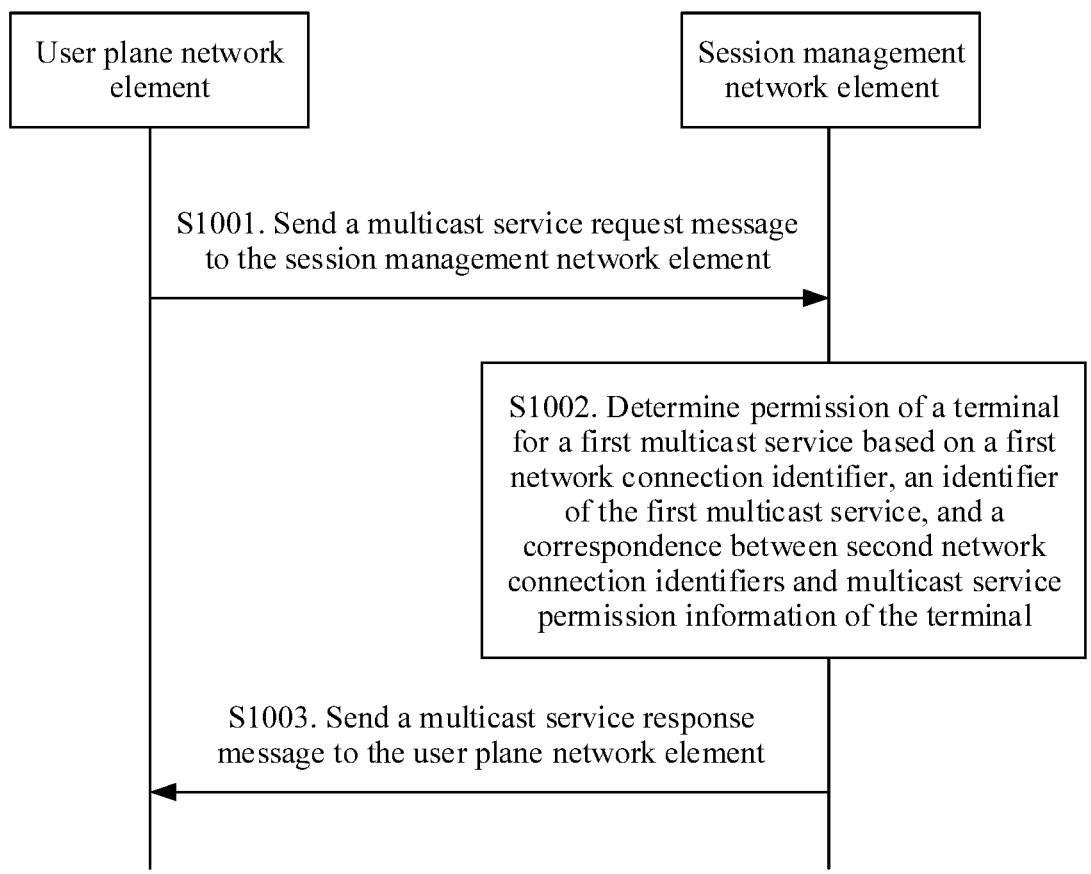
FIG. 12 is a flowchart of still another method for accessing serving network according to an embodiment of this application.

Manner 2: The session management network element may obtain a correspondence between the second network connection identifiers and the multicast service permission information of the terminal. Therefore, the user plane network element obtains the permission of the terminal for the first multicast service from the session management network element in the following manner. FIG. 12 is a flowchart of still another method for accessing serving network according to an embodiment of this application. As shown in FIG. 12, the method may include the following steps.

S1001. A user plane network element sends a multicast service request message to a session management network element.

The multicast service request message includes a first network connection identifier and an identifier of a first multicast service.

S1002. The session management network element determines permission of a terminal for the first multicast service based on the first network connection identifier, the identifier of the first multicast service, and a correspondence between second network connection identifiers and multicast service permission information of the terminal.

S1003. The session management network element sends a multicast service response message to the user plane network element.

The multicast service response message is used to indicate the permission of the terminal for the first multicast service.

In this embodiment, after obtaining the multicast service permission of the terminal in the foregoing manner, the session management network element may further obtain the second network connection identifier of the terminal, and establish the correspondence between the second network connection identifiers and the multicast service permission information of the terminal based on the multicast service permission information and the second network connection identifier of the terminal.

After obtaining the multicast service request message of the terminal, the user plane network element may send the multicast service request message to the session management network element. The session management network element may determine the permission of the terminal for the first multicast service based on the first network connection identifier and the identifier of the first multicast service that are carried in the multicast service request message and the correspondence that is established by the session management network element and that is between the second network connection identifiers and the multicast service permission information of the terminal. Description of that the session management network element determines the permission of the terminal for the first multicast service based on the first network connection identifier, the identifier of the first multicast service, and the correspondence between the second network connection identifiers and the multicast service permission information of the terminal, refer to the foregoing description of that the user plane network element determines the permission of the terminal for the first multicast service based on the first network connection identifier, the identifier of the first multicast service, and the correspondence between the second network connection identifiers and the multicast service permission information of the terminal. Details are not described herein again.

The method for accessing serving network provided in this embodiment of this application can enable an access network to control a multicast service of the terminal in a scenario in which the terminal accesses the serving network using the access network (for example, a wireless network), expanding a usage scenario of the serving network, and improving user experience.

The following describes, using an example, a detailed procedure of the method for accessing serving network provided in this embodiment of this application. In this example, the terminal is an STB, the access network is a wireless network, the serving network is an IPTV network, the session management network element is an SMF network element, the user plane network element is a UPF network element, a serving network management system network element is a BOSS network element on an IPTV network side, another network element that is in the serving network and that is configured to store multicast service permission information of the STB is an SMS network element, a network element that interacts with the SMS network element to obtain multicast service permission information of the STB and that is on an access network side is an NMS network element on a wireless network side, and a network element that is on the access network side and that stores the multicast service permission information of the terminal is a UDM network element.

The following first describes a process of adding the multicast service permission information of the STB to subscription information of the STB when a user subscribes to an IPTV multicast service.

Figure 13:
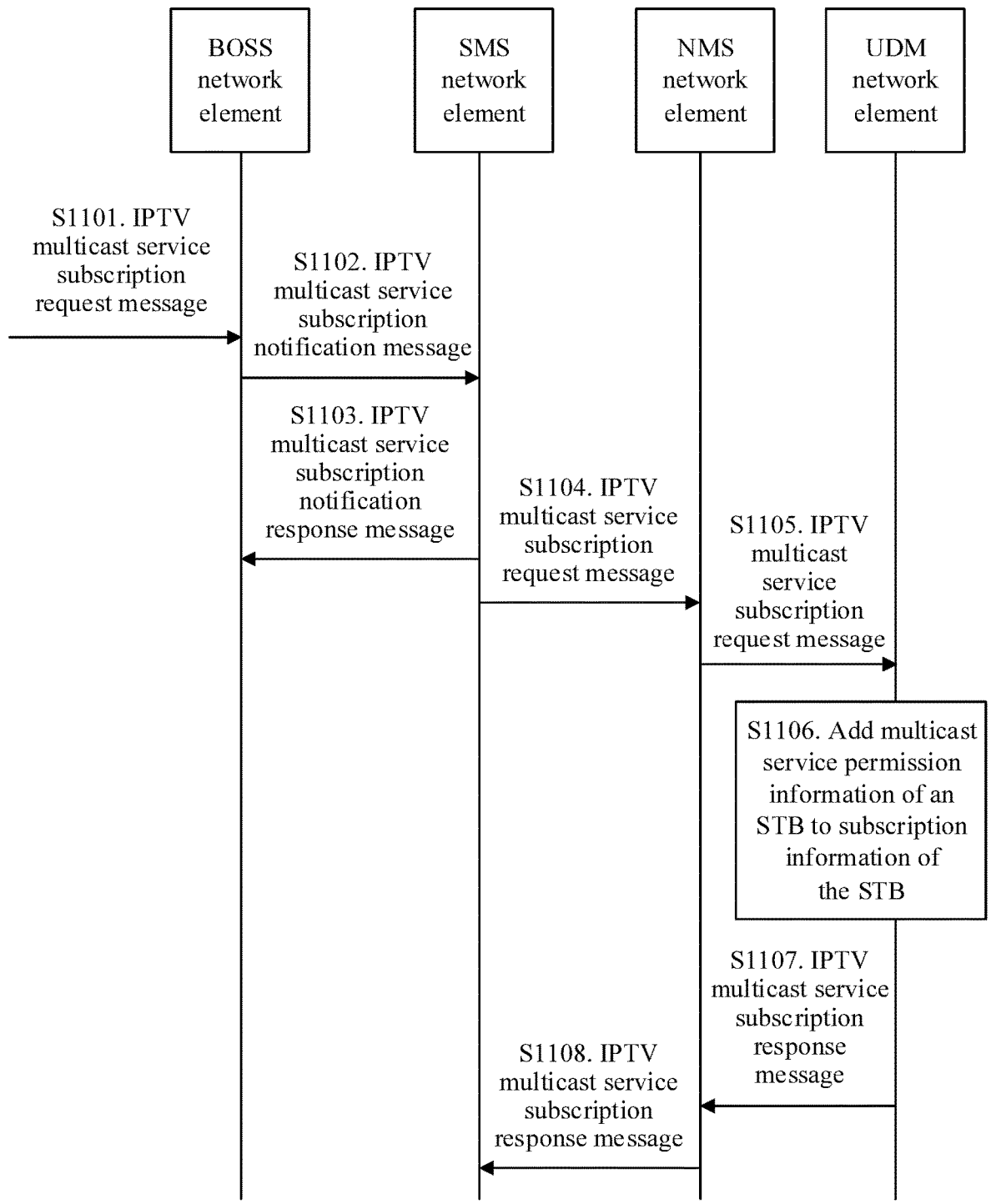
FIG. 13 is a flowchart of still another method for accessing serving network according to an embodiment of this application.

FIG. 13 is a flowchart of still another method for accessing serving network according to an embodiment of this application. As shown in FIG. 13, the method includes the following steps.

S1101. A BOSS network element receives an IPTV multicast service subscription request message.

An IPTV multicast service subscription request message may include an identifier of an STB and multicast service permission information of the STB. The multicast service permission information of the STB includes permission of the STB for at least one multicast service provided by an IPTV network.

For example, a user deploys an IPTV multicast service in a business hall of an IPTV operator. The IPTV multicast service subscription request message may be, for example, entered by a salesperson in the business hall to the BOSS network element.

S1102. The BOSS network element sends an IPTV multicast service subscription notification message to an SMS network element.

The IPTV multicast service subscription notification message includes the identifier of the STB and the multicast service permission information of the STB. The IPTV multicast service subscription notification message is used to instruct the SMS network element to add the multicast service permission information of the STB to information about the STB.

S1103: The SMS network element sends an IPTV multicast service subscription notification response message to the BOSS network element.

The IPTV multicast service subscription notification response message is used to notify the BOSS network element that the SMS network element has added the multicast service permission information of the STB to the information about the STB.

S1104. The SMS network element sends an IPTV multicast service subscription request message to an NMS network element.

The IPTV multicast service subscription request message is used to notify the STB that the multicast service of the IPTV network has been subscribed to. The IPTV multicast service subscription request message includes the identifier of the STB and the multicast service permission information of the STB.

It may be understood that there may be no sequence for performing S1104 and S1103.

S1105: The NMS network element sends an IPTV multicast service subscription request message to a UDM network element.

S1106. The UDM network element adds the multicast service permission information of the STB to subscription information of the STB.

After receiving the IPTV multicast service subscription request message, the UDM network element may search, based on the identifier of the STB, for subscription information of the STB that is stored in a local database, and add the multicast service permission information of the STB to the subscription information of the STB.

S1107: The UDM network element sends an IPTV multicast service subscription response message to the NMS network element.

The IPTV multicast service subscription response message is used to notify the NMS network element that the UDM network element has added the multicast service permission information of the STB to the subscription information of the STB.

S1108: The NMS network element sends an IPTV multicast service subscription response message to the SMS network element.

The IPTV multicast service subscription response message is used to notify the SMS network element that a wireless network has added the multicast service permission information of the STB to the subscription information of the STB.

After the foregoing procedure is executed, subsequently, when the STB uses a multicast service by accessing the IPTV network using the wireless network, the wireless network may control the multicast service of the STB based on the multicast service permission information of the STB.

It may be understood that the IPTV multicast service subscription notification message and the IPTV multicast service subscription notification response message are merely examples, and do not constitute a limitation on a message. During implementation, the IPTV multicast service subscription notification message may be replaced with any other message used to instruct a network element to add the multicast service permission information of the STB to the information about the STB, and the IPTV multicast service subscription notification response message may be replaced with any other message for notifying that the multicast service permission information of the STB has been added to the information about the STB. This is not limited herein.

After the STB accesses the IPTV network using the wireless network, a UPF network element on a wireless network side controls the multicast service of the STB based on a multicast service request message of the STB. For example, the following three implementations may be included.

Manner 1: The UPF network element establishes a correspondence between the multicast service permission information and second network connection identifiers of the STB, and controls the multicast service of the STB based on the correspondence.

Figure 14:
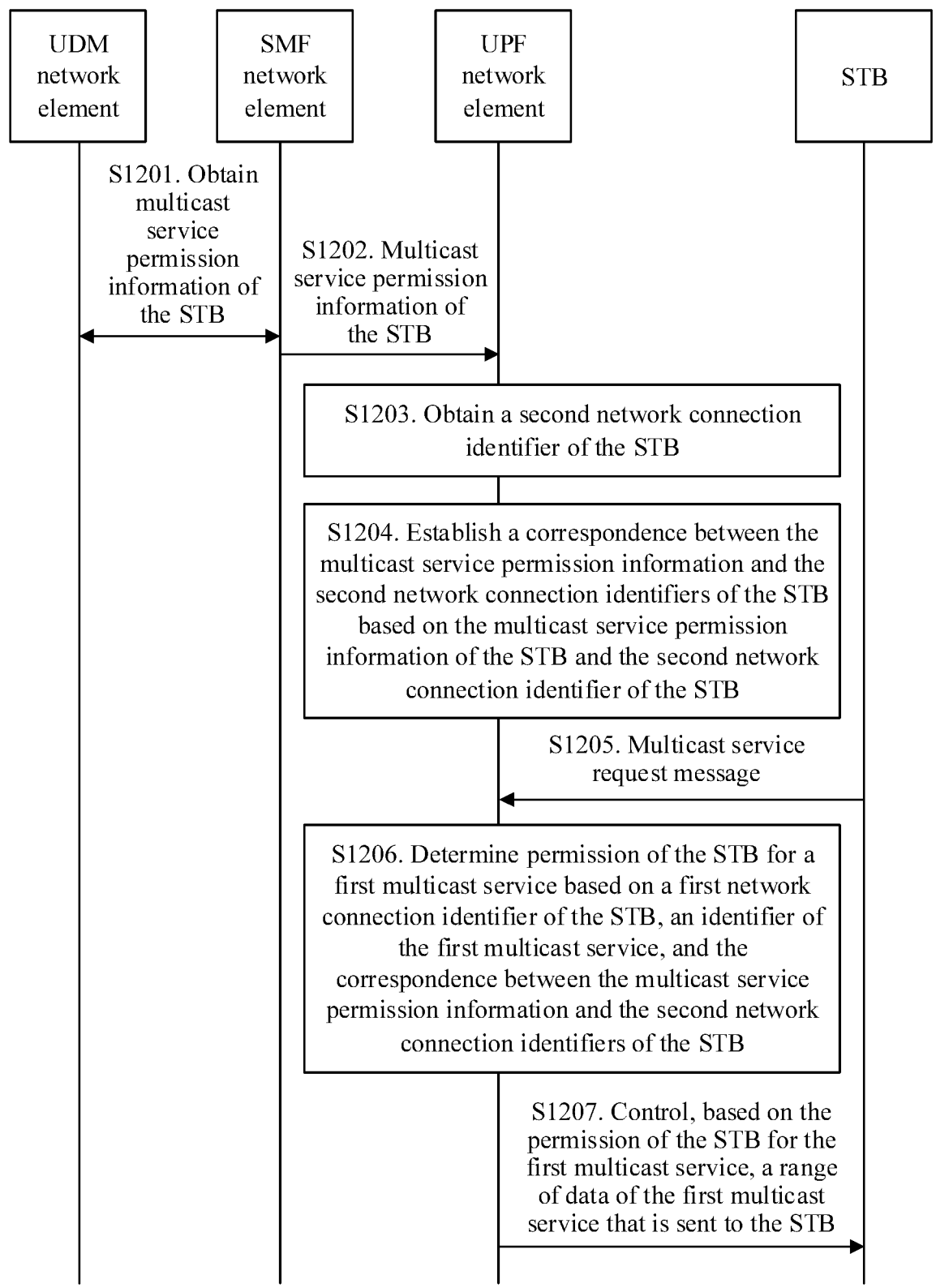
FIG. 14 is a flowchart of still another method for accessing serving network according to an embodiment of this application.

FIG. 14 is a flowchart of still another method for accessing serving network according to an embodiment of this application. As shown in FIG. 14, the method includes the following steps.

S1201. An SMF network element interacts with a UDM network element to obtain multicast service permission information of an STB.

For example, the SMF network element may interact with a UDM network element that stores the multicast service permission information of the STB on a wireless network side when an RG corresponding to the STB executes a session establishment procedure in a wireless network, to obtain the multicast service permission information of the STB. For example, the SMF network element may obtain the multicast service permission information of the STB when interacting with the UDM network element to obtain subscription information of the STB.

S1202. The SMF network element sends the multicast service permission information of the STB to a UPF network element.

S1203. The UPF network element obtains a second network connection identifier of the STB.

The UPF network element may obtain, when the RG corresponding to the STB performs, using the wireless network, a procedure of accessing an IPTV network, a second network connection identifier used when the STB accesses a serving network, for example, an IP address assigned by the IPTV network to the RG corresponding to the STB, a session identifier of a session established by the RG corresponding to the STB in the wireless network, or a tunnel endpoint identifier of a session established by the RG corresponding to the STB in the wireless network.

S1204. The UPF network element establishes a correspondence between the multicast service permission information and the second network connection identifiers of the STB based on the multicast service permission information of the STB and the second network connection identifier of the STB.

For example, the UPF network element may establish the correspondence between the multicast service permission information and the second network connection identifiers of the STB based on a correspondence between identifiers of the STB and the multicast service permission information of the STB and a correspondence between the identifiers of the STB and the second network connection identifiers.

S1205. The STB sends a multicast service request message to the UPF network element.

The multicast service request message includes an identifier of a first multicast service and a first network connection identifier. For example, the first network connection identifier may be, for example, the IP address assigned by the IPTV network to the RG corresponding to the STB.

In a possible implementation, the STB may add the first network connection identifier to the multicast service request message using the RG. For example, the STB may send an initial multicast service request message to the RG. The initial multicast service request message includes the identifier of the first multicast service and a network connection identifier of the STB in an intranet on an RG side. After receiving the initial multicast service request message, the RG converts the network connection identifier that is of the STB in the intranet on an RG side and that is carried in the initial multicast service request message into the first network connection identifier, to form the multicast service request message, and sends the multicast service request message to the UPF network element.

S1206. The UPF network element determines permission of the STB for the first multicast service based on the first network connection identifier of the STB, the identifier of the first multicast service, and the correspondence between the multicast service permission information and the second network connection identifiers of the STB.

When the first network connection identifier is the same as the second network connection identifier, the UPF network element may search the correspondence between the second network connection identifiers and the multicast service permission information of the STB for permission of the first multicast service that corresponds to the first network connection identifier and the identifier of the first multicast service, and use the permission of the first multicast service as the permission of the STB for the first multicast service.

When the first network connection identifier corresponds to the second network connection identifier, the UPF network element may determine the permission of the STB for the first multicast service based on the first network connection identifier, the identifier of the first multicast service, the correspondence between the second network connection identifiers and the multicast service permission information of the STB, and a correspondence between the first network connection identifiers and the second network connection identifiers.

S1207. The UPF network element controls, based on the permission of the STB for the first multicast service, a range of data of the first multicast service to the STB.

Manner 2: An SMF network element establishes a correspondence between the multicast service permission information and second network connection identifiers of the STB, and sends the correspondence to the UPF network element, such that the UPF network element controls the multicast service of the STB based on the correspondence.

Figure 15A:
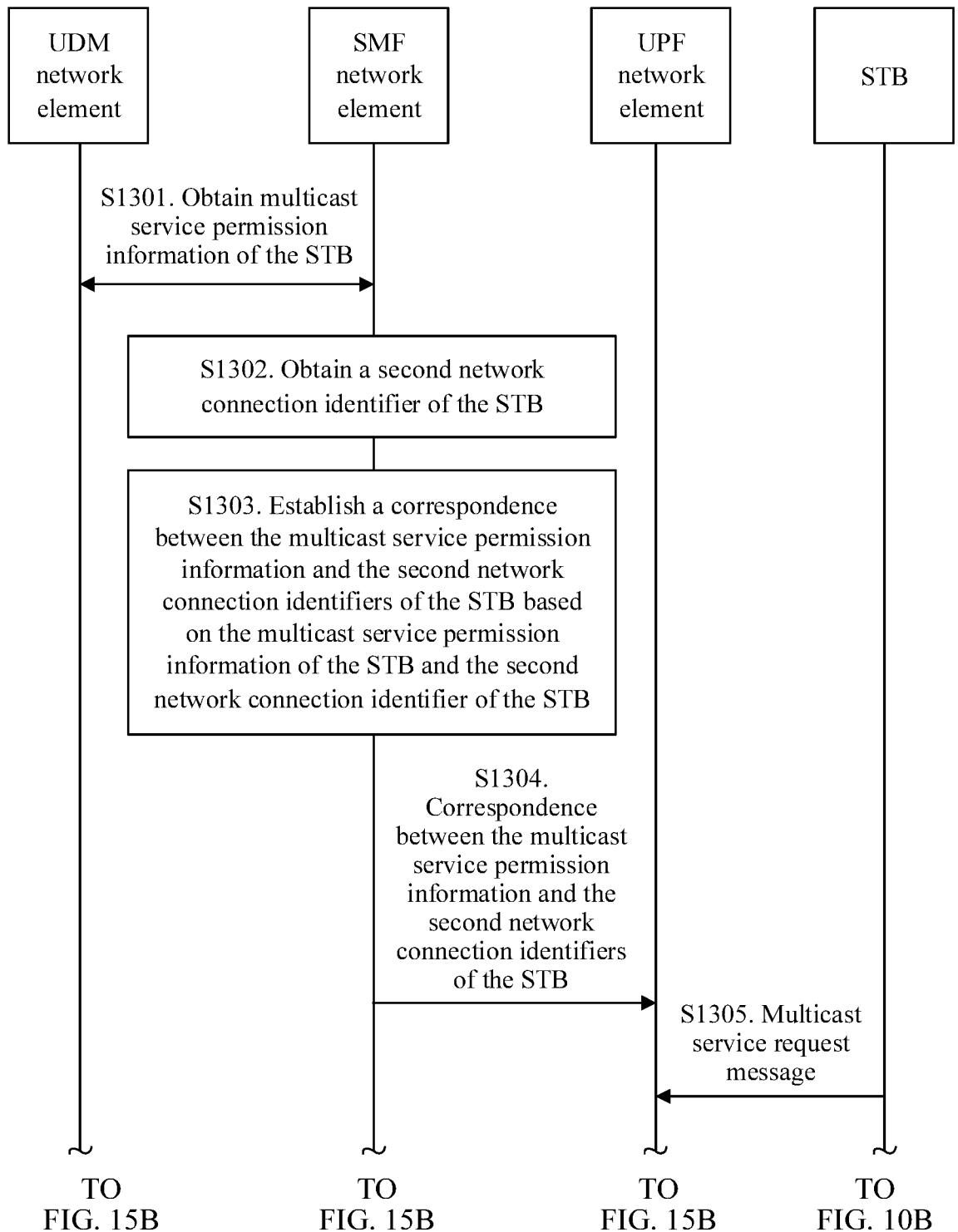
FIG. 15A and FIG. 15B are flowcharts of still another method for accessing serving network according to an embodiment of this application.
Figure 15B:
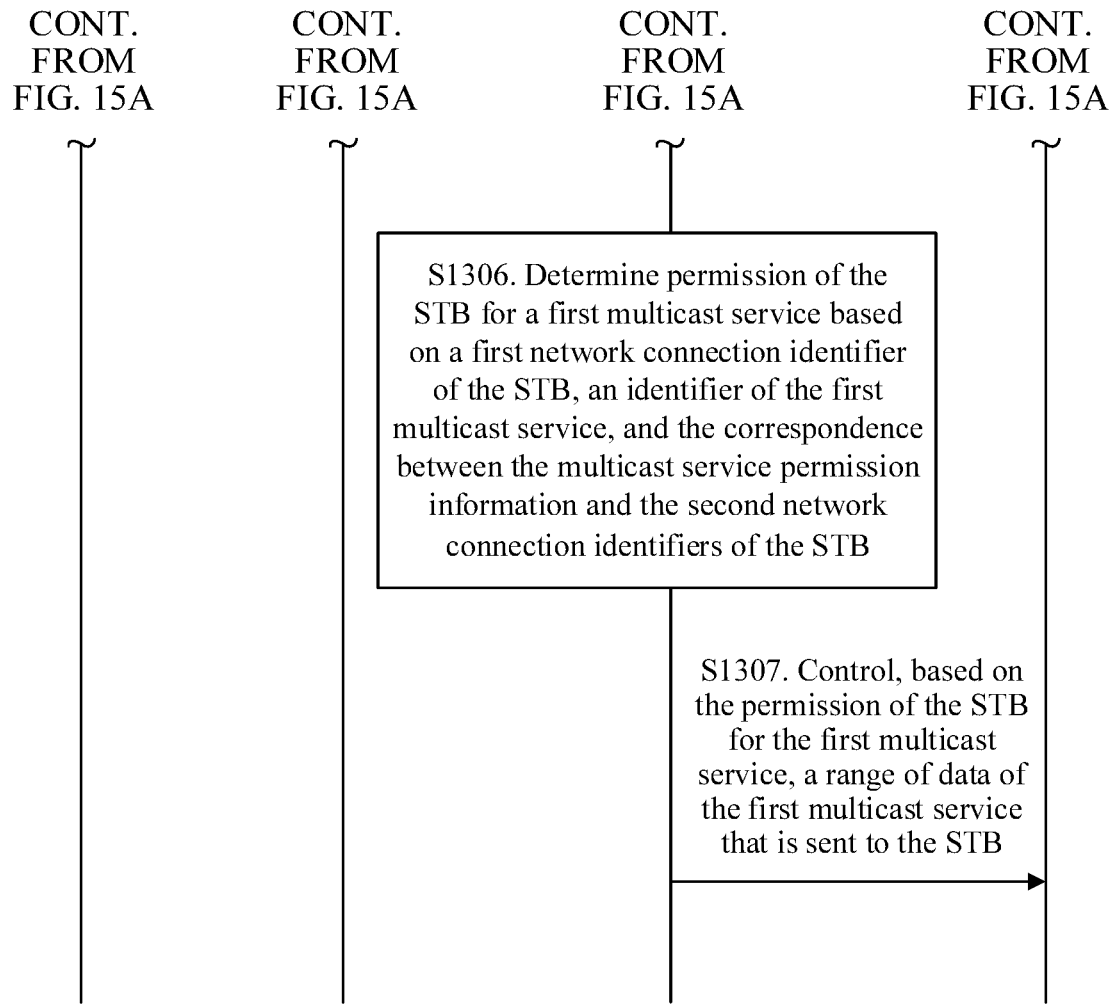

FIG. 15A and FIG. 15B are a flowchart of still another method for accessing serving network according to an embodiment of this application. As shown in FIG. 15A and FIG. 15B, the method includes the following steps.

S1301. An SMF network element interacts with a UDM network element to obtain multicast service permission information of an STB.

S1302. The SMF network element obtains a second network connection identifier of the STB.

S1303. The SMF network element establishes a correspondence between the multicast service permission information and the second network connection identifiers of the STB based on the multicast service permission information of the STB and the second network connection identifier of the STB.

S1304. The SMF network element sends the correspondence between the multicast service permission information and the second network connection identifiers of the STB to the UPF network element.

S1305. The STB sends a multicast service request message to the UPF network element.

The multicast service request message includes an identifier of a first multicast service and a first network connection identifier. For example, the first network connection identifier may be, for example, an IP address assigned by an IPTV network to an RG corresponding to the STB.

S1306. The UPF network element determines permission of the STB for the first multicast service based on the first network connection identifier of the STB, the identifier of the first multicast service, and the correspondence between the multicast service permission information and the second network connection identifiers of the STB.

S1307. The UPF network element controls, based on the permission of the STB for the first multicast service, a range of data of the first multicast service that is sent to the STB.

Manner 3: An SMF network element establishes a correspondence between the multicast service permission information and second network connection identifiers of the STB, and the UPF network element may obtain permission of the STB for a first multicast service from the SMF network element, and control the multicast service of the STB based on the permission.

Figure 16:
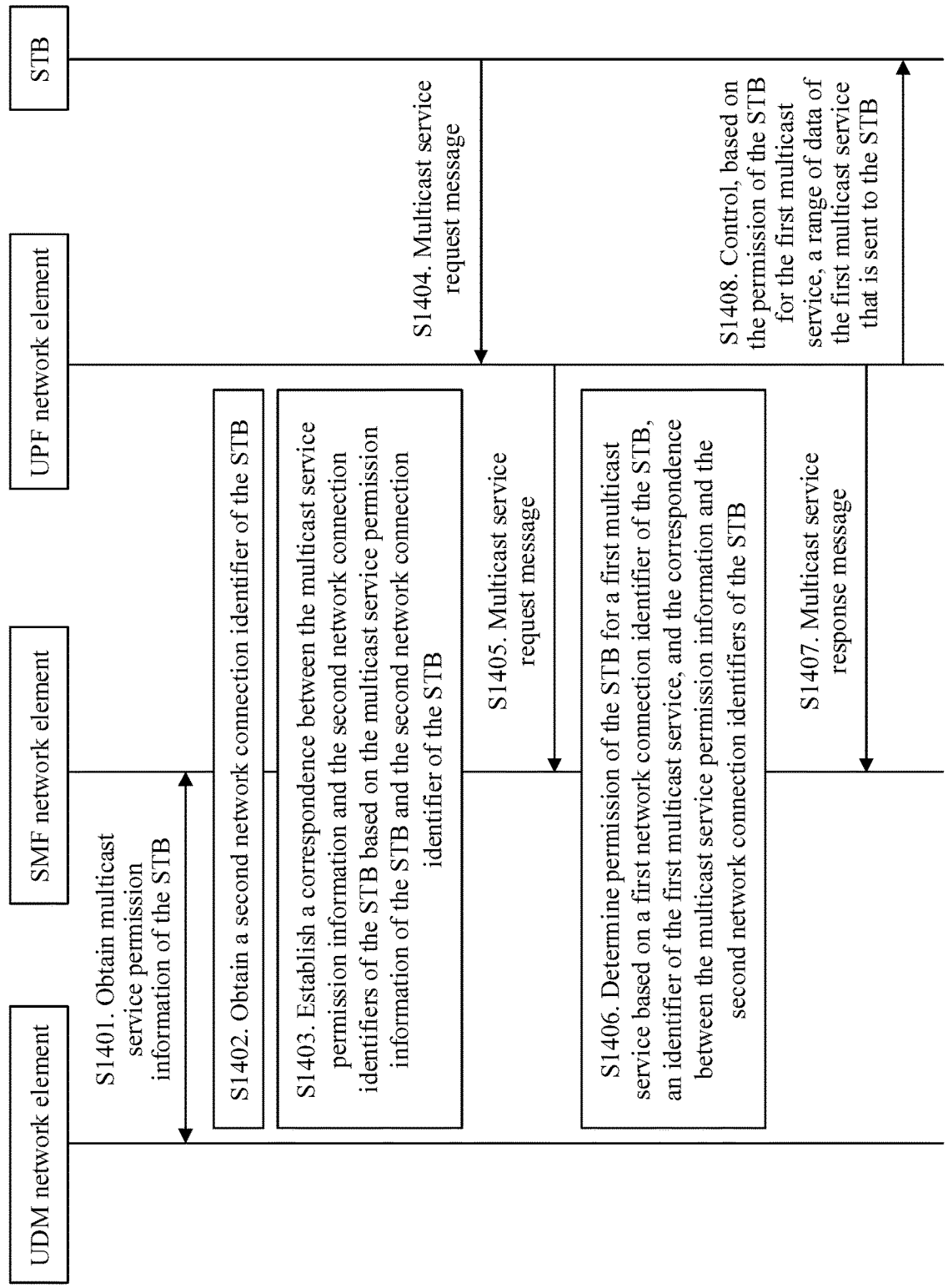
FIG. 16 is a flowchart of still another method for accessing serving network according to an embodiment of this application.

FIG. 16 is a flowchart of still another method for accessing serving network according to an embodiment of this application. As shown in FIG. 16, the method includes the following steps.

S1401. An SMF network element interacts with a UDM network element to obtain multicast service permission information of an STB.

S1402. The SMF network element obtains a second network connection identifier of the STB.

S1403. The SMF network element establishes a correspondence between the multicast service permission information and the second network connection identifiers of the STB based on the multicast service permission information of the STB and the second network connection identifier of the STB.

S1404. The STB sends a multicast service request message to a UPF network element.

The multicast service request message includes an identifier of a first multicast service and a first network connection identifier. For example, the first network connection identifier may be, for example, an IP address assigned by an IPTV network to an RG corresponding to the STB.

S1405. The UPF network element sends a multicast service request message to the SMF network element.

S1406. The SMF network element determines permission of the STB for the first multicast service based on the first network connection identifier of the STB, the identifier of the first multicast service, and the correspondence between the multicast service permission information and the second network connection identifiers of the STB.

S1407. The SMF network element sends a multicast service response message to the UPF network element.

The multicast service response message is used to indicate the permission of the STB for the first multicast service.

S1408. The UPF network element controls, based on the permission of the STB for the first multicast service, a range of data of the first multicast service that is sent to the STB.

The method for accessing serving network provided in this embodiment of this application can enable a wireless network to control a multicast service of the STB based on the multicast service permission information of the STB in a scenario in which the STB accesses an IPTV network using the wireless network, such that a usage scenario of the IPTV network is expanded, and user experience is improved.

Figure 17:
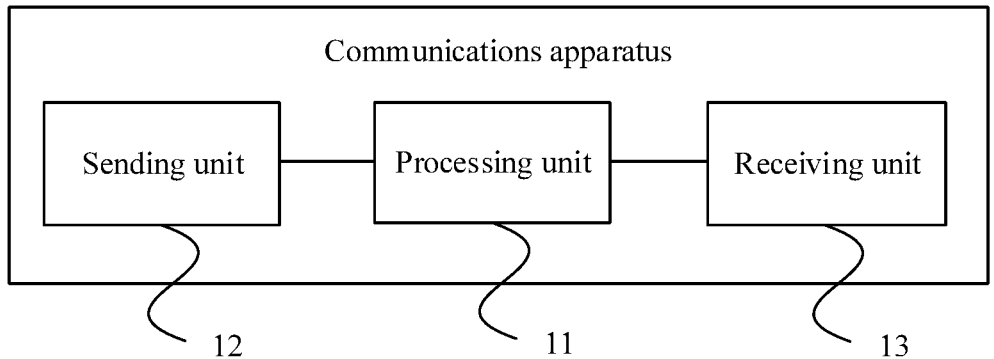
FIG. 17 is a schematic structural diagram of a communications apparatus according to an embodiment of this application.

FIG. 17 is a schematic structural diagram of a communications apparatus according to an embodiment of this application. The communications apparatus in this embodiment may be the foregoing user plane network element, or may be a chip applied to a user plane network element. The communications apparatus may be configured to perform the actions of the user plane network element in the foregoing method embodiment. As shown in FIG. 17, the communications apparatus may include a processing unit 11 and a sending unit 12. Optionally, the communications apparatus may further include a receiving unit 13.

The processing unit 11 is configured to obtain an access message, where the access message is for a terminal accessing a serving network, and the access message includes authentication information of the terminal in the serving network.

The sending unit 12 is configured to send the access message to the serving network.

In a possible implementation, the receiving unit 13 is configured to receive the authentication information from a session management network element and an initial access message from the terminal. In this implementation, the processing unit 11 is configured to obtain the access message based on the initial access message and the authentication information. In another possible implementation, the processing unit 11 is configured to receive the access message from a session management network element.

In a possible implementation, the processing unit 11 is further configured to: obtain a feedback message of the access message from the serving network, where the feedback message includes identification information of the terminal; and control, based on the identification information of the terminal, the sending unit 12 to send the feedback message to the terminal. For example, the processing unit 11 is configured to: determine session information of the terminal based on a mapping relationship between the identification information of the terminal and the session information of the terminal; and control the sending unit 12 to send the feedback message to the terminal through a session corresponding to the session information of the terminal.

In this implementation, the receiving unit 13 is configured to receive the identification information of the terminal and the session information of the terminal from the session management network element; the processing unit 11 is further configured to establish the mapping relationship between the identification information of the terminal and the session information of the terminal. Alternatively, the receiving unit 13 is configured to receive the mapping relationship that is between the identification information of the terminal and the session information of the terminal and that is sent from the session management network element. Alternatively, the receiving unit 13 is configured to receive the session information of the terminal from the session management network element; the processing unit 11 is further configured to: obtain the initial access message from the terminal; and establish the mapping relationship between the identification information of the terminal and the session information of the terminal, where the initial access message includes the identification information of the terminal.

In another possible implementation, the receiving unit 13 is configured to receive the feedback message that is of the serving network for the access message and that is sent from the session management network element, where the feedback message includes the session information of the terminal. The processing unit 11 is further configured to control, based on the session corresponding to the session information of the terminal, the sending unit 12 to send the feedback message to the terminal In a possible implementation, the access message obtained by the processing unit 11 includes first address information assigned by the session management network element to the terminal and second address information assigned by the serving network to the terminal. In this implementation, the processing unit 11 is further configured to delete the first address information in the access message, and the sending unit 12 is configured to send, to the serving network, an access message obtained after the first address information is deleted. Correspondingly, the feedback message obtained by the processing unit 11 includes second address information assigned by the serving network to the terminal. In this implementation, the processing unit 11 is further configured to: obtain first address information allocated by the session management network element to the terminal; and add the first address information to the feedback message. The sending unit 12 is configured to send the feedback message to the terminal, where the feedback message includes the first address information and the second address information.

The communications apparatus provided in this embodiment of this application may perform the actions of the user plane network element in the foregoing method embodiment. Implementation principles and technical effects of the communications apparatus are similar to those in the method embodiment. Details are not described herein again.

Figure 18:
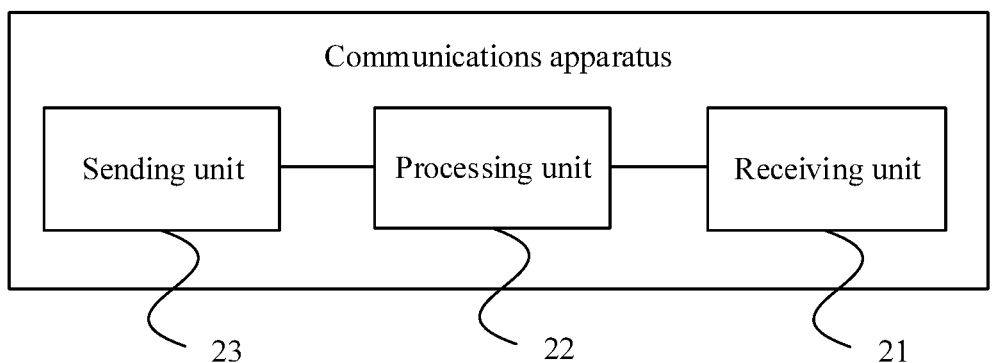
FIG. 18 is a schematic structural diagram of another communications apparatus according to an embodiment of this application.

FIG. 18 is a schematic structural diagram of another communications apparatus according to an embodiment of this application. The communications apparatus in this embodiment may be the foregoing session management network element, or may be a chip applied to a session management network element. The communications apparatus may be configured to perform the actions of the session management network element in the foregoing method embodiment. As shown in FIG. 18, the communications apparatus may include a receiving unit 21, a processing unit 22, and a sending unit 23.

The receiving unit 21 is configured to receive a session establishment request message from a terminal, where the session establishment request message requests to establish a session for the terminal.

The processing unit 22 is configured to obtain authentication information of the terminal in a serving network, where the authentication request message is for the terminal accessing the serving network.

The sending unit 23 is configured to send the authentication information to a user plane network element.

In a possible implementation, the processing unit 22 is configured to obtain the authentication information from a data management network element, a policy control network element, a local database, or an access management network element. In another possible implementation, the receiving unit 21 is further configured to receive an initial access message from the terminal. The processing unit 22 is further configured to obtain an access message based on the initial access message and the authentication information, where the access message includes the authentication information. The sending unit 23 is configured to send the access message to the user plane network element.

In a possible implementation, the processing unit 22 is further configured to: obtain identification information of the serving network based on the session establishment request message; and determine, based on the identification information of the serving network, a policy control network element for providing a policy for the serving network. The sending unit 23 is further configured to notify the policy control network element that the terminal is to obtain a service from the serving network, and the receiving unit 21 is further configured to receive the policy of the serving network from the policy control network element.

In a possible implementation, the processing unit 22 is further configured to obtain identification information of the terminal and session information of the terminal; the sending unit 23 is further configured to send the identification information of the terminal and the session information of the terminal to the user plane network element. Alternatively, the processing unit 22 is further configured to obtain session information of the terminal; the sending unit 23 is further configured to send the session information of the terminal to the user plane network element. In another possible implementation, the processing unit 22 is further configured to: obtain identification information of the terminal; and establish a mapping relationship between the identification information of the terminal and session information of the terminal based on the identification information of the terminal and the session information of the terminal, and the sending unit 23 is further configured to send the mapping relationship to the user plane network element. For example, the processing unit 22 is configured to obtain the identification information of the terminal from the data management network element, the policy control network element, the local database, or the access management network element. Alternatively, the processing unit 22 is configured to receive, using the receiving unit 21, the initial access message from the terminal, where the initial access message includes the identification information of the terminal.

In another possible implementation, the receiving unit 21 is further configured to receive a feedback message of the access message from the serving network, where the feedback message includes identification information of the terminal. The processing unit 22 is further configured to determine session information of the terminal based on the identification information of the terminal and a mapping relationship between the identification information of the terminal and the session information of the terminal. The sending unit 23 is further configured to send the feedback message to the user plane network element, where the feedback message includes the session information of the terminal.

The communications apparatus provided in this embodiment of this application may perform the actions of the session management network element in the foregoing method embodiment. Implementation principles and technical effects of the communications apparatus are similar to those in the method embodiment. Details are not described herein again.

Figure 19:
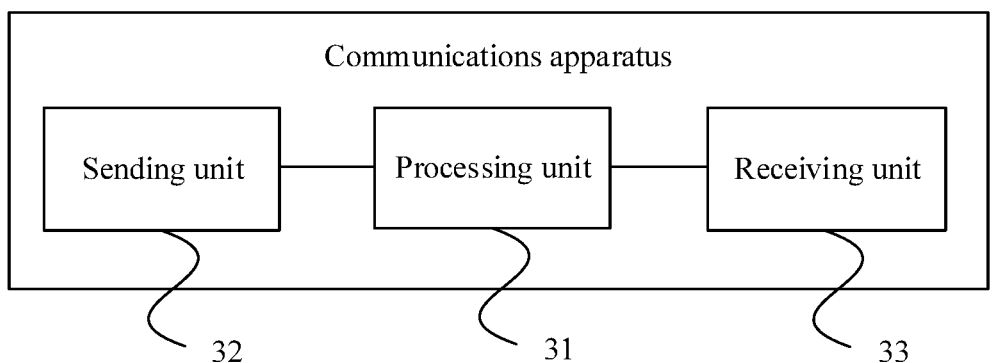
FIG. 19 is a schematic structural diagram of still another communications apparatus according to an embodiment of this application.

FIG. 19 is a schematic structural diagram of still another communications apparatus according to an embodiment of this application. The communications apparatus in this embodiment may be the foregoing terminal, or may be a chip applied to a terminal. The communications apparatus may be configured to perform the actions of the terminal in the foregoing method embodiment. As shown in FIG. 19, the communications apparatus may include a processing unit 31 and a sending unit 32. Optionally, the communications apparatus may further include a receiving unit 33.

The processing unit 31 is configured to determine to establish a session. For example, the processing unit 31 is configured to: determine, when receiving data of the serving network from a client, to establish the session; or determine, when completing a registration procedure in a mobile network, to establish the session.

The sending unit 32 is configured to send a session establishment request message to a session management network element, where the session establishment request message requests the session management network element to establish the session.

In a possible implementation, the sending unit 32 is further configured to send an initial access message to the serving network after the session is established, where the initial access message requests to access the serving network. For example, the sending unit 32 is configured to send the initial access message to the serving network when receiving the data of the serving network from the client.

In a possible implementation, the session establishment request message includes instruction information, and the instruction information is used to instruct the apparatus to obtain an IP address from the serving network. For example, the instruction information includes: instruction information for IP address allocation via dynamic host configuration protocol or identification information of an Ethernet type of the session.

In a possible implementation, the receiving unit 33 is configured to receive a session establishment response message from the session management network element, where the session establishment response message includes first address information allocated by the session management network element. The processing unit 31 is further configured to obtain a feedback message for the initial access message, where the feedback message includes second address information allocated by the serving network. The sending unit 32 is further configured to send an uplink message to the serving network, where the uplink message includes the first address information and the second address information. The receiving unit 33 is further configured to receive a downlink message from the serving network, where the downlink message includes the first address information and the second address information. The processing unit 31 is further configured to delete the first address information in the downlink message.

The communications apparatus provided in this embodiment of this application may perform the actions of the terminal in the foregoing method embodiment. Implementation principles and technical effects of the communications apparatus are similar to those in the method embodiment. Details are not described herein again.

Figure 20:
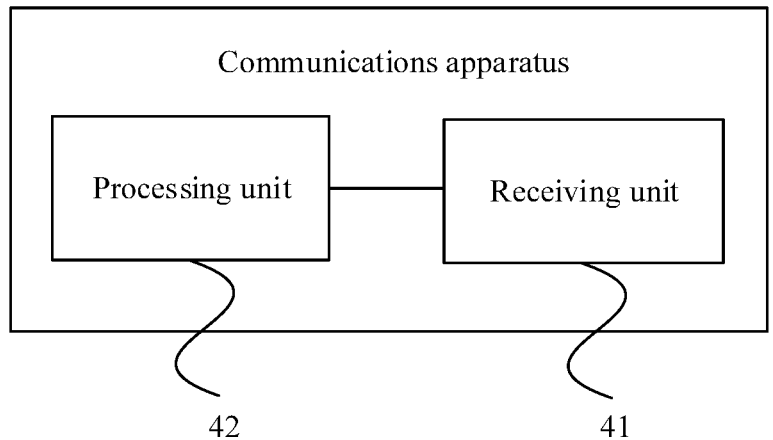
FIG. 20 is a schematic structural diagram of still another communications apparatus according to an embodiment of this application.

FIG. 20 is a schematic structural diagram of still another communications apparatus according to an embodiment of this application. The communications apparatus in this embodiment may be the foregoing data management network element, or may be a chip applied to a data management network element, and is configured to perform the actions of the data management network element in the foregoing method embodiment. Alternatively, the communications apparatus in this embodiment may be the foregoing policy control network element, or may be a chip applied to a policy control network element, and is configured to perform the actions of the policy control network element in the foregoing method embodiment. As shown in FIG. 20, the communications apparatus may include a receiving unit 41 and a processing unit 42.

The receiving unit 41 is configured to receive authentication information of a terminal in a serving network.

The processing unit 42 is configured to use the authentication information of the terminal in the serving network as information about the terminal.

The communications apparatus provided in this embodiment of this application may perform the actions of the data management network element or the policy control network element in the foregoing method embodiment. Implementation principles and technical effects of the communications apparatus are similar to those in the method embodiment. Details are not described herein again.

Figure 21:
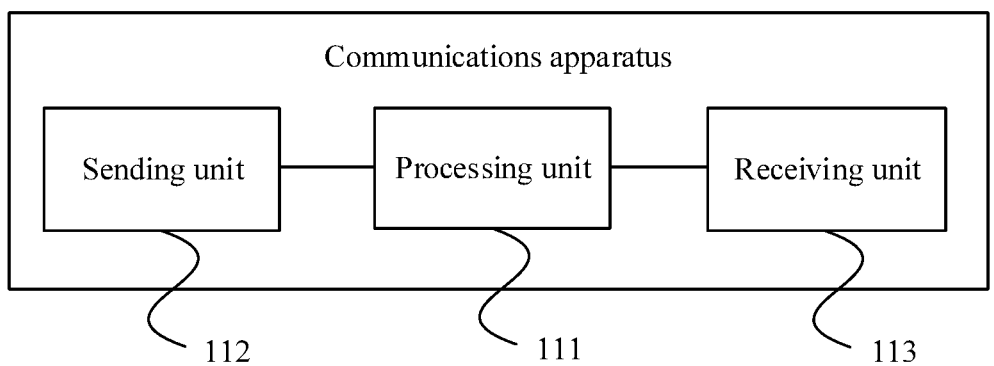
FIG. 21 is a schematic structural diagram of still another communications apparatus according to an embodiment of this application.

FIG. 21 is a schematic structural diagram of still another communications apparatus according to an embodiment of this application. The communications apparatus in this embodiment may be the foregoing user plane network element, or may be a chip applied to a user plane network element. The communications apparatus may be configured to perform the actions of the user plane network element in the foregoing method embodiment. As shown in FIG. 21, the communications apparatus may include a processing unit 111 and a sending unit 112. Optionally, the communications apparatus may further include a receiving unit 113.

The processing unit 111 is configured to: obtain a multicast service request message; determine permission of the terminal for the first multicast service based on the first network connection identifier and an identifier of the first multicast service; and control, based on the permission of the terminal for the first multicast service, a range of data of the first multicast service from a sending unit 112 to the terminal. The multicast service request message is used by the terminal to request to obtain data of the first multicast service provided by a serving network. The multicast service request message includes the first network connection identifier and the identifier of the first multicast service, the first network connection identifier is a network connection identifier used when the terminal accesses the serving network, and the first multicast service is one of at least one multicast service provided by the serving network. The first network connection identifier herein may include, for example, any one of the following: address information assigned by the serving network, a session identifier, or a tunnel endpoint identifier.

In a possible implementation, the processing unit 111 is configured to determine the permission of the terminal for the first multicast service based on the first network connection identifier, the identifier of the first multicast service, and a correspondence between second network connection identifiers and multicast service permission information of the terminal. The multicast service permission information includes permission of the terminal for the at least one multicast service. The second network connection identifier is a network connection identifier used when the terminal accesses the serving network. The first network connection identifier is the same as the second network connection identifier, or the first network connection identifier corresponds to the second network identifier. The second network connection identifier herein may include, for example, any one of the following: the address information assigned by the serving network, the session identifier, or the tunnel endpoint identifier.

When the first network connection identifier corresponds to the second network identifier, the processing unit 111 is configured to determine the permission of the terminal for the first multicast service based on the first network connection identifier, the identifier of the first multicast service, the correspondence between the second network connection identifiers and the multicast service permission information of the terminal, and a correspondence between the first network connection identifiers and the second network connection identifiers.

In the foregoing implementation, the processing unit 111 is further configured to obtain the correspondence between the second network connection identifiers and the multicast service permission information of the terminal. For example, the processing unit 111 is configured to receive, using the receiving unit 113, the correspondence from a session management network element.

Alternatively, the processing unit 111 is configured to: obtain the multicast service permission information and the second network connection identifier of the terminal; and establish the correspondence based on the multicast service permission information and the second network connection identifier of the terminal. During implementation, the processing unit 111 is configured to establish the correspondence based on a correspondence between identifiers of the terminal and the multicast service permission information of the terminal and a correspondence between the identifiers of the terminal and the second network connection identifiers. Optionally, the processing unit 111 is configured to receive, using the receiving unit 113, the multicast service permission information of the terminal from a session management network element.

In another possible implementation, the processing unit 111 is configured to: send, using the sending unit 112, the multicast service request message to a session management network element; and receive, using the receiving unit 113, a multicast service response message from the session management network element, where the multicast service response message is used to indicate the permission of the terminal for the first multicast service.

The communications apparatus provided in this embodiment of this application may perform the actions of the user plane network element in FIG. 11 to FIG. 16. Implementation principles and technical effects of the communications apparatus are similar to those in the method embodiment. Details are not described herein again.

Figure 22:
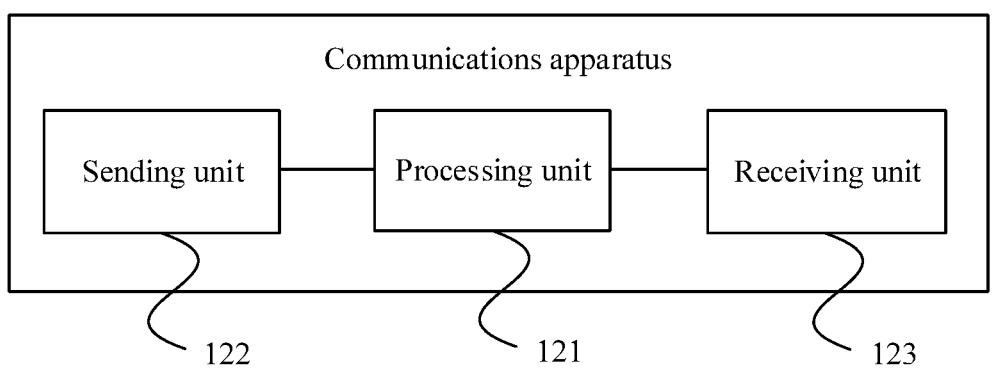
FIG. 22 is a schematic structural diagram of still another communications apparatus according to an embodiment of this application.

FIG. 22 is a schematic structural diagram of still another communications apparatus according to an embodiment of this application. The communications apparatus in this embodiment may be the foregoing session management network element, or may be a chip applied to a session management network element. The communications apparatus may be configured to perform the actions of the session management network element in the foregoing method embodiment. As shown in FIG. 22, the communications apparatus may include a processing unit 121. Optionally, the communications apparatus may further include a sending unit 122 and a receiving unit 123.

The processing unit 121 is configured to obtain multicast service permission information of a terminal, where the multicast service permission information includes permission of the terminal for at least one multicast service provided by a serving network. For example, the processing unit 121 is configured to obtain the multicast service permission information of the terminal from a data management network element, a policy control network element, a network exposure network element, or a network management network element.

In a possible implementation, the sending unit 122 is configured to send the multicast service permission information of the terminal to a user plane network element.

In a possible implementation, the processing unit 121 is further configured to: obtain a second network connection identifier; and establish a correspondence between the second network connection identifiers and the multicast service permission information of the terminal based on the multicast service permission information and the second network connection identifier of the terminal, where the second network connection identifier is a network connection identifier used when the terminal accesses the serving network. The sending unit 122 is configured to send the correspondence to a user plane network element. In this implementation, the processing unit 121 is configured to establish the correspondence between the second network connection identifiers and the multicast service permission information of the terminal based on a correspondence between identifiers of the terminal and the multicast service permission information of the terminal and a correspondence between the identifiers of the terminal and the second network connection identifiers. The second network connection identifier may include, for example, any one of the following: address information assigned by the serving network, a session identifier, or a tunnel endpoint identifier.

In a possible implementation, the processing unit 121 is further configured to: obtain a second network connection identifier; and establish a correspondence between the second network connection identifiers and the multicast service permission information of the terminal based on the multicast service permission information and the second network connection identifier of the terminal, where the second network connection identifier is a network connection identifier used when the terminal accesses the serving network. The receiving unit 123 is configured to receive a multicast service request message from a user plane network element, where the multicast service request message is used by the terminal to request to obtain data of a first multicast service provided by the serving network, the multicast service request message includes a first network connection identifier and an identifier of the first multicast service, the first multicast service is one of at least one multicast service provided by the serving network, the first network connection identifier is a network connection identifier used when the terminal accesses the serving network, and the first network connection identifier is the same as the second network connection identifier, or the first network connection identifier corresponds to the second network identifier. The processing unit 121 is further configured to determine permission of the terminal for the first multicast service based on the first network connection identifier, the identifier of the first multicast service, and the correspondence between the second network connection identifiers and the multicast service permission information of the terminal. The sending unit 122 is configured to send a multicast service response message to the user plane network element, where the multicast service response message is used to indicate the permission of the terminal for the first multicast service. The first network connection identifier may include, for example, any one of the following: address information assigned by the serving network, a session identifier, and a tunnel endpoint identifier.

In this implementation, when the first network connection identifier corresponds to the second network identifier, the processing unit 121 is configured to determine the permission of the terminal for the first multicast service based on the first network connection identifier, the identifier of the first multicast service, the correspondence between the second network connection identifiers and the multicast service permission information of the terminal, and a correspondence between the first network connection identifiers and the second network connection identifiers.

In this implementation, the processing unit 121 is configured to establish the correspondence between the second network connection identifiers and the multicast service permission information of the terminal based on a correspondence between identifiers of the terminal and the multicast service permission information of the terminal and a correspondence between the identifiers of the terminal and the second network connection identifiers.

The communications apparatus provided in this embodiment of this application may perform the actions of the session management network element in FIG. 11 to FIG. 16. Implementation principles and technical effects of the communications apparatus are similar to those in the method embodiment. Details are not described herein again.

Figure 23:
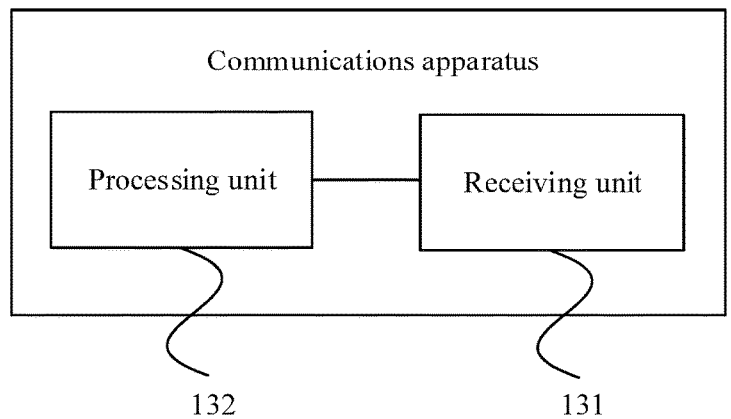
FIG. 23 is a schematic structural diagram of still another communications apparatus according to an embodiment of this application.

FIG. 23 is a schematic structural diagram of still another communications apparatus according to an embodiment of this application. The communications apparatus in this embodiment may be the foregoing network element that is on the access network side and that is configured to store the multicast service permission information of the terminal, for example, a data management network element (for example, a UDM network element), a policy control network element (for example, a PCF network element), a network exposure network element (for example, an NEF network element), or a network management network element (for example, an NMS network element), or may be a chip applied to a network element that is on an access network side and that is configured to store multicast service permission information of a terminal, and is configured to perform the actions of the network element that is on the access network side and that is configured to store the multicast service permission information of the terminal in the foregoing method embodiment. As shown in FIG. 23, the communications apparatus may include a receiving unit 131 and a processing unit 132.

The receiving unit 131 is configured to receive multicast service permission information of a terminal, where the multicast service permission information includes permission of the terminal for at least one multicast service provided by the serving network.

The processing unit 132 is configured to use the multicast service permission information of the terminal as information about the terminal.

The communications apparatus provided in this embodiment of this application may perform the actions of the network element that is on the access network side and that is configured to store the multicast service permission information of the terminal in the foregoing method embodiment. Implementation principles and technical effects of the communications apparatus are similar to those in the method embodiment. Details are not described herein again.

It should be noted that, it should be understood that the receiving unit may be a receiver during actual implementation, and the sending unit may be a transmitter during actual implementation. The processing unit may be implemented in a form of software invoked by a processing element, or may be implemented in a form of hardware. For example, the processing unit may be a processing element separately disposed, or may be integrated into a chip of the foregoing apparatus for implementation. In addition, the processing unit may be stored in a memory of the foregoing apparatus in a form of program code, and is invoked by a processing element of the foregoing apparatus to perform a function of the processing unit. In addition, the units may be all or partially integrated, or may be implemented independently. The processing element may be an integrated circuit and has a signal processing capability. In an implementation process, steps in the foregoing method or the foregoing units can be implemented using a hardware integrated logical circuit in the processing element, or using instructions in a form of software.

For example, the units may be configured as one or more integrated circuits for implementing the method, such as one or more application-specific integrated circuits (ASIC), one or more microprocessors (DSP), or one or more field programmable gate arrays (FPGA). For another example, when a unit is implemented by scheduling program code by a processing element, the processing component may be a general-purpose processor, for example, a central processing unit (CPU) or another processor that can invoke the program code. For another example, the units may be integrated together and implemented in a form of a system-on-a-chip (SOC).

Figure 24:
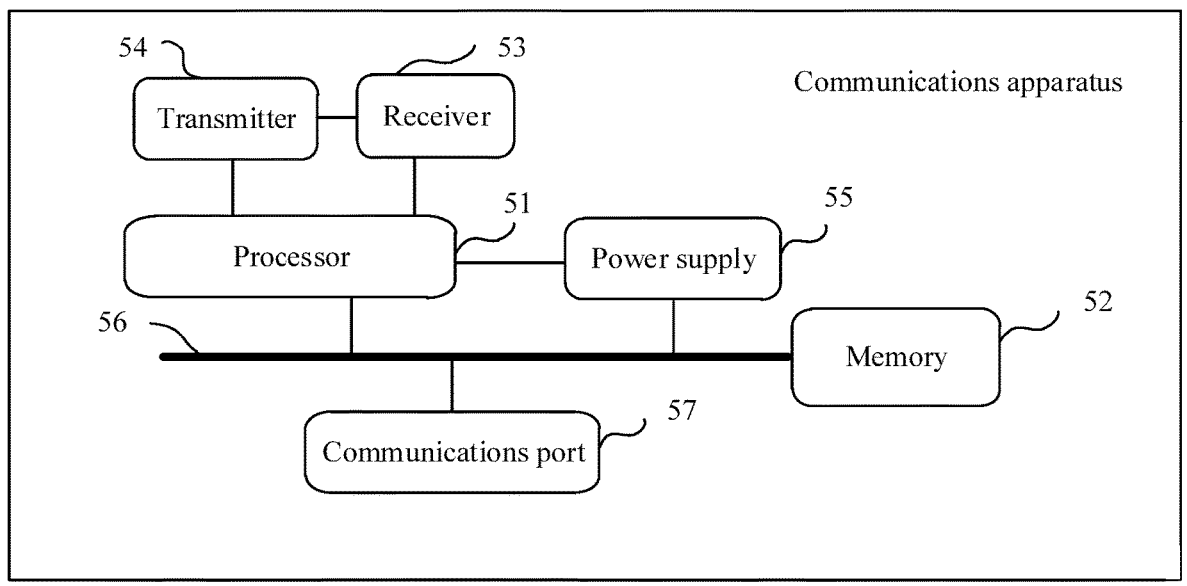
FIG. 24 is a schematic structural diagram of still another communications apparatus according to an embodiment of this application.

FIG. 24 is a schematic structural diagram of still another communications apparatus according to an embodiment of this application. As shown in FIG. 24, the communications apparatus may include a processor 51 (for example, a CPU), a memory 52, a receiver 53, and a transmitter 54. The receiver 53 and the transmitter 54 are both coupled to the processor 51. The processor 51 controls a receiving action of the receiver 53, and the processor 51 controls a sending action of the transmitter 54. The memory 52 may include a high-speed random access memory (RAM), and may further include a non-volatile memory (NVM), for example, at least one magnetic disk storage device. The memory 52 may store various instructions for completing various processing functions and implementing the method steps in this application. Optionally, the communications apparatus in this application may further include a power supply 55, a communications bus 56, and a communications port 57. The receiver 53 and the transmitter 54 may be integrated into a transceiver of the communications apparatus, or may be independent transceiver antennas on the communications apparatus. The communications bus 56 is configured to implement communication connection between elements. The communications port 57 is configured to implement connection and communication between the communications apparatus and other peripherals.

In this embodiment of this application, the memory 52 is configured to store computer executable program code. The program code includes an instruction. When the processor 51 executes the instruction, the instruction enables the processor 51 of the communications apparatus to perform a processing action of the user plane network element in the foregoing method embodiment, enables the receiver 53 to perform a receiving action of the user plane network element in the foregoing method embodiment, and enables the transmitter 54 to perform a sending action of the user plane network element in the foregoing method embodiment. Implementation principles and technical effects of the processor 51, the receiver 53, and the transmitter 54 are similar to those in the method embodiment. Details are not described herein again.

Figure 25:
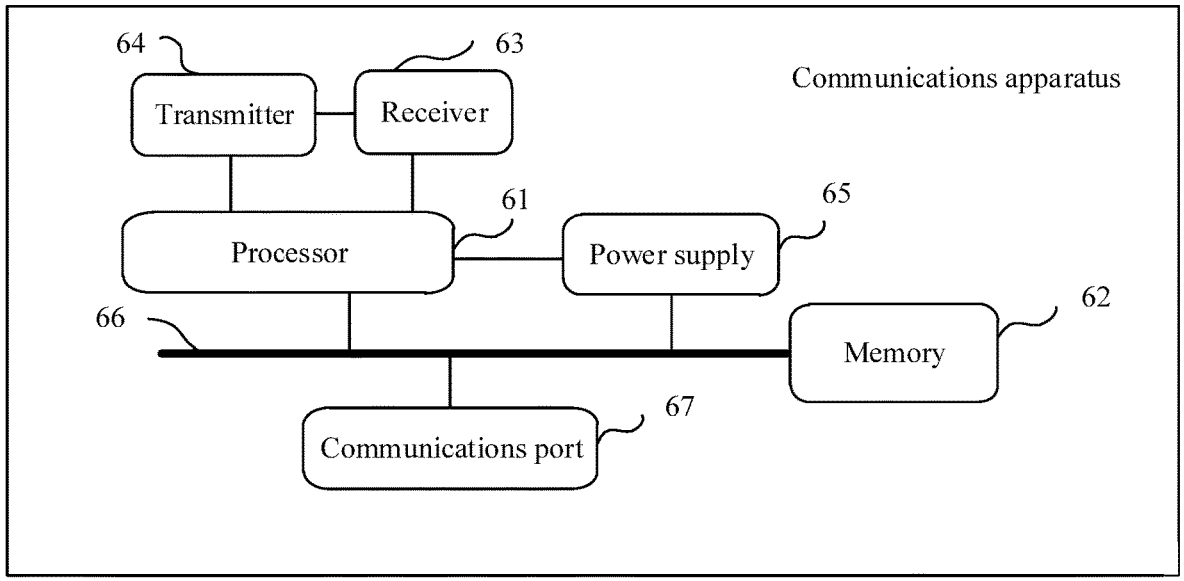
FIG. 25 is a schematic structural diagram of still another communications apparatus according to an embodiment of this application.

FIG. 25 is a schematic structural diagram of still another communications apparatus according to an embodiment of this application. As shown in FIG. 25, the communications apparatus may include a processor 61 (for example, a CPU), a memory 62, a receiver 63, and a transmitter 64. The receiver 63 and the transmitter 64 are both coupled to the processor 61. The processor 61 controls a receiving action of the receiver 63, and the processor 61 controls a sending action of the transmitter 64. The memory 62 may include a high-speed random access memory (RAM), and may further include a non-volatile memory (NVM), for example, at least one magnetic disk storage device. The memory 62 may store various instructions for completing various processing functions and implementing the method steps in this application. Optionally, the communications apparatus in this application may further include a power supply 65, a communications bus 66, and a communications port 67. The receiver 63 and the transmitter 64 may be integrated into a transceiver of the communications apparatus, or may be independent transceiver antennas on the communications apparatus. The communications bus 66 is configured to implement communication connection between elements. The communications port 67 is configured to implement connection and communication between the communications apparatus and other peripherals.

In this embodiment of this application, the memory 62 is configured to store computer executable program code. The program code includes an instruction. When the processor 61 executes the instruction, the instruction enables the processor 61 of the communications apparatus to perform a processing action of the session management network element in the foregoing method embodiment, enables the receiver 63 to perform a receiving action of the session management network element in the foregoing method embodiment, and enables the transmitter 64 to perform a sending action of the session management network element in the foregoing method embodiment. Implementation principles and technical effects of the processor 61, the receiver 63, and the transmitter 64 are similar to those in the method embodiment. Details are not described herein again.

Figure 26:
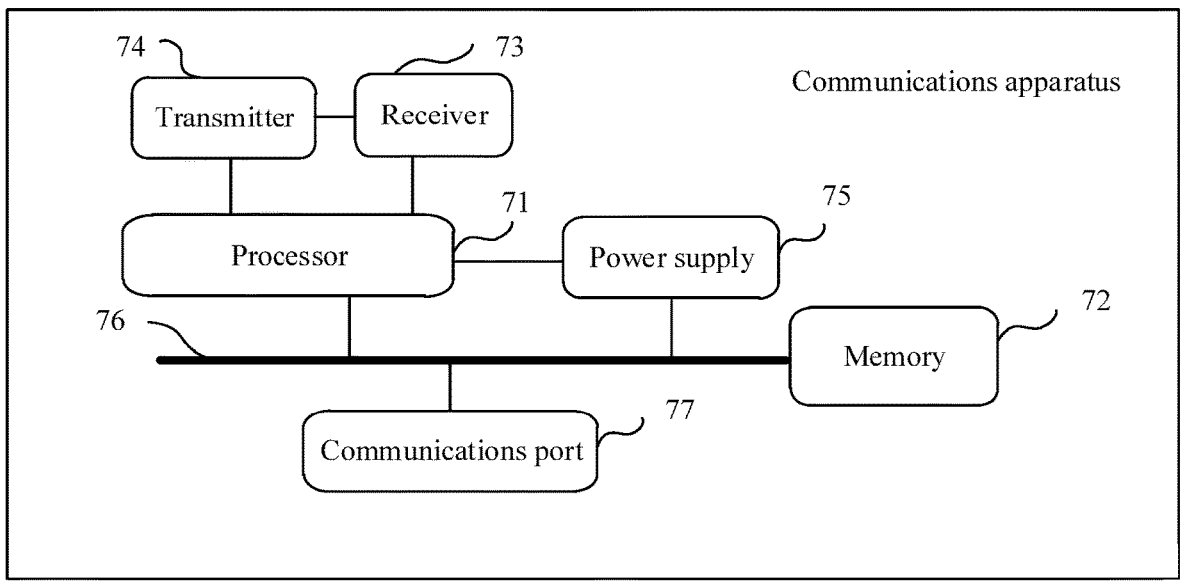
FIG. 26 is a schematic structural diagram of still another communications apparatus according to an embodiment of this application.

FIG. 26 is a schematic structural diagram of still another communications apparatus according to an embodiment of this application. As shown in FIG. 26, the communications apparatus may include a processor 71 (for example, a CPU), a memory 72, a receiver 73, and a transmitter 74. The receiver 73 and the transmitter 74 are both coupled to the processor 71. The processor 71 controls a receiving action of the receiver 73, and the processor 71 controls a sending action of the transmitter 74. The memory 72 may include a high-speed random access memory (RAM), and may further include a non-volatile memory (NVM), for example, at least one magnetic disk storage device. The memory 72 may store various instructions for completing various processing functions and implementing the method steps in this application. Optionally, the communications apparatus in this application may further include a power supply 75, a communications bus 76, and a communications port 77. The receiver 73 and the transmitter 74 may be integrated into a transceiver of the communications apparatus, or may be independent transceiver antennas on the communications apparatus. The communications bus 76 is configured to implement communication connection between elements. The communications port 77 is configured to implement connection and communication between the communications apparatus and other peripherals.

In this embodiment of this application, the memory 72 is configured to store computer executable program code. The program code includes an instruction. When the processor 71 executes the instruction, the instruction enables the processor 71 of the communications apparatus to perform a processing action of the terminal in the foregoing method embodiment, enables the receiver 73 to perform a receiving action of the terminal in the foregoing method embodiment, and enables the transmitter 74 to perform a sending action of the terminal in the foregoing method embodiment. Implementation principles and technical effects of the processor 71, the receiver 73, and the transmitter 74 are similar to those in the method embodiment. Details are not described herein again.

Figure 27:
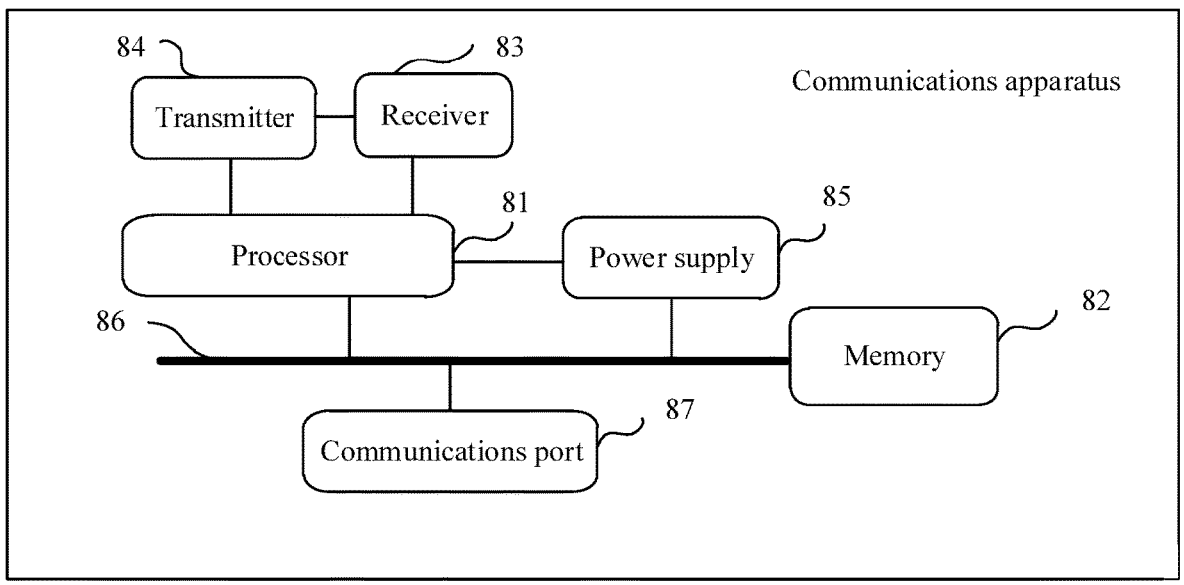
FIG. 27 is a schematic structural diagram of still another communications apparatus according to an embodiment of this application.

FIG. 27 is a schematic structural diagram of still another communications apparatus according to an embodiment of this application. As shown in FIG. 27, the communications apparatus may include a processor 81 (for example, a CPU), a memory 82, and a receiver 83. Optionally, the communications apparatus may further include a transmitter 84. Both the receiver 83 and the transmitter 84 are coupled to the processor 81. The processor 81 controls a receiving action of the receiver 83, and the processor 81 controls a sending action of the transmitter 84. The memory 82 may include a high-speed random access memory (RAM), or may further include a non-volatile memory (NVM), for example, at least one magnetic disk memory. The memory 82 may store various instructions for completing various processing functions and implementing the method steps in this application.

Optionally, the communications apparatus in this application may further include a power supply 85, a communications bus 86, and a communications port 87. The receiver 83 and the transmitter 84 may be integrated into a transceiver of the communications apparatus, or may be independent transceiver antennas on the communications apparatus. The communications bus 86 is configured to implement communication connection between elements. The communications port 87 is configured to implement connection and communication between the communications apparatus and other peripherals.

In this embodiment of this application, the memory 82 is configured to store computer executable program code. The program code includes an instruction. When the processor 81 executes the instruction, the instruction enables the processor 81 of the communications apparatus to perform a processing action of the data management network element in the foregoing method embodiment, enables the receiver 83 to perform a receiving action of the data management network element in the foregoing method embodiment, and enables the transmitter 84 to perform a sending action of the data management network element in the foregoing method embodiment. Implementation principles and technical effects of the processor 81, the receiver 83, and the transmitter 84 are similar to those in the method embodiment. Details are not described herein again. Alternatively, the instruction enables the processor 81 of the communications apparatus to perform a processing action of the policy control network element in the foregoing method embodiment, enables the receiver 83 to perform a receiving action of the policy control network element in the foregoing method embodiment, and enables the transmitter 84 to perform a sending action of the policy control network element in the foregoing method embodiment. Implementation principles and technical effects of the processor 81, the receiver 83, and the transmitter 84 are similar to those in the method embodiment. Details are not described herein again.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid State Disk (SSD)), or the like.

In this specification, the term "a plurality of" means two or more. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In the formula, the character "/" indicates a "division" relationship between the associated objects.

It may be understood that various numbers in the embodiments of this application are merely used for differentiation for ease of description, and are not intended to limit the scope of the embodiments of this application.

It may be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

What is claimed is:

1. A method for accessing a serving network, comprising:
receiving, by a session management function network element through a wireless network, a session establishment request message from a terminal, wherein the session establishment request message requests the session management function network element to establish a session for the terminal to access an Internet Protocol television (IPTV) network;
obtaining, by the session management function network element from a data management network element, authentication information of the terminal in the serving network, wherein the authentication information is for the terminal to access the serving network, and wherein the serving network is the IPTV network;
receiving, by the session management function network element, an initial access message from the terminal; and
sending, by the session management function network element through a user plane function network element, an access message to the serving network, wherein the access message comprises the authentication information.

2. The method according to claim 1, further comprising:
obtaining, by the session management function network element, identification information of the serving network based on the session establishment request message;
determining, by the session management function network element based on the identification information of the serving network, a policy control function network element for providing a policy for the serving network;
notifying, by the session management function network element, the policy control network element that the terminal is to obtain a service from the serving network; and
receiving, by the session management function network element, the policy of the serving network from the policy control function network element.

3. The method according to claim 2, wherein the identification information of the serving network is a data network name (DNN) of the serving network.

4. The method according to claim 1, further comprising:
obtaining, by the session management function network element, identification information of the terminal;

establishing, by the session management function network element, a mapping relationship between the identification information of the terminal and session information of the terminal based on the identification information of the terminal and the session information of the terminal; and sending, by the session management function network element, the mapping relationship to the user plane function network element.

5. The method according to claim 4, further comprising:
obtaining, by the session management function network element, the identification information of the terminal from the data function management network element; or
obtaining, by the session management function network element, the identification information of the terminal from the initial access message.

6. The method according to claim 1, further comprising:
receiving, by the session management function network element, a feedback message of the access message from the serving network, wherein the feedback message comprises identification information of the terminal;
determining, by the session management function network element, session information of the terminal based on the identification information of the terminal and a mapping relationship between the identification information of the terminal and the session information of the terminal; and
sending, by the session management function network element, the feedback message to the user plane function network element, wherein the feedback message comprises the session information of the terminal.

7. The method according to claim 1, wherein obtaining the authentication information of the terminal comprises obtaining, by the session management function network element from subscription information of the terminal that is stored in the data management network element, the authentication information of the terminal.

8. The method according to claim 1, further comprising adding, by the session management function network element, the authentication information of the terminal to the initial access message to obtain the access message.

9. The method according to claim 1, wherein the authentication information of the terminal comprises a line identification (ID) of the terminal.

10. The method according to claim 1, wherein the data management network element is a unified data management (UDM) network element.

11. The method according to claim 1, wherein the initial access message and the access message are one of dynamic host configuration protocol (DHCP) discover messages, DHCP request messages, or DHCP solicit messages.

12. The method according to claim 1, wherein the terminal is a residential gateway.

13. A session management function network apparatus, comprising:
a memory configured to store instructions; and
at least one processor coupled to the memory and configured to execute the instructions to cause the session management function network apparatus to:
receive, through a wireless network, a session establishment request message from a terminal, wherein the session establishment request message requests the session management function network apparatus to establish a session for the terminal to access an Internet Protocol television (IPTV) network;
obtain, from a data management network element, authentication information of the terminal in a serving network, wherein the authentication information is for the terminal to access the serving network, and wherein the serving network is the IPTV network;
receive an initial access message from the terminal; and
send, through a user plane function network element, an access message to the serving network, wherein the access message comprises the authentication information.

14. The session management function network apparatus according to claim 13, wherein the session management function network apparatus obtains the authentication information of the terminal by obtaining, from subscription information of the terminal that is stored in the data management network element, the authentication information of the terminal.

15. The session management function network apparatus according to claim 13, wherein the session management function network apparatus further adds the authentication information of the terminal to the initial access message to obtain the access message.

16. The session management function network apparatus according to claim 13, wherein the authentication information comprises a line identification (ID) of the terminal.

17. The session management function network apparatus according to claim 13, wherein the initial access message and the access message are Dynamic Host Configuration Protocol (DHCP) discover messages or DHCP request messages.

18. The session management function network apparatus according to claim 13, wherein the initial access message and the access message are dynamic host configuration protocol (DHCP) solicit messages.

19. The session management function network apparatus according to claim 13, wherein the terminal is a residential gateway.

20. A non-transitory computer-readable storage medium storing a program to be executed by at least one processor to cause a session management function network apparatus comprising the at least one processor to implement a method comprising:
receiving, through a wireless network, a session establishment request message from a terminal, wherein the session establishment request message requests the session management function network apparatus to establish a session for the terminal to accessing an Internet Protocol television (IPTV) network;
obtaining, from a data management network element, authentication information of the terminal in a serving network, wherein the authentication information is for the terminal to access the serving network, and wherein the serving network is the IPTV network;
receiving an initial access message from the terminal; and
sending, through a user plane function network element, an access message to the serving network, wherein the access message comprises the authentication information.

21. A method for accessing a serving network, comprising:
receiving, by a session management function network element through a wireless network, a session establishment request message from a terminal, wherein the session establishment request message requests the session management function network element to establish a session for the terminal to access an Internet Protocol television (IPTV) network;

sending, by a data management network element, authentication information of the terminal in the serving network;

obtaining, by the session management function network element from the data management network element, authentication information, wherein the authentication information is for the terminal to access the serving network, and wherein the serving network is the IPTV network;

receiving, by the session management function network element, an initial access message from the terminal; and sending, by the session management function network element through a user plane function network element, an access message to the serving network, wherein the access message comprises the authentication information.

* * * * *

UNITED STATES PATENT AND TRADEMARK OFFICE
CERTIFICATE OF CORRECTION

PATENT NO. : 11,553,339 B2
APPLICATION NO. : 17/013110
DATED : January 10, 2023
INVENTOR(S) : Hualin Zhu and Weisheng Jin It is certified that error appears in the above-identified patent and that said Letters Patent is hereby corrected as shown below:

In the Claims

Claim 2, Column 72, Line 56: "policy control network" should read "policy control function network"

Signed and Sealed this
Twenty-eighth Day of February, 2023

Katherine Kelly Vidal
Director of the United States Patent and Trademark Office